(12) United States Patent
Koyama et al.

(10) Patent No.: US 10,793,732 B2
(45) Date of Patent: Oct. 6, 2020

(54) INK COMPOSITION, INK SET, IMAGE RECORDING METHOD, AND METHOD FOR PRODUCING INK COMPOSITION

(71) Applicant: FUJIFILM CORPORATION, Minato-ku, Tokyo (JP)

(72) Inventors: Ichiro Koyama, Kanagawa (JP); Noriaki Sato, Kanagawa (JP); Shota Suzuki, Kanagawa (JP); Tsutomu Umebayashi, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 101 days.

(21) Appl. No.: 16/048,396

(22) Filed: Jul. 30, 2018

(65) Prior Publication Data

US 2019/0023922 A1 Jan. 24, 2019

Related U.S. Application Data

(63) Continuation of application No. PCT/JP2017/002176, filed on Jan. 23, 2017.

(30) Foreign Application Priority Data

Feb. 5, 2016 (JP) .................. 2016-021364
Jul. 22, 2016 (JP) .................. 2016-144556

(51) Int. Cl.
*C09D 11/322* (2014.01)
*B01J 13/14* (2006.01)
(Continued)

(52) U.S. Cl.
CPC ............ *C09D 11/322* (2013.01); *B01J 13/14* (2013.01); *B01J 13/20* (2013.01); *B41M 5/0017* (2013.01);
(Continued)

(58) Field of Classification Search
None
See application file for complete search history.

(56) References Cited

U.S. PATENT DOCUMENTS 5,541,633 A * 7/1996 Winnik ................ C09D 11/328
106/31.15
6,383,982 B1 * 5/2002 Kida ........................ B41M 5/155
106/31.17
(Continued)

FOREIGN PATENT DOCUMENTS

EP 2933374 A1 10/2015
EP 3156463 A1 4/2017
(Continued)

OTHER PUBLICATIONS

English language translation of the following: Office action dated Jul. 2, 2019 from the JPO in a Japanese patent application No. 2017-565489 corresponding to the instant patent application.
(Continued)

*Primary Examiner* — Jeffrey D Washville
(74) *Attorney, Agent, or Firm* — Solaris Intellectual Property Group, PLLC

(57) ABSTRACT

An ink composition including: a microcapsule having: a shell having a three-dimensional cross-linked structure including at least one of a urethane bond or a urea bond; and a core encapsulated by the shell; a colorant selected from the group consisting of a colorant having an ionic group and a colorant at least a part of a surface of which being covered with a dispersant having an ionic group; and water, a content ratio of an acidic group-containing compound having at least an acidic group, an acid dissociation constant of 5 or less, and a molecular weight of 2000 or less, relative to a total mass of the ink composition, is 0.5 mass % or less; an ink set, a method for producing an ink composition, and an image recording method.

13 Claims, 2 Drawing Sheets

(51) Int. Cl.
| | |
|---|---|
| *B41M 5/00* | (2006.01) |
| *C08F 18/08* | (2006.01) |
| *C08G 18/28* | (2006.01) |
| *C09D 11/38* | (2014.01) |
| *C09D 11/54* | (2014.01) |
| *C09D 11/102* | (2014.01) |
| *C08F 283/00* | (2006.01) |
| *C08G 18/80* | (2006.01) |
| *C08G 18/08* | (2006.01) |
| *C09D 11/10* | (2014.01) |
| *C08L 75/00* | (2006.01) |
| *C08G 18/38* | (2006.01) |
| *C08G 18/34* | (2006.01) |
| *C08G 18/79* | (2006.01) |
| *B01J 13/20* | (2006.01) |

(52) U.S. Cl.
CPC ...... *C08F 283/006* (2013.01); *C08G 18/0823* (2013.01); *C08G 18/0828* (2013.01); *C08G 18/288* (2013.01); *C08G 18/289* (2013.01); *C08G 18/348* (2013.01); *C08G 18/3821* (2013.01); *C08G 18/792* (2013.01); *C08G 18/807* (2013.01); *C08G 18/8029* (2013.01); *C08L 75/00* (2013.01); *C09D 11/10* (2013.01); *C09D 11/102* (2013.01); *C09D 11/38* (2013.01); *C09D 11/54* (2013.01)

(56) References Cited

U.S. PATENT DOCUMENTS

| | | | |
|---|---|---|---|
| 2011/0318551 A1* | 12/2011 | Nakagawa | ............... B01J 13/02 |
| | | | 428/206 |
| 2012/0149831 A1* | 6/2012 | Nagahama | ........... C09D 11/102 |
| | | | 524/539 |
| 2013/0295149 A1* | 11/2013 | Ouali | ........................ B01J 13/16 |
| | | | 424/401 |
| 2014/0198151 A1* | 7/2014 | Yamamoto | ........... C09D 11/322 |
| | | | 347/20 |
| 2015/0258833 A1* | 9/2015 | Katsuragi | ............ B41M 5/0017 |
| | | | 347/21 |

FOREIGN PATENT DOCUMENTS

| | | |
|---|---|---|
| JP | H04-249517 A | 9/1992 |
| JP | H08-060063 A | 3/1996 |
| JP | 2000256594 A | 9/2000 |
| JP | 2004-075759 A | 3/2004 |
| JP | 2006-089577 A | 4/2006 |
| JP | 2010-227732 A | 10/2010 |
| JP | 2012-025947 A | 2/2012 |
| JP | 2012-092224 A | 5/2012 |
| JP | 2012-256594 A | 12/2012 |
| JP | 2014-507433 A | 3/2014 |
| JP | 2015-193230 A | 11/2015 |
| WO | 2010/143518 A1 | 12/2010 |
| WO | 2015/158654 A1 | 10/2015 |
| WO | 2016/165970 A1 | 10/2016 |

OTHER PUBLICATIONS

Extended European Search Report dated Jan. 25, 2019, issued in corresponding EP Patent Application No. 17747248.7.
International Search Report issued in International Application No. PCT/JP2017/002176 dated Feb. 28, 2017.
Written Opinion of the ISA issued in International Application No. PCT/JP2017/002176 dated Feb. 28, 2017.
Office Action dated May 27, 2020, issued by the EPO in corresponding EP Patent Application No. EP17747248.7.

* cited by examiner

INK COMPOSITION, INK SET, IMAGE RECORDING METHOD, AND METHOD FOR PRODUCING INK COMPOSITION

CROSS-REFERENCE TO RELATED APPLICATIONS

This application is a continuation application of International Application No. PCT/JP2017/002176, filed Jan. 23, 2017, the disclosure of which is incorporated herein by reference in its entirety. Further, this application claims priority from Japanese Patent Application No. 2016-021364, filed Feb. 5, 2016, and Japanese Patent Application No. 2016-144556, filed Jul. 22, 2016, the disclosures of which are incorporated herein by reference in their entireties.

BACKGROUND OF THE INVENTION

1. Field of the Invention

The present disclosure relates to an ink composition, an ink set, an image recording method, and a method for producing an ink composition.

2. Description of the Related Art

There are known modes of an image recording method of recording images on recording media, for example, an electrophotographic mode, a sublimation thermal-transfer mode, a fusion thermal-transfer mode, and an ink jet mode. The recording method employing the ink jet mode has come to be widely used for reasons of, for example, recordability on desired recording media and low running costs.

There is a known aqueous dispersion in which microcapsules including a core portion (core) and a covering portion (shell) surrounding the core portion are dispersed in an aqueous medium (medium including water). There is a proposed example of application of a microcapsule-dispersed ink to a recording method employing an ink jet mode.

For example, an ink jet ink is disclosed in which microcapsules having a core and a cross-linked polymer shell having a dispersing group such as a carboxy group introduced with a covalent bond are dispersed in an aqueous medium (for example, refer to WO2015/158654A).

SUMMARY OF THE INVENTION

However, in the ink jet ink described in WO2015/158654A, the dispersing group such as a carboxy group is introduced into microcapsules by just mixing and dispersing an amino acid at an ordinary temperature. Thus, the dispersing group such as a carboxy group is introduced into microcapsules at a low efficiency. As a result, a large amount of a relatively-low-molecular-weight compound having a carboxy group or the like is probably present as a free compound separated from the microcapsules in the ink jet ink.

When a large amount of such a low-molecular-weight compound having a dispersing group such as a carboxy group is present in the ink, the carboxy group or the like in the low-molecular-weight compound particularly causes degradation of the dispersibility of a colorant such as a pigment dispersed by the effect of an ionic group such as an acidic group. Such degradation of dispersibility causes degradation of the temporal stability of the ink jet ink, and may also cause degradation of ejectability during recording.

Incidentally, "such as a pigment dispersed by the effect of an ionic group" means a pigment or the like dispersed with a dispersant having an ionic group, or a pigment or the like having an ionic group on the surfaces of particles.

From the viewpoint of influence on film properties, the ink desirably has a small amount of residual low-molecular-weight compound.

Objects achieved by embodiments of the present invention are to provide an ink composition and an ink set having high dispersion stability of a colorant such as a pigment, a method for producing the ink composition, and an image recording method providing desired images with stability.

Specific means for achieving the objects includes the following aspects.

<1> An ink composition comprising: a microcapsule comprising: a shell having a three-dimensional cross-linked structure comprising at least one of a urethane bond or a urea bond; and a core encapsulated by the shell; a colorant selected from the group consisting of a colorant having an ionic group and a colorant at least a part of a surface of which being covered with a dispersant having an ionic group; and water, a content ratio of an acidic group-containing compound having at least an acidic group, an acid dissociation constant (hereafter, also referred to as "pKa") of 5 or less, and a molecular weight of 2000 or less, relative to a total mass of the ink composition, is 0.5 mass % or less.

<2> The ink composition according to <1>, wherein the ionic group in the coloring agent is an anionic group.

<3> The ink composition according to <1> or <2>, wherein the acidic group of the acidic-group-containing compound is a carboxy group.

<4> The ink composition according to any one of <1> to <3>, wherein the content ratio of the acidic group-containing compound relative to the total mass of the ink composition is 0.1 mass % or more and 0.5 mass % or less.

<5> The ink composition according to any one of <1> to <4>, wherein the acidic group-containing compound is represented by Formula 1 below.

Formula 1

In Formula, R represents a hydrogen atom, an alkyl group, or an aryl group; Z represents an acidic group selected from the group consisting of a carboxy group, a sulfonic group, and a phosphate group; and L represents an alkylene group having 1 to 3 carbon atoms, an arylene group having 6 to 10 carbon atoms, or a divalent group that is a combination of an alkylene group having 1 to 3 carbon atoms and an arylene group having 6 to 10 carbon atoms.

<6> The ink composition according to <5>, wherein the acidic group-containing compound is an amino acid in which Z represents a carboxy group and L represents an alkylene group having 1 to 3 carbon atoms and being unsubstituted or having an alkylamino group as a substituent.

<7> The ink composition according to any one of <1> to <6>, wherein the acidic group-containing compound has a molecular weight of 1000 or less.

<8> The ink composition according to any one of <1> to <7>, wherein the core of the microcapsule includes a polymerizable compound.

<9> The ink composition according to <8>, wherein the polymerizable compound is a radical polymerizable compound.

<10> The ink composition according to any one of <1> to <9>, wherein the core of the microcapsule includes a photopolymerization initiator.

<11> The ink composition according to <8>, wherein the polymerizable compound is a thermal polymerizable compound.

<12> An ink set comprising: the ink composition according to any one of <1> to <11>; and a treatment liquid that includes a compound selected from the group consisting of a polyvalent metal salt, an acidic compound, and a cationic polymer, and being capable of aggregating a component in the ink composition.

<13> An image recording method comprising a step of applying (preferably by an ink jet method) the ink composition according to any one of <1> to <11> to a recording medium.

<14> An image recording method comprising: a treatment-liquid application step of applying the treatment liquid of the ink set according to <12> to a recording medium; and an ink application step of applying (preferably by an ink jet method) the ink composition of the ink set to a recording medium to form an image.

<15> A method for producing an ink composition, the method comprising: a step of preparing a microcapsule dispersion by mixing an aqueous phase comprising water and an oil phase comprising a compound having an acidic group and an active hydrogen group, an acid dissociation constant of 5 or less, and a molecular weight of 2000 or less, a tri- or higher functional isocyanate compound, and an organic solvent, and performing emulsification dispersing; and a step of mixing the microcapsule dispersion and a colorant selected from the group consisting of a colorant having an ionic group and a colorant at least a part of a surface of which being covered with a dispersant having an ionic group (first aspect).

<16> A method for producing an ink composition, the method comprising: a step of preparing a microcapsule dispersion by mixing an oil phase comprising a tri- or higher functional isocyanate compound and an organic solvent, and an aqueous phase comprising a basic compound, water, and a compound having an acidic group and an active hydrogen group, an acid dissociation constant of 5 or less, and a molecular weight of 2000 or less, and performing emulsification dispersing; and a step of mixing the microcapsule dispersion and a colorant selected from the group consisting of a colorant having an ionic group and a colorant at least a part of a surface of which being covered with a dispersant having an ionic group (second aspect).

<17> A method for producing an ink composition, the method comprising: a step of preparing a microcapsule dispersion by mixing an oil phase comprising a tri- or higher functional isocyanate compound and an organic solvent, and an aqueous phase comprising water and a compound having an acidic group and an active hydrogen group, an acid dissociation constant of 5 or less, and a molecular weight of 2000 or less, and heating to a predetermined temperature to perform emulsification; and a step of mixing the microcapsule dispersion and a colorant selected from the group consisting of a colorant having an ionic group and a colorant at least a part of a surface of which being covered with a dispersant having an ionic group (third aspect).

Embodiments according to the present invention provide an ink composition and an ink set having high dispersion stability of a colorant such as a pigment, and a method for producing the ink composition. Other embodiments according to the present invention provide image recording methods providing desired images with stability.

BRIEF DESCRIPTION OF THE DRAWINGS

FIG. 2 is a schematic view of characters in a character image used for evaluation of image resolution; and FIG. 3 is a schematic view of characters in a reversed character image used for evaluation of image resolution.

DESCRIPTION OF THE PREFERRED EMBODIMENTS

Figure 1:
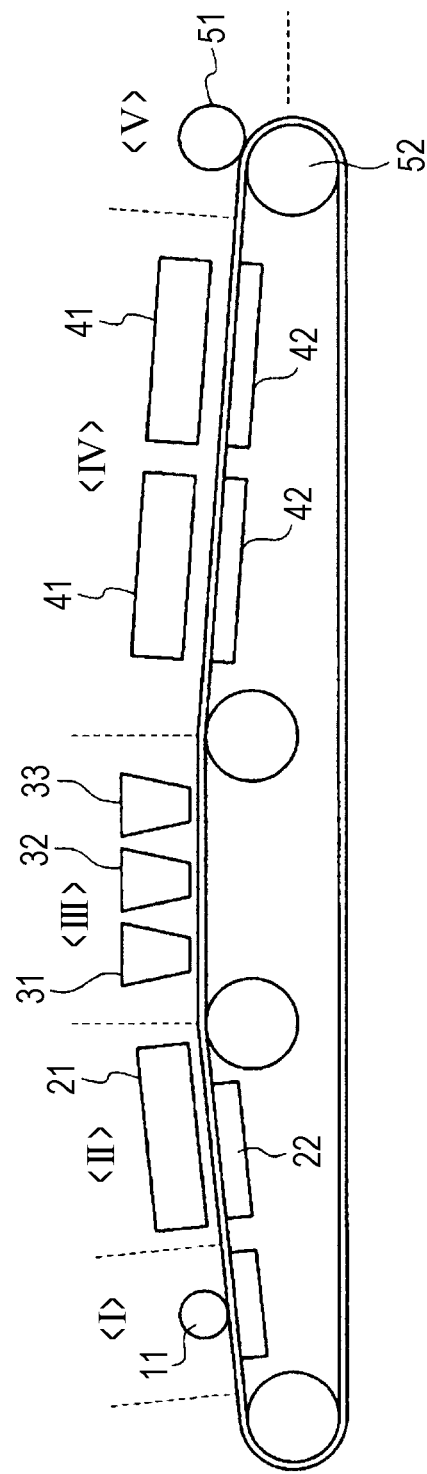
FIG. 1 is a schematic configuration view of an example of an ink jet recording apparatus.

Hereinafter, an ink composition, an ink set, a method for producing an ink composition, and an image recording method according to the present disclosure will be described in detail.

In this Specification, ranges defined by a value "to" a value include these values as the minimum value and the maximum value.

In this Specification, among ranges described in series, the upper limit value or the lower limit value of a range may replace the upper limit value or the lower limit value of other ranges described in series. In ranges described in this Specification, the upper limit value or the lower limit value of a range may be replaced by a value described in Examples.

In this Specification, the amount of each component in a composition means, when the composition contains a plurality of substances belonging to such a component, the total amount of the plurality of substances in the composition unless otherwise specified.

In this Specification, the term "step" includes not only an independent step, but also a step that is not clearly distinguished from another step but that achieves the intended result of the step.

In this Specification, "light" is a concept that encompasses active energy rays such as γ-rays, β-rays, electron beams, ultraviolet radiation, and visible radiation.

In this Specification, ultraviolet radiation is also referred to as "UV (Ultra Violet) light".

In this Specification, light emitted from an LED (Light Emitting Diode) light source is also referred to as "LED light".

In this Specification, "(meth)acrylic acid" is a concept that encompasses both of acrylic acid and methacrylic acid; "(meth)acrylate" is a concept that encompasses both of acrylate and methacrylate; and "(meth)acryloyl group" is a concept that encompasses both of an acryloyl group and a methacryloyl group.

Ink Composition

An ink composition according to the present disclosure includes a microcapsule having a shell having a three-dimensional cross-linked structure including at least one of a urethane bond or a urea bond, and a core encapsulated by the shell; a colorant selected from the group consisting of a colorant having an ionic group and a colorant at least a part of a surface of which is covered with a dispersant having an ionic group; and water, wherein the content ratio of an acidic group-containing compound having at least an acidic group, an acid dissociation constant of 5 or less, and a molecular weight of 2000 or less, relative to the total mass of the composition, is adjusted to be 0.5 mass % or less.

The ink composition according to the present disclosure may further include, as needed, other components such as an organic solvent, a surfactant, a polymerization inhibitor, and an antioxidant.

Microcapsules in which the core is encapsulated by a shell having a dispersing group such as a carboxy group can be produced by, for example, as in WO2015/158654A, mixing an amino acid including a carboxy group with a shell component such as isocyanate, water, and the like, and performing dispersion at an ordinary temperature.

However, it has been revealed that the method of just mixing an amino acid and performing emulsification dispersing does not sufficiently cause introduction of carboxy groups into shells. In this case, the liquid contains a large amount of residual relatively-low-molecular-weight acidic group-containing compound such as an amino acid including a carboxy group. When an ink composition prepared in this state has a formulation including a colorant such as a pigment dispersed by the effect of an ionic group such as an acidic group, the carboxy group or the like of the acidic group-containing compound (low-molecular-weight compound having a dispersing group such as a carboxy group) present in a free state in the liquid causes degradation of the dispersibility of the pigment or the like.

In view of this, the ink composition according to the present disclosure is defined such that the content ratio of an acidic group-containing compound having an acid dissociation constant (pKa) of 5 or less and a molecular weight of 2000 or less relative to the total mass of the composition is 0.5 mass % or less. As a result, even when the ink composition includes a colorant selected from the group consisting of a colorant having an ionic group (what is called, self-dispersing pigment) and a colorant at least a part of a surface of which is covered with a dispersant having an ionic group, the ink composition still has high dispersion stability.

Thus, the ink composition according to the present disclosure enables formation of desired images with stability.

In the ink composition according to the present disclosure, the content ratio of an acidic group-containing compound at least having an acidic group, an acid dissociation constant (pKa) of 5 or less, and a molecular weight of 2000 or less (hereafter, also simply referred to as "acidic group-containing compound"), relative to the total mass of the ink composition, is 0.5 mass % or less. This acidic group-containing compound does not encompass colorants.

When the content ratio of the acidic group-containing compound relative to the total mass of the ink composition is 0.5 mass % or less, high dispersion stability is maintained for the colorant such as a pigment dispersed in the ink composition. Degradation of the dispersion stability of a pigment or the like results in, for example, in the case of ink jet recording, degradation of ejectability, and also degradation of temporal preservation stability. When the relatively-low-molecular-weight acidic group-containing compound including an acidic group such as a carboxy group remains in the ink composition, the film tends to have a low strength and the film may have a decreased hardness.

The acid dissociation constant (pKa) is the logarithm of the reciprocal of the dissociation constant of the acidic group-containing compound, and is a value calculated with ACD/pKa (manufactured by ACD/Labs) software and from the structural formula of the acidic group-containing compound. The value is an integer determined by rounding off the first decimal place.

From the viewpoint of enhancing temporal stability and enhancing ejectability in the case of ink jet recording, the content ratio of the acidic group-containing compound relative to the total mass of the ink composition is preferably in the range of 0.1 mass % or more and 0.5 mass % or less.

Such a small amount of acidic group-containing compound remaining in the ink composition provides the effect of buffering changes in the liquid properties of the ink composition. This enables enhancement of the temporal stability of the ink composition in the ejection nozzles of the apparatus.

For example, in the case of ink jet recording of ejecting the ink composition through ejection nozzles to record images, at the time of, for example, termination of ejection, carbon dioxide in the air passes through the ejection nozzles and is absorbed to acidify the ink composition. This tends to destabilize the dispersibility of the ink composition, which is stabilized in a basic state. The acidic group-containing compound present in a small amount in the ink composition provides a buffering effect on the liquid that tends to be acidified by carbon dioxide and subjected to changes in pH, and plays the role of maintaining high temporal stability of the ink composition.

In particular, from the viewpoint of maintaining the dispersion stability of the colorant and maintaining the high ejectability of the ink composition, the content ratio of the acidic group-containing compound is more preferably in the range of 0.2 mass % or more and 0.45 mass % or less.

The acidic group of the acidic group-containing compound is a group at least exhibiting acidity, for example, an acid group. Examples of the acid group include a carboxy group, a sulfo group, a phosphate group, and a phosphonate group. In particular, from the viewpoint of using the buffering effect to enhance the preservation stability of the ink composition and to maintain higher ejectability of the ink composition, the acid group is preferably a carboxy group, a sulfonic group, or a phosphate group, more preferably a carboxy group.

The "acidic group-containing compound" that can be contained, in the ink composition, at a content ratio of 0.5 mass % or less may be a "compound having an acidic group and an active hydrogen group, a pKa of 5 or less, and a molecular weight of 2000 or less (compound having an acidic group and an active hydrogen group)" described later.

Examples of the acidic group-containing compound include amino acids such as α-amino acids (lysine, alanine, arginine, asparagine, aspartic acid, cysteine, glutamine, glutamic acid, glycine, histidine, isoleucine, leucine, methionine, phenylalanine, proline, serine, threonine, tryptophan, tyrosine, and valine), malic acid, taurine, ethanolamine phosphate (EAP), and the following specific examples.

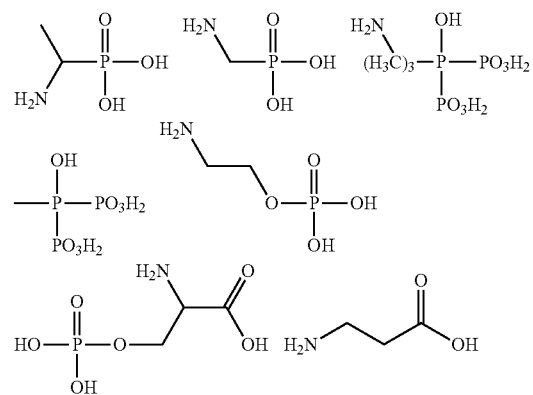

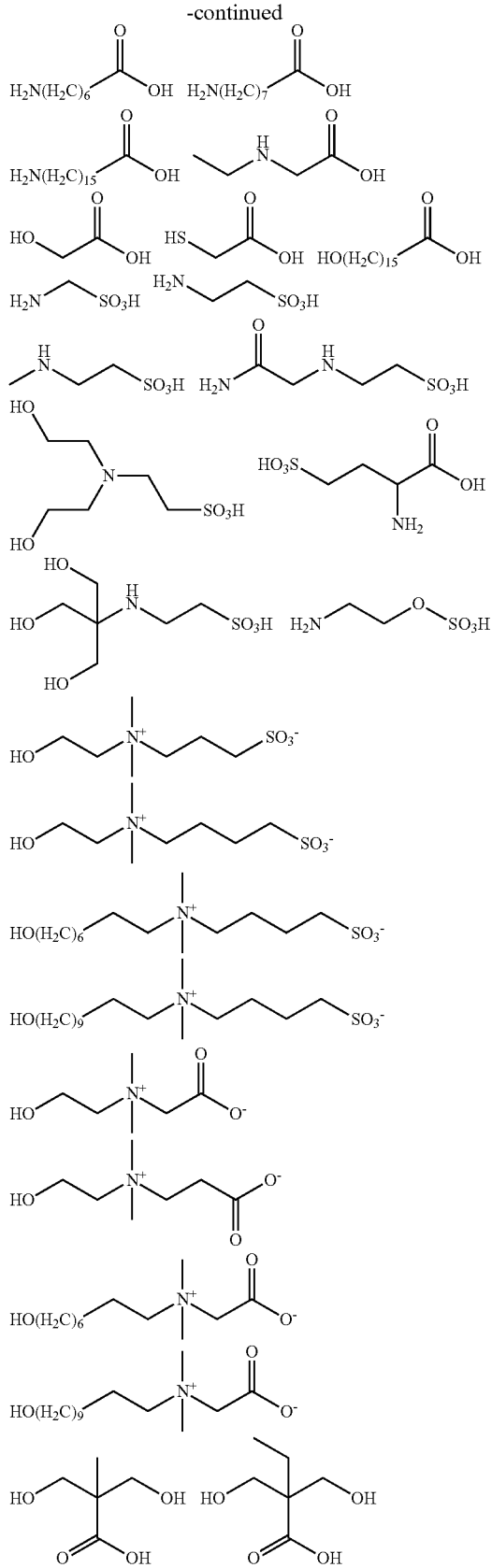

The acidic group-containing compound is preferably a compound represented by the following Formula 1.

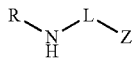

In Formula 1, R represents a hydrogen atom, an alkyl group, or an aryl group; and Z represents an acidic group selected from the group consisting of a carboxy group, a sulfonic group, and a phosphate group. L represents an alkylene group having 1 to 3 carbon atoms, an arylene having 6 to 10 carbon atoms, or a divalent group that is a combination of an alkylene group having 1 to 3 carbon atoms and an arylene group having 6 to 10 carbon atoms.

The alkyl group and the aryl group in R and the alkylene group and the arylene group in L may each be unsubstituted or may each have a substituent.

When the groups of R and L have a substituent, examples of the substituent include unsubstituted alkyl groups and substituted alkyl groups having substituents (such as an alkyl group having 1 to 4 carbon atoms, a phenyl group, an amino group, a carboxy group, a hydroxy group, a heterocyclic group, a guanidyl group, and a group of a combination of at least two of the foregoing groups (for example, an alkylamino group)).

Incidentally, in L, the numbers of carbon atoms of the alkylene group and the arylene group are the numbers of carbon atoms of an unsubstituted alkylene group and an unsubstituted arylene group.

In R, the alkyl group is preferably an alkyl group having 1 to 6 carbon atoms; examples include a methyl group, an ethyl group, a propyl group, a butyl group, and a cyclohexyl group.

In R, the aryl group is preferably an aryl group having 6 to 10 carbon atoms, and, for example, a phenyl group.

R is preferably a hydrogen atom.

In L, examples of the alkylene group having 1 to 3 carbon atoms include a methylene group, an ethylene group, and a propylene group; preferred are a methylene group and an ethylene group.

In L, the arylene having 6 to 10 carbon atoms is, for example, a phenylene group.

In L, the divalent group that is a combination of an alkylene group having 1 to 3 carbon atoms and an arylene group having 6 to 10 carbon atoms is, for example, a group represented by —$CH_2$—$C_6H_4$—.

The compound represented by Formula 1 is preferably an amino acid in which Z represents a carboxy group, and L represents an alkylene group having 1 to 3 carbon atoms that is unsubstituted or has, as a substituent, an alkylamino group (the alkyl moiety preferably has 3 to 5 carbon atoms).

Specific preferred examples of the amino acid include α-amino acids (lysine, alanine, arginine, asparagine, aspartic acid, cysteine, glutamine, glutamic acid, glycine, histidine, isoleucine, leucine, methionine, phenylalanine, proline, serine, threonine, tryptophan, tyrosine, and valine).

The acidic group-containing compound has a molecular weight of 2000 or less, preferably 1000 or less. In other words, the acidic group-containing compound is a low-molecular-weight compound having a molecular weight of 2000 or less.

When a component for forming shells of microcapsules does not form shells and remains in a free state in the ink composition, the acidic group-containing compound includes a compound derived from the component for forming shells of microcapsules, so that a low-molecular-weight compound having a molecular weight of 2000 or less (preferably 1000 or less) tends to be present in the ink composition.

From the viewpoint that the acidic group-containing compound is a component for forming shells of microcapsules, the acidic group-containing compound preferably has a molecular weight of 500 or less. The lower limit of the molecular weight of the acidic group-containing compound is not particularly limited.

The molecular weight of the acidic group-containing compound can be calculated from the molecular formula.

Examples of a method for adjusting the content ratio of the acidic group-containing compound to be 0.5 mass % or less include the following methods.

(1) During production of the ink composition, a method of performing emulsification dispersing using an aqueous phase including water and an oil phase that is a mixture of a compound having an acidic group and an active hydrogen group, a pKa of 5 or less, and a molecular weight of 2000 or less (low-molecular-weight compound having a pKa of 5 or less), a tri- or higher functional isocyanate compound, and an organic solvent.

In other words, this is a method of preparing the oil phase at least including a low-molecular-weight compound having a pKa of 5 or less and a tri- or higher functional isocyanate compound and performing emulsification.

(2) During production of the ink composition, a method of performing emulsification dispersing using an oil phase at least including a tri- or higher functional isocyanate compound and an organic solvent, and an aqueous phase in which at least a low-molecular-weight compound having a pKa of 5 or less, a basic compound, and water are mixed together so as to neutralize the acidic group of the low-molecular-weight compound.

(3) During production of the ink composition, a method of performing emulsification dispersing of a mixture of an oil phase and an aqueous phase under heating at a predetermined temperature (preferably 35° C. to 70° C.), the oil phase at least including a tri- or higher functional isocyanate compound and an organic solvent, the aqueous phase at least including a low-molecular-weight compound having a pKa of 5 or less and water.

(4) During production of the ink composition, a method of performing emulsification dispersing using an oil phase at least including a tri- or higher functional isocyanate compound and an organic solvent and being heated at a predetermined temperature (preferably 35° C. to 70° C.), and an aqueous phase at least including a low-molecular-weight compound having a pKa of 5 or less and water.

Hereinafter, components included in the ink composition according to the present disclosure will be described in detail.

Microcapsules

The ink composition contains at least one microcapsule species.

The microcapsules according to the present disclosure are constituted by an outermost shell having a three-dimensional cross-linked structure including at least one of a urethane bond or a urea bond, and a core that is a region encapsulated by the shell.

The ink composition according to the present disclosure may include only a single microcapsule species, or may include two or more microcapsule species.

Such microcapsules are a dispersoid in the ink composition according to the present disclosure.

The presence of the microcapsules is confirmed by applying a microcapsule dispersion liquid onto a support, drying the liquid to obtain a sample for observation of the form, subsequently cutting the sample, and observing the cut surface with an electron microscope, for example.

The microcapsules may have, in at least one of the shell or the core, a polymerizable group; and the polymerizable group is preferably a photopolymerizable group or a thermal polymerizable group.

When microcapsules have a polymerizable group, irradiation with an active energy ray, heating, or irradiation with infrared radiation causes adjacent microcapsules to be bonded together to form a cross-linked structure. This enables formation of a film having a high degree of cross-linking and high hardness.

The photopolymerizable group is preferably a radical polymerizable group, preferably a group including an ethylenic double bond such as a (meth)acryloyl group, an allyl group, a styryl group, or a vinyl group. Of these, the polymerizable group is particularly preferably a (meth)acryloyl group from the viewpoint of polymerization reactivity and the hardness of the film.

The thermal polymerizable group is preferably an epoxy group, an oxetanyl group, an aziridinyl group, an azetidinyl group, a ketone group, an aldehyde group, or a blocked isocyanate group.

The fact that the microcapsules have a polymerizable group can be confirmed by, for example, Fourier transform infrared spectroscopy (FT-IR).

The microcapsules may have a polymerizable group in a form in which the polymerizable group is introduced into the three-dimensional cross-linked structures of the shells, or may have a polymerizable group in a form in which the cores include a polymerizable compound. The microcapsules may have a polymerizable group in both of the above-described forms.

Preferred is such an embodiment of having a polymerizable group in which the cores include a polymerizable compound. In this embodiment, the distance between the polymerizable group and the photopolymerization initiator is shorter, to thereby provide enhanced curing sensitivity to irradiation with an active energy ray, which enables formation of a film having high hardness.

This "polymerizable compound" means, among compounds having a polymerizable group, a compound that can be included in the cores. This concept "polymerizable compound" does not encompass a compound used for introducing a polymerizable group into the shells (in other words, an isocyanate compound having an introduced polymerizable group described later). The "polymerizable compound" and the "isocyanate compound having an introduced polymerizable group" will be described later in detail.

Volume-Average Particle Size of Microcapsules

From the viewpoint of the dispersion stability of the microcapsules, the microcapsules preferably have a volume-average particle size of 0.01 µm to 10.0 µm, more preferably 0.01 µm to 5 µm, still more preferably 0.05 µm to 1 µm.

In this Specification, the "volume-average particle size of microcapsules" is a value measured by a light scattering method. The light scattering method for measuring the volume-average particle size of microcapsules is performed with, for example, LA-960 (HORIBA, Ltd.).

Microcapsule Content

The microcapsule content of the ink composition according to the present disclosure relative to the total amount of the ink composition is preferably 1 mass % to 50 mass %, more preferably 3 mass % to 40 mass %, still more preferably 5 mass % to 30 mass %.

When the microcapsule content relative to the total amount of the ink composition is 1 mass % or more, the film to be formed has higher hardness. When the microcapsule content relative to the total amount of the ink composition is 50 mass % or less, higher dispersion stability of the microcapsules is provided.

Incidentally, the microcapsule content is a value determined in consideration of also components present within the cores such as a photopolymerization initiator.

The total solid content of the microcapsules in the ink composition according to the present disclosure relative to the total solid content of the ink composition is preferably 50 mass % or more, more preferably 60 mass % or more, still more preferably 70 mass % or more, still more preferably 80 mass % or more, still more preferably 85 mass % or more.

When the total solid content of the microcapsules relative to the total solid content of the ink composition is 50 mass % or more, the film to be formed has higher hardness, and higher dispersion stability of the microcapsules is provided.

The upper limit of the total solid content of the microcapsules in the ink composition according to the present disclosure is not particularly limited, and is, for example, 95 mass %.

Shells of Microcapsules

The shells of the microcapsules (hereafter, also simply referred to as "shells") have a three-dimensional cross-linked structure including at least one of a urethane bond or a urea bond.

Three-Dimensional Cross-Linked Structure

In the ink composition according to the present disclosure, the shells have a three-dimensional cross-linked structure including at least one of a urethane bond or a urea bond, so that a film having high hardness can be formed. In the present disclosure, the "three-dimensional cross-linked structure" is a three-dimensional network structure formed by crosslinking.

Whether the shells of microcapsules have a three-dimensional cross-linked structure is determined in the following manner. The following procedures are performed under a condition of a liquid temperature of 25° C.

When the ink composition contains no pigments, the ink composition is directly subjected to the following procedures. When the ink composition contains a pigment, the ink composition is first centrifuged to remove the pigment, and the ink composition from which the pigment has been removed is subjected to the following procedures.

A sample is obtained from the ink composition. To the obtained sample, tetrahydrofuran (THF) in an amount of 100 mass times the total solid content of the sample is added and mixed, to prepare a diluted solution. The obtained diluted solution is centrifuged under conditions of 80,000 rpm and 40 minutes. After the centrifugation, visual inspection for residue is performed. When residue is present, the residue is re-dispersed in water to prepare a re-dispersed dispersion, and the re-dispersed dispersion is subjected to measurement of particle size distribution performed with a wet particle size distribution analyzer (LA-960, HORIBA, Ltd.) by a light scattering method.

When these procedures are performed and particle size distribution is detected, the shells of the microcapsules are regarded as having a three-dimensional cross-linked structure.

The three-dimensional cross-linked structure has at least one bond selected from the group consisting of a urethane bond and a urea bond. The three-dimensional cross-linked structure preferably has both of a urethane bond and a urea bond.

The total amount of urethane bond and urea bond included per gram of shells having a three-dimensional cross-linked structure (unit: mmol/g; hereafter, also referred to as "(urethane+urea) value") is preferably 1 mmol/g to 10 mmol/g, more preferably 1.5 mmol/g to 9 mmol/g, particularly preferably 2 mmol/g to 8 mmol/g.

The three-dimensional cross-linked structures of the shells preferably include the following Structure (1).

The three-dimensional cross-linked structures may include a plurality of the following Structure (1), and the plurality of Structure (1) may have the same structure or different structures.

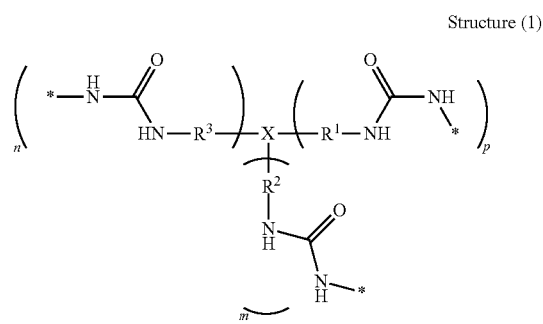

Structure (1)

In Structure (1), X represents a (p+m+n)-valent organic group formed as a combination of at least two selected from the group consisting of a hydrocarbon group that may have a cyclic structure, —NH—, >N—, —C(=O)—, —O—, and —S—.

In Structure (1), $R^1$, $R^2$, and $R^3$ each independently represent a hydrocarbon group that has 5 to 15 carbon atoms and may have a cyclic structure.

In Structure (1), * represents a linkage point; p, m, and n are each 0 or more, and p+m+n is 3 or more.

The total molecular weight of X, $R^1$, $R^2$, and $R^3$ is preferably less than 2000, preferably less than 1500, more preferably less than 1000. When the total molecular weight of X, $R^1$, $R^2$, and $R^3$ is less than 2000, a high encapsulation ratio can be achieved for compounds for being encapsulated within the cores.

In the organic group represented by X, the hydrocarbon group is preferably a linear or branched hydrocarbon group having 1 to 15 carbon atoms, more preferably a linear or branched hydrocarbon group having 1 to 10 carbon atoms.

The hydrocarbon group in the organic group represented by X and the hydrocarbon groups represented by $R^1$, $R^2$, and $R^3$ may have a cyclic structure, and examples of the cyclic structure include an alicyclic structure and an aromatic ring structure.

Examples of the alicyclic structure include a cyclohexane ring structure, a bicyclohexane ring structure, a bicyclodecane ring structure, an isobornene ring structure, a dicyclopentane ring structure, an adamantane ring structure, and a tricyclodecane ring structure.

Examples of the aromatic ring structure include a benzene ring structure, a naphthalene ring structure, and a biphenyl ring structure.

In Structure (1), p is 0 or more, preferably 1 to 10, more preferably 1 to 8, still more preferably 1 to 6, particularly preferably 1 to 3.

In Structure (1), m is 0 or more, preferably 1 to 10, more preferably 1 to 8, still more preferably 1 to 6, particularly preferably 1 to 3.

In Structure (1), n is 0 or more, preferably 1 to 10, more preferably 1 to 8, still more preferably 1 to 6, particularly preferably 1 to 3.
In Structure (1), p+m+n is preferably an integer of 3 to 10, more preferably an integer of 3 to 8, still more preferably an integer of 3 to 6.
The (p+m+n)-valent organic group represented by X is preferably a group represented by any one of the following (X-1) to (X-12).
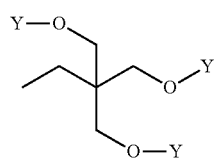
(X-1)
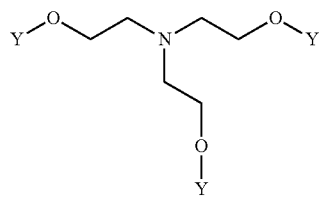
(X-2)
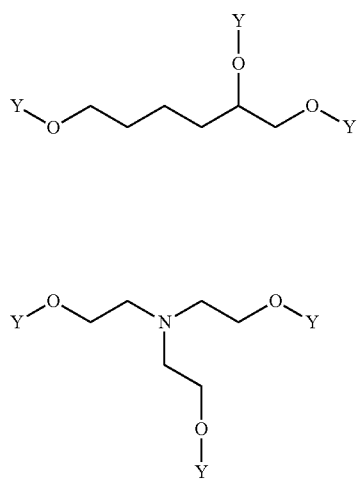
(X-3)
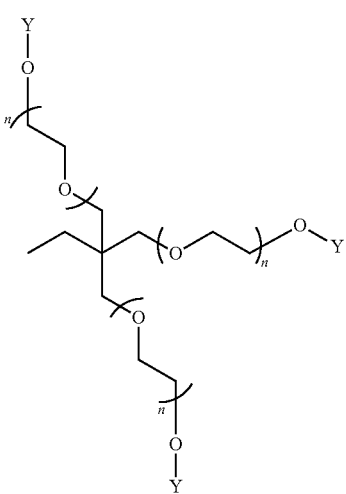
(X-4)
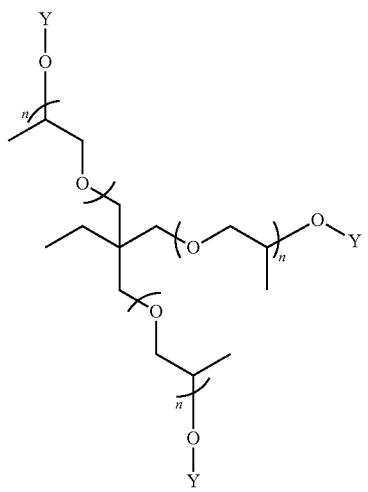
(X-5)
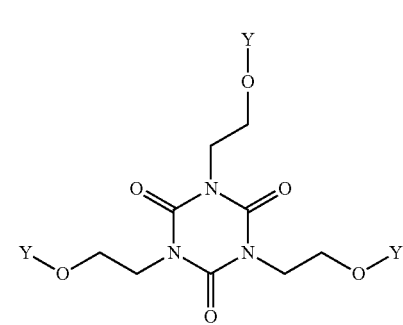
(X-6)
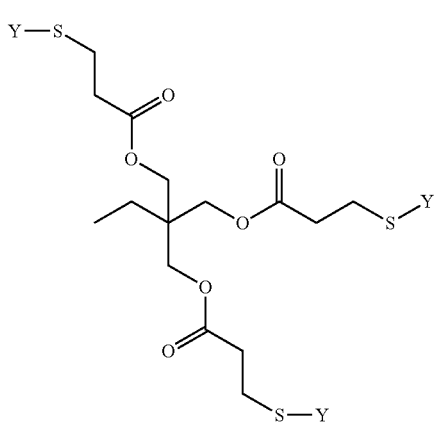
(X-7)
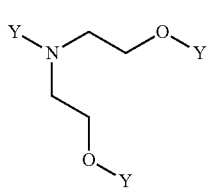
(X-8)

(X-9)

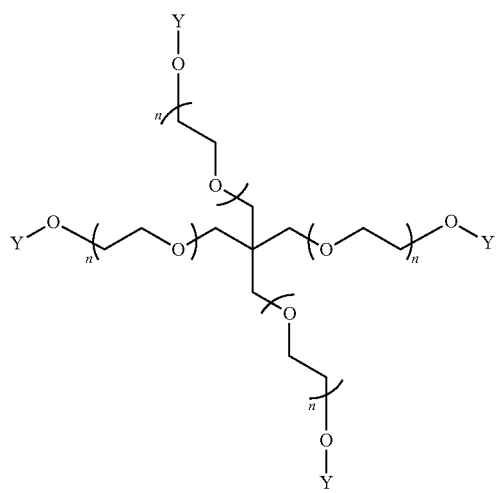

(X-10)

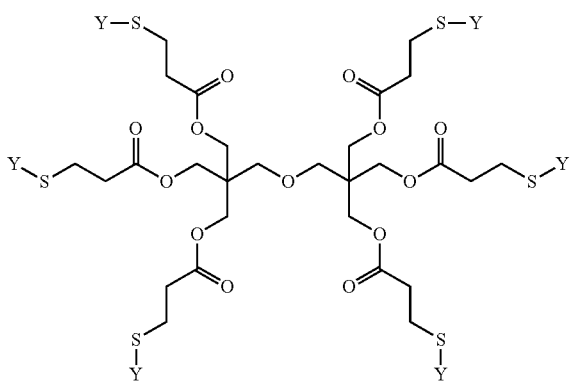

(X-11)

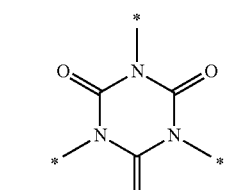

(X-12)

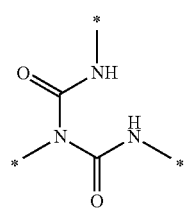

In Formula (X-1) to Formula (X-12), n represents an integer of 1 to 200, preferably an integer of 1 to 50, more preferably an integer of 1 to 15, particularly preferably an integer of 1 to 8.

In Formula (X-11) and Formula (X-12), * represents a linkage point.

In Formula (X-1) to Formula (X-10), Y represents the following (Y-1).

(Y-1)

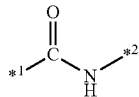

In (Y-1), *$^1$ represents a linkage point for S or O in (X-1) to (X-10), and *$^2$ represents a linkage point for $R^1$, $R^2$, or $R^3$ in Structure (1).

In Structure (1), $R^1$, $R^2$, and $R^3$ each independently represent a hydrocarbon group that has 5 to 15 carbon atoms and may have a cyclic structure.

The hydrocarbon groups in $R^1$, $R^2$, and $R^3$ may have a substituent, and examples of the substituent include hydrophilic groups.

Preferred examples of the hydrophilic groups include acidic groups and nonionic groups described in the later sections "Acidic group that can be included in shells" and "Hydrophilic group that can be included in shells".

Preferably, $R^1$, $R^2$, and $R^3$ each independently represent a group represented by any one of the following (R-1) to (R-20). In (R-1) to (R-20), * represents a linkage point.

(R-1)

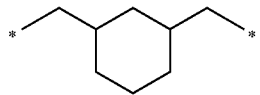

(R-2)

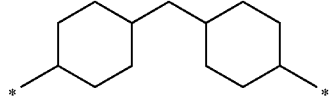

(R-3)

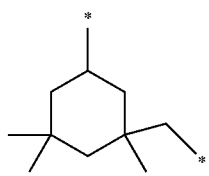

(R-4)

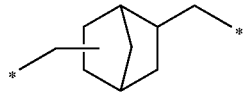

(R-5)

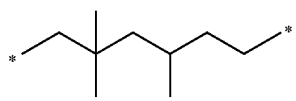

(R-6)

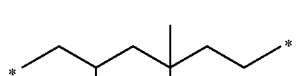

(R-7)

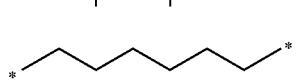

(R-8)

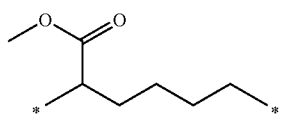

-continued

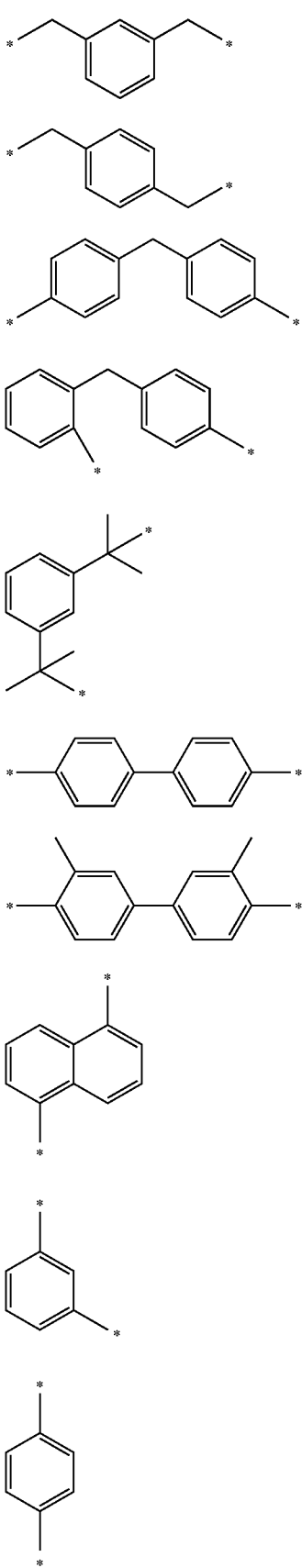

(R-9)
(R-10)
(R-11)
(R-12)
(R-13)
(R-14)
(R-15)
(R-16)
(R-17)
(R-18)

-continued

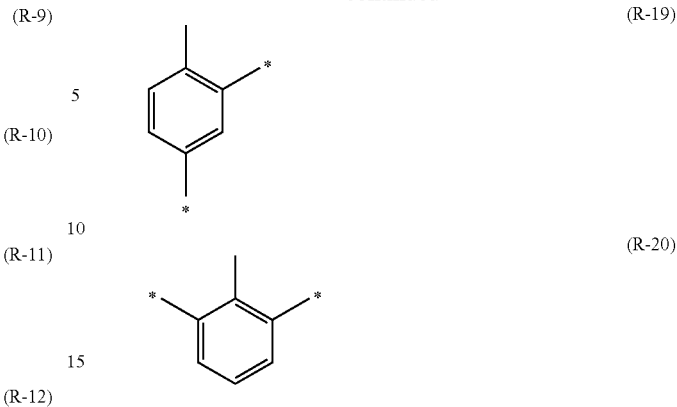

(R-19)

(R-20)

The content ratio of Structure (1) in the shells relative to the total mass of the shells is preferably 8 mass % to 100 mass %, more preferably 25 mass % to 100 mass %, still more preferably 50 mass % to 100 mass %.

The shells preferably include, as Structure (1), at least one of the following Structure (2), Structure (3) or Structure (4).

Structure (2)

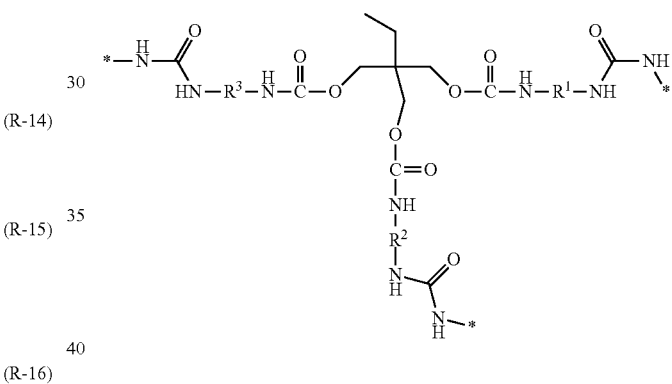

In Structure (2), $R^1$, $R^2$, and $R^3$ each independently represent a hydrocarbon group that has 5 to 15 carbon atoms and may have a cyclic structure.

In Structure (2), the hydrocarbon groups represented by $R^1$, $R^2$, and $R^3$ have the same definition and the same preferred range as in the hydrocarbon groups represented by $R^1$, $R^2$, and $R^3$ in Structure (1).

In Structure (2), * represents a linkage point.

Structure (3)

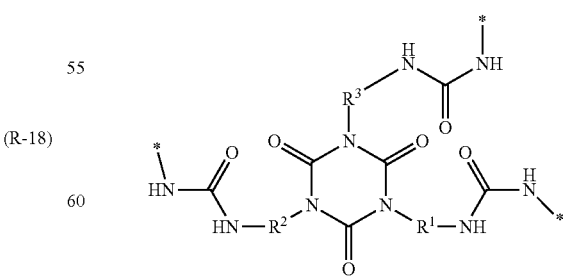

In Structure (3), $R^1$, $R^2$, and $R^3$ each independently represent a hydrocarbon group that has 5 to 15 carbon atoms and may have a cyclic structure.

In Structure (3), the hydrocarbon groups represented by $R^1$, $R^2$, and $R^3$ have the same definition and the same preferred range as in the hydrocarbon groups represented by $R^1$, $R^2$, and $R^3$ in Structure (1).

In Structure (3), * represents a linkage point.

Structure (4)

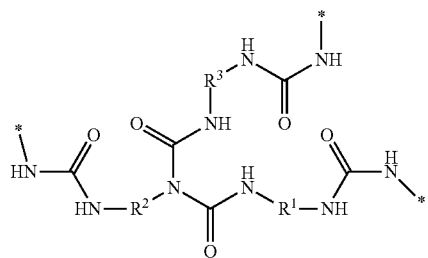

In Structure (4), $R^1$, $R^2$, and $R^3$ each independently represent a hydrocarbon group that has 5 to 15 carbon atoms and may have a cyclic structure.

In Structure (4), the hydrocarbon groups represented by $R^1$, $R^2$, and $R^3$ have the same definition and the same preferred range as in the hydrocarbon groups represented by $R^1$, $R^2$, and $R^3$ in Structure (1).

In Structure (4), * represents a linkage point.

Specific examples of Structure (1) to Structure (4) include structures described in the following Table 1.

TABLE 1

| | Structure (1) | | | | | | Corresponding |
|---|---|---|---|---|---|---|---|
| X | $R^1$ | $R^2$ | $R^3$ | p | n | m | structure |
| X-1 | R-1 | R-1 | R-1 | 1 | 1 | 1 | Structure (2) |
| X-1 | R-7 | R-7 | R-7 | 1 | 1 | 1 | Structure (2) |
| X-11 | R-1 | R-1 | R-1 | 1 | 1 | 1 | Structure (3) |
| X-11 | R-7 | R-7 | R-7 | 1 | 1 | 1 | Structure (3) |
| X-12 | R-7 | R-7 | R-7 | 1 | 1 | 1 | Structure (4) |

The three-dimensional cross-linked structures can be formed by a reaction of a tri- or higher functional isocyanate compound or a bifunctional isocyanate compound, and water or a compound having two or more active hydrogen groups.

In particular, when a raw material for producing the microcapsules includes at least one compound having three or more reactive groups (isocyanate groups or active hydrogen groups), a crosslinking reaction more effectively proceeds three-dimensionally, to form a three-dimensional network structure more effectively.

The three-dimensional cross-linked structures of the shells are preferably formed by a reaction of water and a tri- or higher functional isocyanate compound.

Tri- or Higher Functional Isocyanate Compound

The tri- or higher functional isocyanate compound is a compound intramolecularly having three or more isocyanate groups.

Examples of the tri- or higher functional isocyanate compound include tri- or higher functional aromatic isocyanate compounds and tri- or higher functional aliphatic isocyanate compounds.

In the present disclosure, such tri- or higher functional isocyanate compounds may be publicly known compounds or compounds synthesized by methods described later.

Examples of the publicly known compounds include compounds described in "Polyurethane resin handbook" (edited by Keiji IWATA, published by THE NIKKAN KOGYO SHIMBUN, LTD. (1987)).

The tri- or higher functional isocyanate compound is preferably a compound intramolecularly having three or more isocyanate groups, specifically, a compound represented by the following Formula (X).

$$X^1\text{-}(NCO)_n \qquad \text{Formula (X)}$$

In Formula (X), $X^1$ represents an n-valent organic group.

In Formula (X), n is 3 or more; n is preferably 3 to 10, more preferably 3 to 8, still more preferably 3 to 6.

The compound represented by Formula (X) is preferably a compound represented by the following Formula (11).

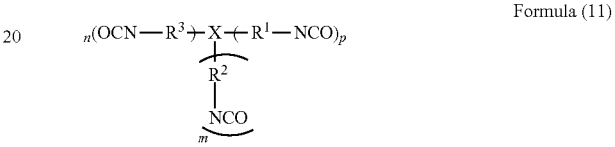

Formula (11)

In Formula (11), X, $R^1$, $R^2$, $R^3$, p, m, and n have the same definitions and the same preferred examples as in X, $R^1$, $R^2$, $R^3$, p, m, and n in Structure (1) above.

The tri- or higher functional isocyanate compound is preferably a compound derived from a bifunctional isocyanate compound (compound intramolecularly having two isocyanate groups).

More preferably, from the viewpoint of ease of formation of the three-dimensional cross-linked structure, the tri- or higher functional isocyanate compound is an isocyanate compound derived from at least one bifunctional isocyanate compound selected from the group consisting of isophorone diisocyanate, hexamethylene diisocyanate, trimethylhexamethylene diisocyanate, 1,3-bis(isocyanatomethyl)cyclohexane, m-xylylene diisocyanate, and dicyclohexylmethane 4,4'-diisocyanate.

This term "derived" means that such a bifunctional isocyanate compound is used as the raw material, and a structure derived from the bifunctional isocyanate compound is included.

Other preferred examples of the tri- or higher functional isocyanate compound include tri- or higher functional isocyanate compounds (adduct type) provided as adducts (addition products) from a bifunctional isocyanate compound (compound intramolecularly having two isocyanate groups) and a compound intramolecularly having three or more active hydrogen groups such as a tri- or higher functional polyol, polyamine, or polythiol; trimers (biuret type or isocyanurate type) of a bifunctional isocyanate compound; and compounds intramolecularly having three or more isocyanate groups such as benzene isocyanate-formalin condensate.

Such a tri- or higher functional isocyanate compound may be a mixture including a plurality of compounds; the mixture preferably includes, as a main component, a compound represented by the following Formula (11A) or Formula (11B), and may include other components.

Adduct Type

The adduct-type tri- or higher functional isocyanate compounds are preferably compounds represented by the following Formula (11A) or Formula (11B).

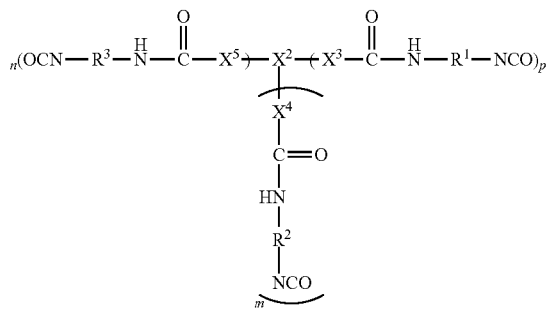

Formula (11A)

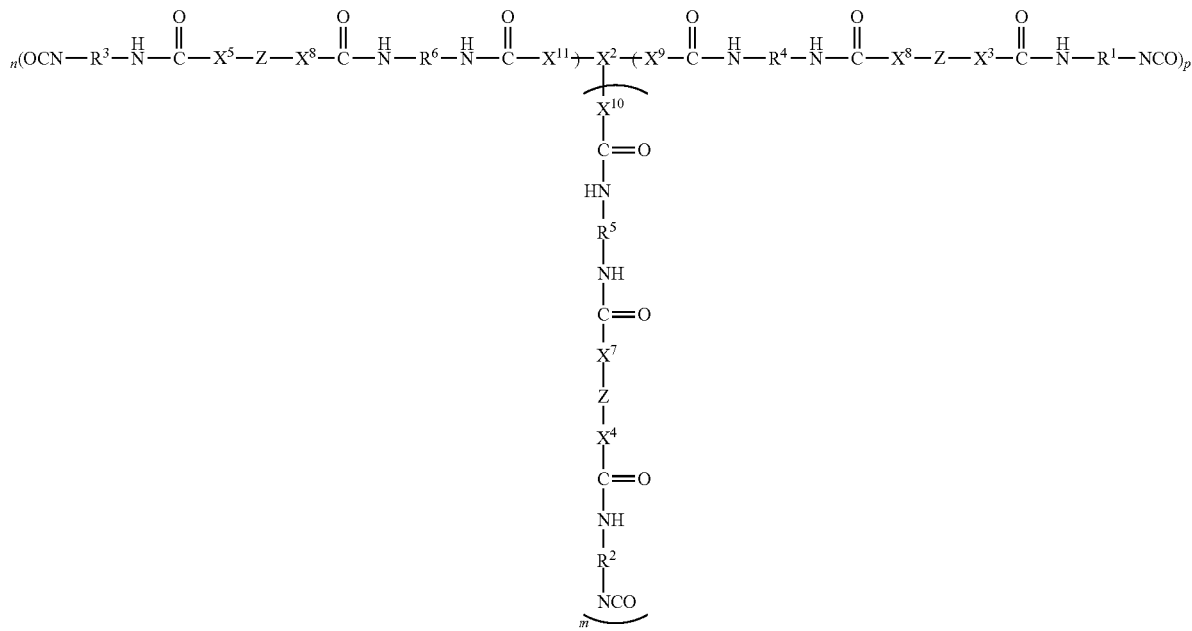

Formula (11B)

In Formula (11A) and Formula (11B), $X^2$ is a (p+m+n)-valent organic group, p, m, and n are each 0 or more, and p+m+n is 3 or more.

In Formula (11A) and Formula (11B), $X^3$ to $X^{11}$ each independently represent O, S, or NH.

In Formula (11A) and Formula (11B), $R^1$ to $R^6$ each independently represent a divalent organic group.

In Formula (11A) and Formula (11B), Z represents a divalent organic group.

In Formula (11A) and Formula (11B), $X^2$ is preferably a (p+m+n)-valent organic group that is a combination of at least two selected from the group consisting of a hydrocarbon group that may have a cyclic structure, —NH—, >N—, —C(=O)—, —O—, and —S—.

In Formula (11A) and Formula (11B), p+m+n is preferably 3 to 10, more preferably 3 to 8, still more preferably 3 to 6.

In Formula (11A) and Formula (11B), $X^3$ to $X^{11}$ each independently represent preferably O or S, more preferably O.

In Formula (11A) and Formula (11B), $R^1$ to $R^6$ each independently represent preferably a hydrocarbon group that has 5 to 15 carbon atoms and may have a cyclic structure.

In Formula (11A) and Formula (11B), $R^1$ to $R^6$ each independently have preferred examples the same as the preferred examples of $R^1$ in Structure (1).

In Formula (11A) and Formula (11B), when $X^2$ is a hydrocarbon group that may have a cyclic structure, examples of the cyclic structure include an alicyclic structure and an aromatic ring structure.

Examples of the alicyclic structure include a cyclohexane ring structure, a bicyclohexane ring structure, a bicyclodecane ring structure, an isobornene ring structure, a dicyclopentane ring structure, an adamantane ring structure, and a tricyclodecane ring structure.

Examples of the aromatic ring structure include a benzene ring structure, a naphthalene ring structure, and a biphenyl ring structure.

In Formula (11A) and Formula (11B), when $R^1$ to $R^6$ are hydrocarbon groups that have 5 to 15 carbon atoms and may have a cyclic structure, examples of the cyclic structure include an alicyclic structure and an aromatic ring structure.

Examples of the alicyclic structure include a cyclohexane ring structure, a bicyclohexane ring structure, a bicyclodecane ring structure, an isobornene ring structure, a dicyclopentane ring structure, an adamantane ring structure, and a tricyclodecane ring structure.

Examples of the aromatic ring structure include a benzene ring structure, a naphthalene ring structure, and a biphenyl ring structure.

In Formula (11A) and Formula (11B), the (p+m+n)-valent organic group represented by $X^2$ is preferably a group represented by any one of the following (X2-1) to (X2-10).

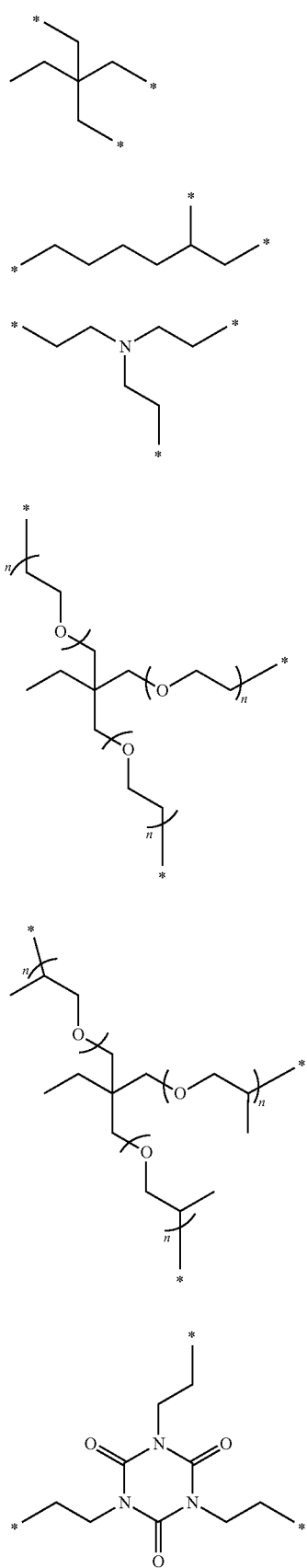
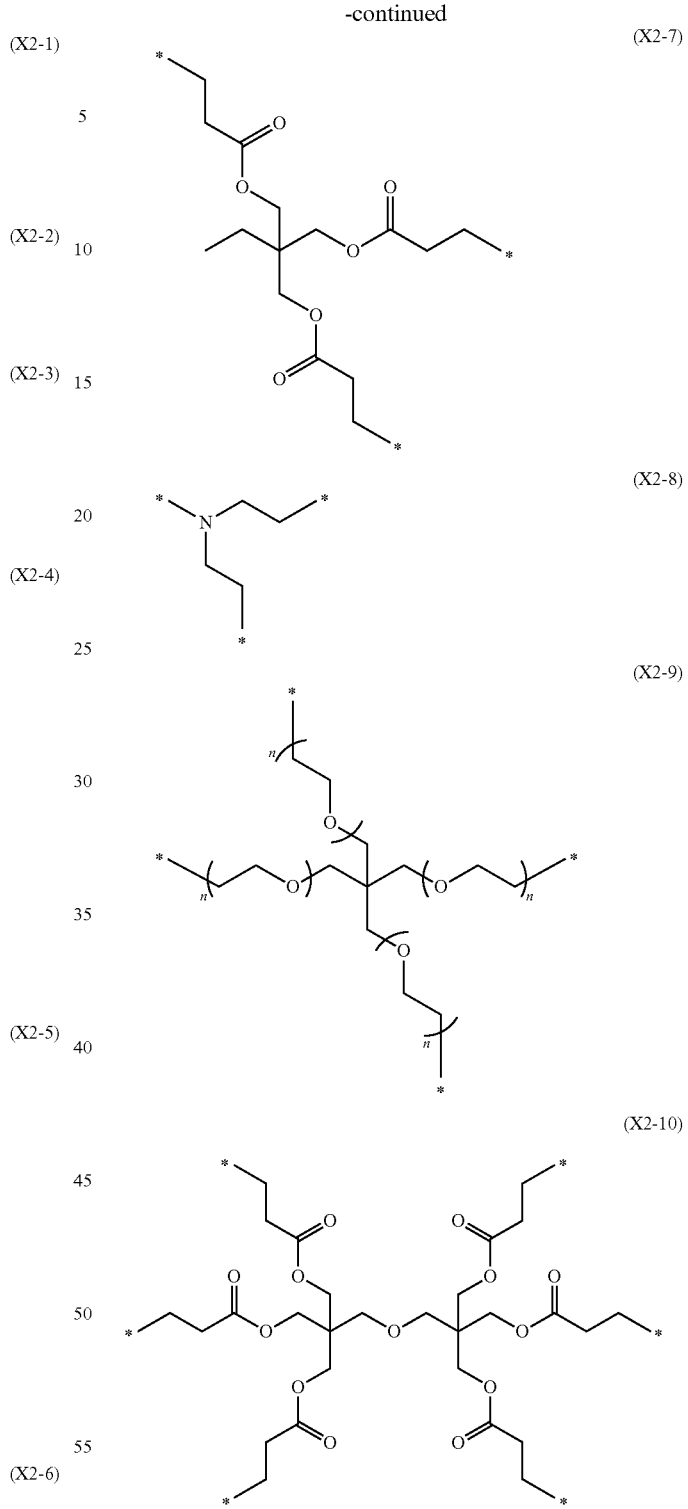
In Formula (X2-1) to Formula (X2-10), n represents an integer of 1 to 200, preferably an integer of 1 to 50, more preferably an integer of 1 to 15, particularly preferably an integer of 1 to 8.
In Formula (X2-1) to Formula (X2-10), * represents a linkage point.
In Formula (11B), the divalent organic group represented by Z is preferably a hydrocarbon group, a group having a polyoxyalkylene structure, a group having a polycaprolactone structure, a group having a polycarbonate structure, or a group having a polyester structure.

The hydrocarbon group in Z may be a linear hydrocarbon group, a branched hydrocarbon group, or a cyclic hydrocarbon group.

The hydrocarbon group in Z preferably has 2 to 30 carbon atoms.

In Formula (11A) and Formula (11B), $R^1$ to $R^6$ preferably each independently represent Group (R-1) to Group (R-20).

In Formula (11A) and Formula (11B), $R^1$ to $R^6$ more preferably each independently represent any one of Group (R-3) derived from isophorone diisocyanate (IPDI), Group (R-7) derived from hexamethylene diisocyanate (HDI), Group (R-5) derived from trimethylhexamethylene diisocyanate (TMHDI), Group (R-9) derived from m-xylylene diisocyanate (XDI), Group (R-1) derived from 1,3-bis(isocyanatomethyl)cyclohexane, and Group (R-2) derived from dicyclohexylmethane 4,4'-diisocyanate.

The compound represented by Formula (11A) is preferably a compound represented by the following Formula (11A-1).

The adduct-type tri- or higher functional isocyanate compound can be obtained in the following manner: for example, a compound intramolecularly having three or more active hydrogen groups and a bifunctional isocyanate compound are, in an organic solvent, heated (at 50° C. to 100° C.) under stirring, or stirred at low temperature (0° C. to 70° C.) with addition of a catalyst such as stannous octylate (Synthesis scheme 1 below).

In general, regarding the number of moles (the number of molecules) of a bifunctional isocyanate compound used to react with a compound intramolecularly having three or more active hydrogen groups, the number of moles (the number of molecules) of the bifunctional isocyanate compound is 0.6 or more times the number of moles of active hydrogen groups (the number of equivalents of active hydrogen groups) of the compound intramolecularly having three or more active hydrogen groups. The number of moles of the bifunctional isocyanate compound is preferably 0.6 times to 5 times, more preferably 0.6 times to 3 times, still more preferably 0.8 times to 2 times the number of moles of the active hydrogen groups.

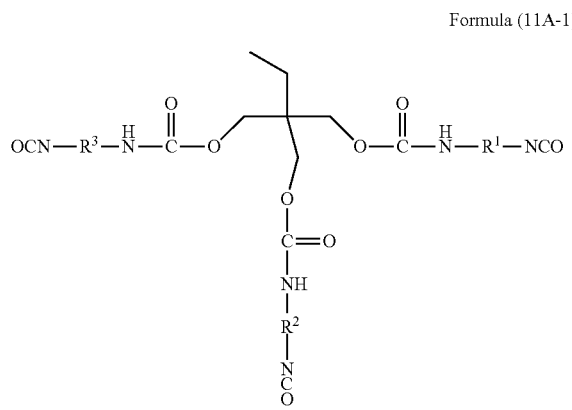

Formula (11A-1)

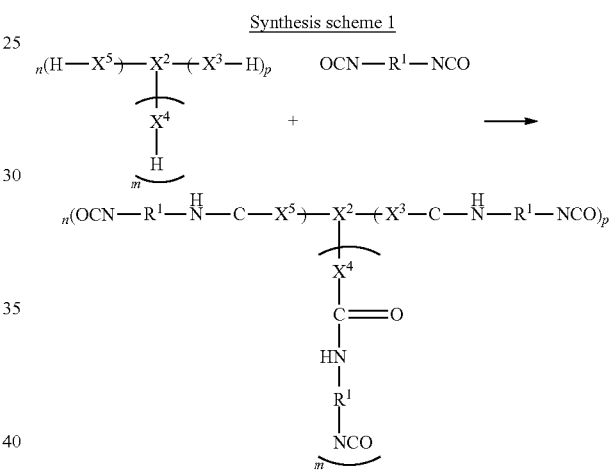

Synthesis scheme 1

In Formula (11A-1), $R^1$, $R^2$, and $R^3$ have the same definitions and the same preferred examples as in $R^1$, $R^2$, and $R^3$ in Formula (11A).

The adduct-type tri- or higher functional isocyanate compound can be synthesized by a reaction between a compound intramolecularly having three or more active hydrogen groups described later and a bifunctional isocyanate compound described later.

In this Specification, the active hydrogen group means a hydroxy group, a primary amino group, a secondary amino group, or a mercapto group.

Alternatively, the adduct-type tri- or higher functional isocyanate compound can be obtained by synthesizing an addition product (prepolymer; "(PP)" in the following Synthesis scheme) from a compound intramolecularly having two active hydrogen groups and a bifunctional isocyanate compound, and subsequently causing a reaction between this prepolymer and a compound intramolecularly having three or more active hydrogen groups (Synthesis scheme 2 below).

Synthesis scheme 2

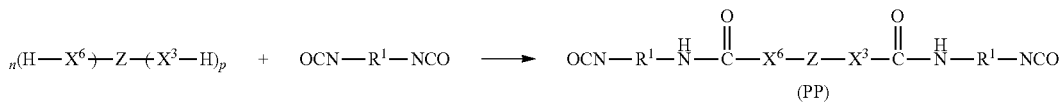

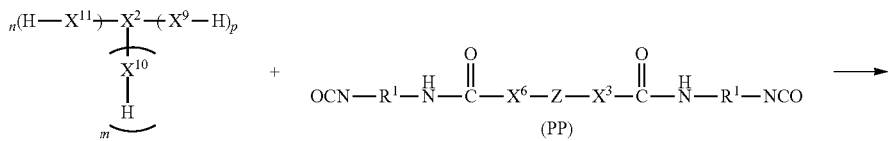

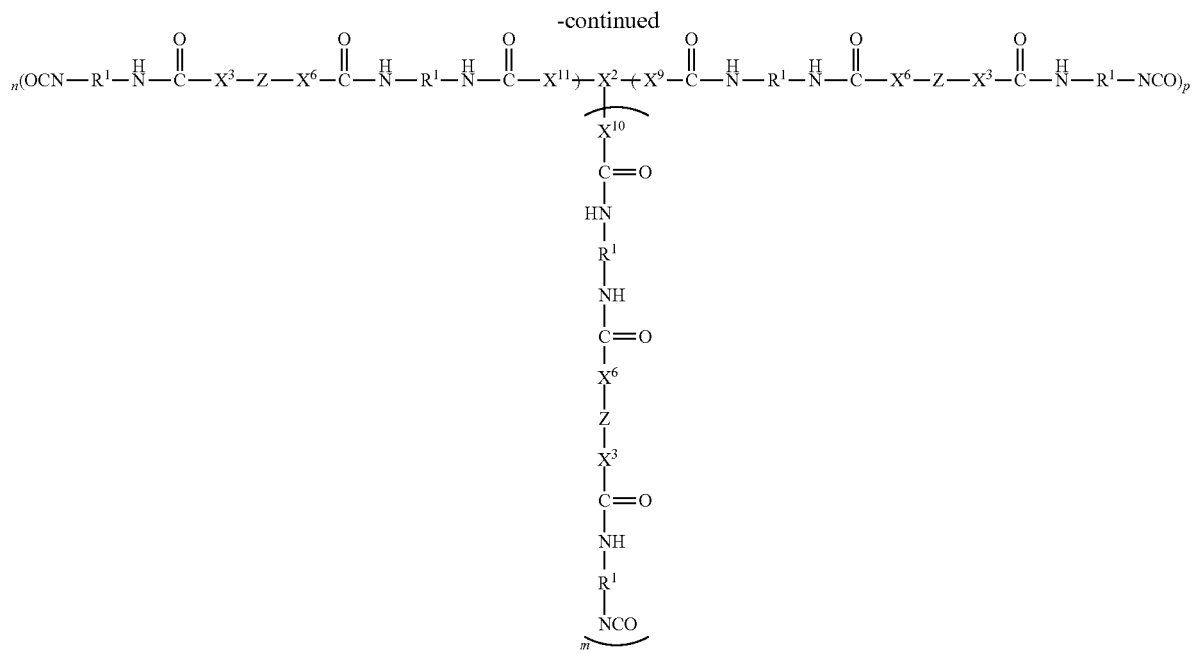

Examples of the bifunctional isocyanate compound include a bifunctional aromatic isocyanate compound and a bifunctional aliphatic isocyanate compound.

Specific examples of the bifunctional isocyanate compound include isophorone diisocyanate (IPDI), m-phenylene diisocyanate, p-phenylene diisocyanate, 2,6-tolylene diisocyanate, 2,4-tolylene diisocyanate (TDI), naphthalene-1,4-diisocyanate, diphenylmethane-4,4'-diisocyanate (MDI), 3,3'-dimethoxy-biphenyl diisocyanate, 3,3'-dimethyldiphenylmethane-4,4'-diisocyanate, m-xylylene diisocyanate (XDI), p-xylylene diisocyanate, 4-chloroxylylene-1,3-diisocyanate, 2-methylxylylene-1,3-diisocyanate, 4,4'-diphenylpropane diisocyanate, 4,4'-diphenylhexafluoropropane diisocyanate, trimethylene diisocyanate, hexamethylene diisocyanate (HDI), propylene-1,2-diisocyanate, butylene-1,2-diisocyanate, cyclohexylene-1,2-diisocyanate, cyclohexylene-1,3-diisocyanate, cyclohexylene-1,4-diisocyanate, dicyclohexylmethane-4,4'-diisocyanate, 1,4-bis(isocyanatomethyl)cyclohexane, 1,3-bis(isocyanatomethyl)cyclohexane (HXDI), norbornene diisocyanate (NBDI), trimethylhexamethylene diisocyanate (TMHDI), lysine diisocyanate, and 1,3-bis(2-isocyanato-2-propyl)benzene.

Of these bifunctional isocyanate compounds, preferred are compounds having structures represented by the following (I-1) to (I-24).

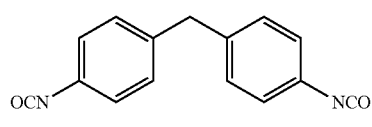
MDI
(I-1)

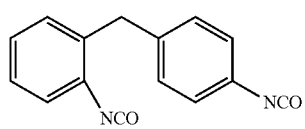
(I-2)

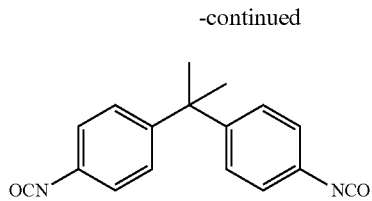
(I-3)

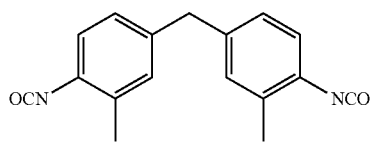
(I-4)

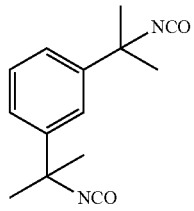
(I-5)

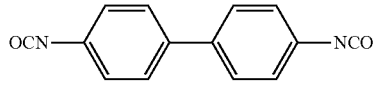
(I-6)

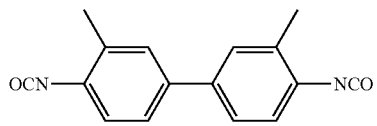
(I-7)

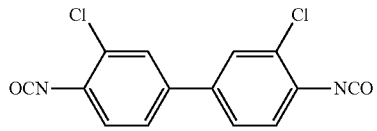
(I-8)

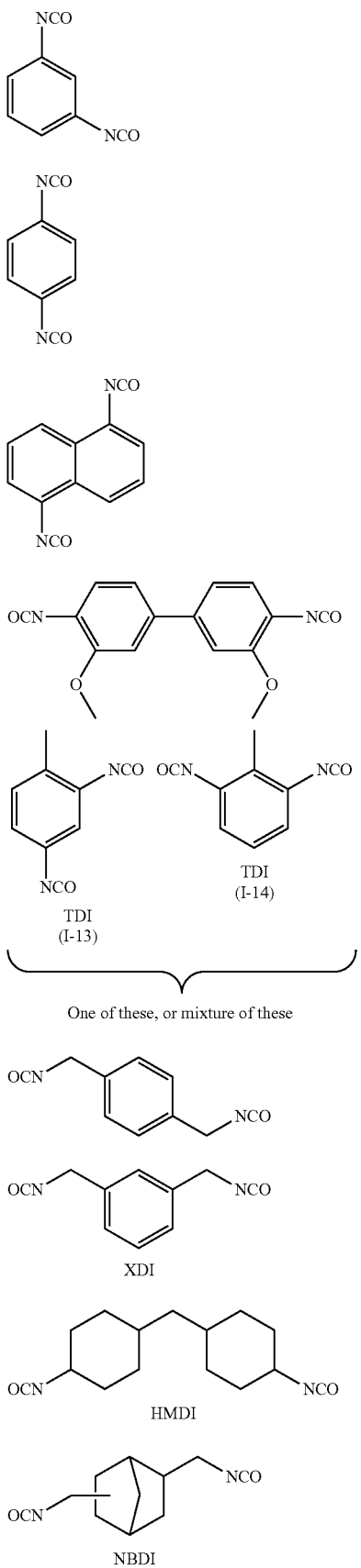

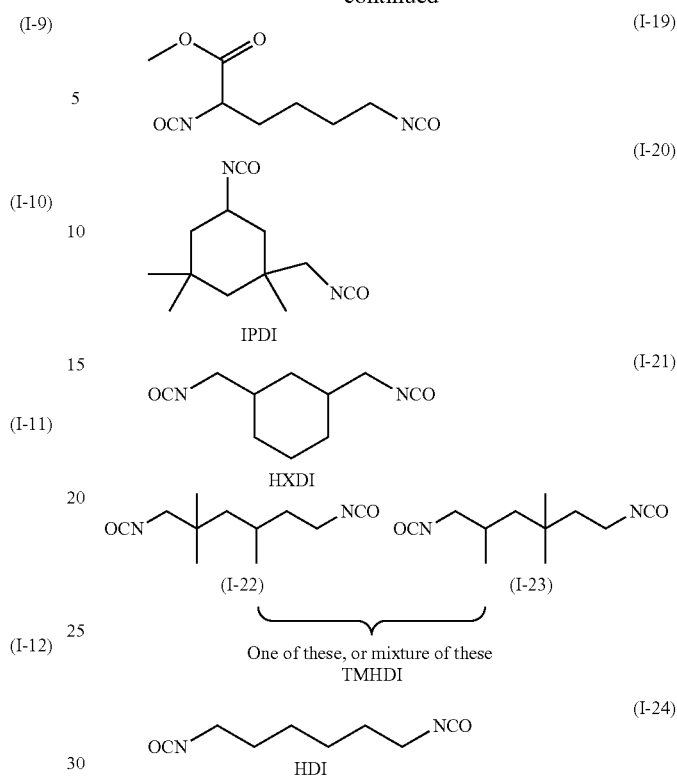

Of these, the bifunctional isocyanate compound is particularly preferably isophorone diisocyanate (IPDI), hexamethylene diisocyanate (HDI), trimethylhexamethylene diisocyanate (TMHDI), 1,3-bis(isocyanatomethyl)cyclohexane (HXDI), m-xylylene diisocyanate (XDI), or dicyclohexylmethane-4,4'-diisocyanate (HMDI).

The bifunctional isocyanate compound may be bifunctional isocyanate compounds derived from the above-described compounds. Examples include DURANATE (registered trademark) D101, D201, and A101 (Asahi Kasei Corporation).

The compound intramolecularly having three or more active hydrogen groups is a compound intramolecularly having three or more groups of at least one species selected from the group consisting of a hydroxy group, a primary amino group, a secondary amino group, and a mercapto group; examples include compounds having structures represented by the following (H-1) to (H-13). Incidentally, in the following structures, n represents an integer selected from the group consisting of 1 to 100.

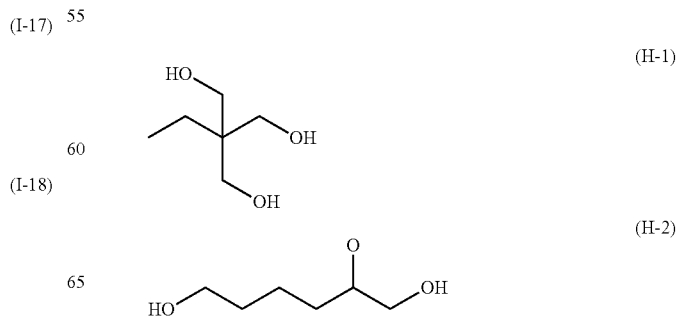

31
-continued
(H-3)
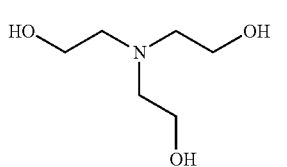
(H-4)
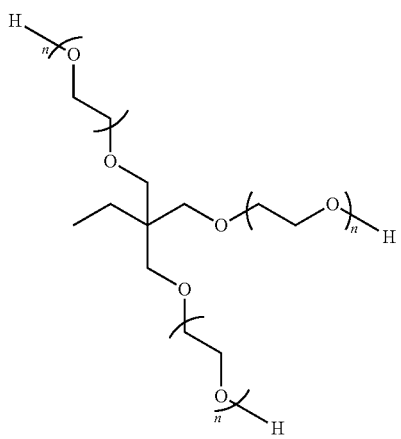
(H-4)
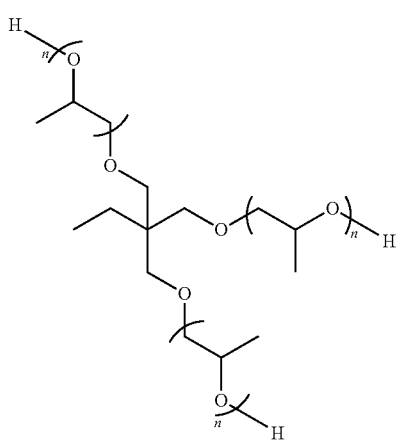
(H-6)
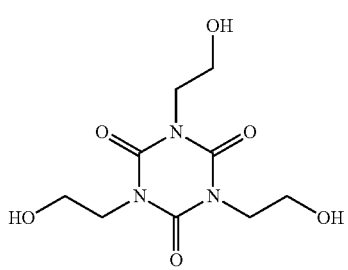
(H-7)
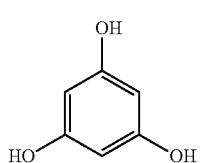
32
-continued
(H-8)
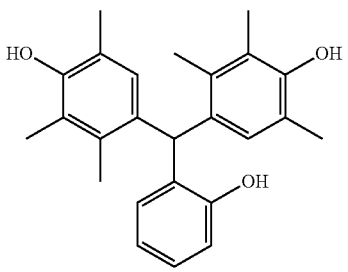
(H-9)
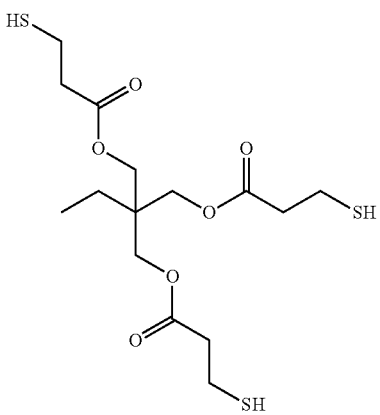
(H-10)
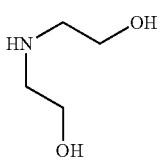
(H-11)
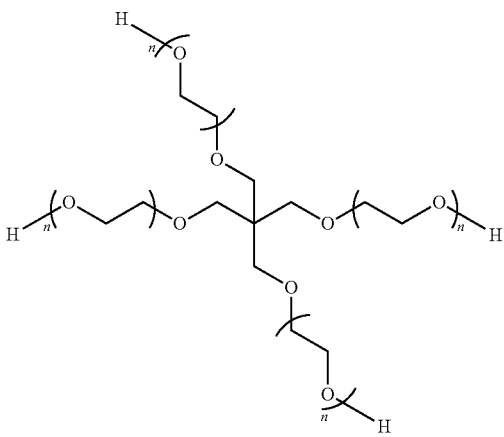
(H-12)
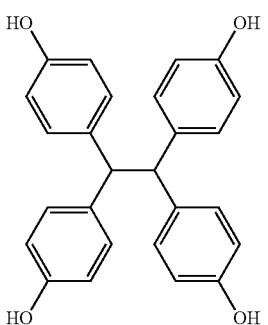

-continued

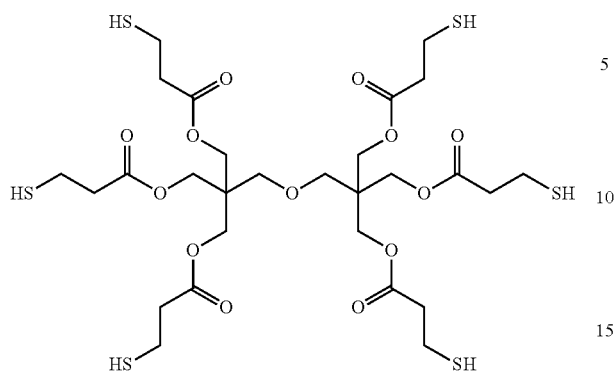

(H-13)

The adduct-type tri- or higher functional isocyanate compound is preferably a compound obtained by, in accordance with a combination described in the following Table 2, a reaction between a compound intramolecularly having two or more active hydrogen groups and a bifunctional isocyanate compound.

TABLE 2

| | Polyisocyanate structure | | Composition | |
|---|---|---|---|---|
| | | | Compound having two or more active | Bifunctional isocyanate compound |
| Compound No. | Compound having two or more active hydrogen groups | Bifunctional isocyanate compound | hydrogen groups (mol equivalent) | (mol equivalent) |
| NCO 101 | trimethylolpropane | 2,4-tolylene diisocyanate (TDI) | 1 | 4 |
| NCO 102 | | m-xylylene diisocyanate (XDI) | 1 | 4 |
| NCO 103 | | hexamethylene diisocyanate (HDI) | 1 | 4 |
| NCO 104 | | 1,3-bis(isocyanatomethyl) cyclohexane (HXDI) | 1 | 4 |
| NCO 105 | | isophorone diisocyanate (IPDI) | 1 | 4 |
| NCO 106 | 1,3,5-trihydroxybenzene | hexamethylene diisocyanate (HDI) | 1 | 4 |
| NCO 107 | | isophorone diisocyanate (IPDI) | 1 | 4 |
| NCO 108 | pentaerythritol ethylene oxide | 1,3-bis(isocyanatomethyl) cyclohexane (HXDI) | 1 | 5 |
| NCO 109 | | isophorone diisocyanate (IPDI) | 1 | 5 |

TABLE 2-continued

| Compound No. | Polyisocyanate structure: Compound having two or more active hydrogen groups | Bifunctional isocyanate compound | Composition: Compound having two or more active hydrogen groups (mol equivalent) | Bifunctional isocyanate compound (mol equivalent) |
|---|---|---|---|---|
| NCO 110 | dipentaerythritol hexakis(3-mercaptopropionate) | hexamethylene diisocyanate (HDI) | 1 | 7 |
| NCO 111 | dipentaerythritol hexakis(3-mercaptopropionate) | isophorone diisocyanate (IPDI) | 1 | 7 |
| NCO 112 | triethanolamine | hexamethylene diisocyanate (HDI) | 1 | 4 |
| NCO 113 | triethanolamine | isophorone diisocyanate (IPDI) | 1 | 4 |

Of the compounds in Table 2 above, the adduct-type tri- or higher functional isocyanate compound is more preferably NCO 102 to NCO 105, NCO 107, NCO 108, NCO 111, and NCO 113.

The adduct-type tri- or higher functional isocyanate compound may be a commercially available product on the market.

Examples of the commercially available product include TAKENATE (registered trademark) D-102, D-103, D-103H, D-103M2, P49-75S, D-110N, D-120N (isocyanate value=3.5 mmol/g), D-140N, D-160N (all from Mitsui Chemicals, Inc.), DESMODUR (registered trademark) L75, UL57SP (Sumika Bayer Urethane Co., Ltd.), CORONATE (registered trademark) HL, HX, L (Nippon Polyurethane Industry Co., Ltd.), and P301-75E (Asahi Kasei Corporation).

In particular, the adduct-type tri- or higher functional isocyanate compound is more preferably at least one selected from the group consisting of TAKENATE (registered trademark) D-110N, D-120N, D-140N, and D-160N from Mitsui Chemicals, Inc.

Isocyanurate Type or Biuret Type

The isocyanurate-type tri- or higher functional isocyanate compound is preferably a compound represented by Formula (11C).

The biuret-type tri- or higher functional isocyanate compound is preferably a compound represented by Formula (11D).

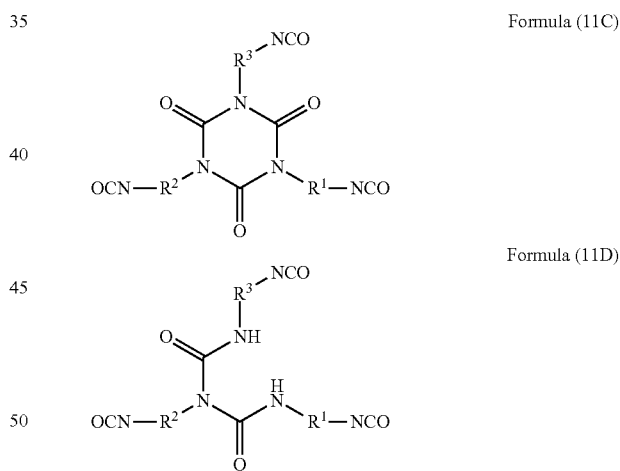

In Formula (11C) and Formula (11D), $R^1$, $R^2$, and $R^3$ each independently represent a divalent organic group.

In Formula (11C) and Formula (11D), preferably, $R^1$, $R^2$, and $R^3$ each independently represent an alkylene group that may have a substituent having 1 to 20 carbon atoms, a cycloalkylene group that may have a substituent having 1 to 20 carbon atoms, or an arylene group that may have a substituent having 1 to 20 carbon atoms.

In Formula (11C) and Formula (11D), particularly preferably, $R^1$, $R^2$, and $R^3$ each independently represent a group selected from the group consisting of the above-described groups represented by (R-1) to (R-20).

In Formula (11C) and Formula (11D), $R^1$ to $R^3$ more preferably each independently represent any one of Group (R-3) derived from isophorone diisocyanate (IPDI), Group (R-7) derived from hexamethylene diisocyanate (HDI), Group (R-5) derived from trimethylhexamethylene diisocyanate (TMHDI), Group (R-9) derived from m-xylylene diisocyanate (XDI), Group (R-1) derived from 1,3-bis(isocyanatomethyl)cyclohexane, and Group (R-2) derived from dicyclohexylmethane 4,4'-diisocyanate.

The isocyanurate-type tri- or higher functional isocyanate compound may be a commercially available product on the market. Examples of the commercially available product of the isocyanurate-type tri- or higher functional isocyanate compound include TAKENATE (registered trademark) D-127N, D-170N, D-170HN, D-172N, D-177N (Mitsui Chemicals, Inc.), SUMIDUR N3300, DESMODUR (registered trademark) N3600, N3900, Z4470BA (Sumika Bayer Urethane Co., Ltd.), CORONATE (registered trademark) HX, HK (Nippon Polyurethane Industry Co., Ltd.), DURANATE (registered trademark) TPA-100, TKA-100, TSA-100, TSS-100, TLA-100, and TSE-100 (Asahi Kasei Corporation).

The biuret-type tri- or higher functional isocyanate compound may be a commercially available product on the market. Examples of the commercially available product of the biuret-type tri- or higher functional isocyanate compound include TAKENATE (registered trademark) D-165N, NP1100 (Mitsui Chemicals, Inc.), DESMODUR (registered trademark) N3200 (Sumika Bayer Urethane Co., Ltd.), and DURANATE (registered trademark) 24A-100 (Asahi Kasei Corporation).

Of the isocyanurate-type or biuret-type tri- or higher functional isocyanate compounds, more preferred are DURANATE (registered trademark) 24A-100, TKA-100, TSS-100, TSE-100 (all from Asahi Kasei Corporation), and TAKENATE (registered trademark) D-127N (Mitsui Chemicals, Inc.).

The isocyanate-group content per gram of the tri- or higher functional isocyanate compound (unit: mmol/g; hereafter, also referred to as "isocyanate value") is preferably 1 mmol/g to 10 mmol/g, more preferably 1.5 mmol/g to 8 mmol/g, still more preferably 2 mmol/g to 6 mmol/g.

The isocyanate-group content can be calculated in the following manner: a target isocyanate compound is dissolved in dehydrated toluene, subsequently caused to react with an excess of a di-n-butylamine solution added; the remaining di-n-butylamine is subjected to back titration with hydrochloric acid; and, from the titer at the inflection point on the titration curve, the isocyanate-group content can be calculated.

More specifically, the calculation is performed by the following method.

Neutralization titration is performed with a potentiometric titrator (AT-510, Kyoto Electronics Manufacturing Co., Ltd.) at 25° C. with a 1 mol/L aqueous solution of hydrochloric acid in accordance with the following methods of blank measurement and sample measurement. From the obtained titers Z1 and Z2, the isocyanate-group content can be calculated with the following Formula (N).

Isocyanate-group content (mmol/g)=(Z1−Z2)/(W×Y)   Formula (N)

In Formula (N), Z1 represents the titer of a blank, Z2 represents the titer of a sample, W represents the solid content of the sample, and Y represents the mass of the sample.

Blank Measurement

To a 100 mL beaker, 10 mL of dehydrated toluene, 10.0 mL of a 2 mol/L di-n-butylamine solution, and 50 mL of isopropyl alcohol are added and mixed to prepare a mixed solution. This mixed solution is subjected to neutralization titration with a 1 mol/L hydrochloric acid solution. The end point is taken as the inflection point on the titration curve, and titer Z1 (mL) to the end point is determined.

Sample Measurement

A sample having a solid content of W mass % (isocyanate compound, Y g) is sampled to a 100 mL beaker. To this beaker, 20 (mL) of dehydrated toluene is added to dissolve the sample, to prepare a solution. To this solution, 10.0 mL of a 2 mol/L di-n-butylamine solution is added, and the solution is mixed and subsequently left to stand for 20 or more minutes. To the solution having been left to stand, 50 mL of isopropyl alcohol is added. Subsequently, neutralization titration is performed with a 1 mol/L hydrochloric acid solution. The end point is taken as the inflection point on the titration curve, and titer Z2 (mL) to the end point is determined.

Water or Compound Having Two or More Active Hydrogen Groups

The shells of the microcapsules can be formed by a reaction between the above-described tri- or higher functional isocyanate compound and water or a compound having two or more active hydrogen groups.

The compound generally used to react with the tri- or higher functional isocyanate compound is water. The reaction between the tri- or higher functional isocyanate compound and water results in formation of a three-dimensional cross-linked structure having a urea bond.

Alternatively, another compound (other than water) that may be used to react with the tri- or higher functional isocyanate compound is a compound having two or more active hydrogen groups.

Examples of such an active hydrogen group include a hydroxy group, amino groups (primary amino groups and secondary amino groups), and a mercapto group.

Examples of the compound having two or more active hydrogen groups include polyfunctional alcohols, polyfunctional phenols, polyfunctional amines having hydrogen atoms on nitrogen atoms, and polyfunctional thiols.

A reaction between the tri- or higher functional isocyanate compound and a polyfunctional alcohol or a polyfunctional phenol results in formation of a three-dimensional cross-linked structure having a urethane bond.

A reaction between the tri- or higher functional isocyanate compound and a polyfunctional amine having hydrogen atoms on nitrogen atoms results in formation of a three-dimensional cross-linked structure having a urea bond.

Specific examples of the polyfunctional alcohols include propylene glycol, glycerol, trimethylolpropane, and 4,4',4"-trihydroxytriphenylmethane.

Specific examples of the polyfunctional amines include lysine, diethylenetriamine, and tetraethylenepentamine.

Specific examples of the polyfunctional thiols include 1,3-propanedithiol and 1,2-ethanedithiol.

Specific examples of the polyfunctional phenols include bisphenol A.

Such compounds having two or more active hydrogen groups may be used alone or in combination of two or more thereof.

Incidentally, the compound having two or more active hydrogen groups also includes the above-described compound intramolecularly having three or more active hydrogen groups.

Acidic Group that can be Included in Shells

In the ink composition according to the present disclosure, the three-dimensional cross-linked structures of the shells may have at least one acidic group. Examples of the acidic group include a carboxy group, a sulfo group, a phosphate group, and a phosphonate group. The microcapsules thus have an acidic group, so that enhanced dispersion stability of the microcapsules is provided.

The shells may include a single acidic group species alone, or may include two or more acidic group species.

The acidic group is preferably introduced into the shells via at least one of a urethane bond or a urea bond, more preferably introduced into the shells via a urea bond.

A urea bond is less hydrolyzable than a urethane bond. Thus, an acidic group introduced into the shells via a urea bond is more strongly bonded to the three-dimensional cross-linked structures of the shells than an acidic group introduced into the shells via a urethane bond. For this reason, an ink composition that contains microcapsules in which an acidic group contributing to dispersibility is introduced into the shells via a urea bond has higher dispersion stability of the microcapsules, in particular, higher long-term dispersion stability (namely, preservation stability).

In the ink composition, from the viewpoint of the dispersion stability of the microcapsules, the three-dimensional cross-linked structures having an acidic group preferably include the structure represented by the following Formula (A) or Formula (B).

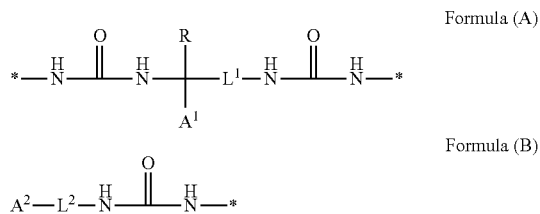

In Formula (A) and Formula (B), $A^1$ and $A^2$ each represent an unneutralized acidic group or a neutralized acidic group; $L^1$ and $L^2$ each represent a divalent linking group. * represents a linkage point.

In Formula (A), R represents a hydrogen atom or an alkyl group having 1 to 10 carbon atoms.

In $A^1$ and $A^2$, the "unneutralized acidic group" may be a carboxy group, a sulfonic group, a phosphate group, or a phosphonate group, preferably a carboxy group. In A, the "neutralized acid group" is an acidic group that has been turned into salt through neutralization of an unneutralized acidic group with a basic compound (neutralizer); examples include salts of a carboxy group, salts of a sulfonic group, salts of a phosphate group, and salts of a phosphonate group. Examples of the "salts" include alkali metal salts [such as sodium salts, potassium salts, and lithium salts], triethylamine salts, dimethylethanolamine salts, and pyridine salts. Of these, the "salts" are preferably alkali metal salts, more preferably sodium salts or potassium salts.

In R, the alkyl group having 1 to 10 carbon atoms is preferably an alkyl group having 1 to 10 carbon atoms (preferably 1 to 6 carbon atoms). The alkyl group having 1 to 10 carbon atoms may be a linear alkyl group, a branched alkyl group, or an alkyl group having an alicyclic structure (such as a cycloalkyl group). In R, preferred examples of the alkyl group having 1 to 10 carbon atoms include a methyl group, an ethyl group, a propyl group, a butyl group, and a cyclohexyl group. R is preferably a hydrogen atom.

In $L^1$ and $L^2$, the divalent linking group is preferably an alkylene group having 1 to 10 carbon atoms, an aromatic group having 5 to 10 carbon atoms, or a divalent group that is a combination of two or more groups selected from the group consisting of the alkylene group and the aromatic group.

The alkylene group having 1 to 10 carbon atoms may be a linear alkylene group, a branched alkylene group, or an alkylene group having an alicyclic structure (such as a cycloalkylene group). Examples of the alkylene group having 1 to 10 carbon atoms include a methylene group, an ethylene group, a propylene group, a butylene group, and a cyclohexylene group.

Examples of the aromatic group having 5 to 10 carbon atoms include a phenylene group.

In particular, the divalent linking group in $L^1$ and $L^2$ is more preferably an alkylene group having 1 to 10 carbon atoms, still more preferably an alkylene group having 1 to 6 carbon atoms.

In particular, Formula (A) preferably has $A^1$ being a carboxy group, R being a hydrogen atom, and $L^1$ being an alkylene group having 1 to 6 carbon atoms. Formula (B) preferably has $A^2$ being a carboxy group, and $L^2$ being an alkylene group having 1 to 6 carbon atoms. Particularly preferably, the three-dimensional cross-linked structures having an acidic group include the structure represented by Formula (A).

Method for Introducing Neutralized Acidic Group into Shells

The method for introducing an acidic group into the shells is, for example, as follows: during formation of three-dimensional cross-linked structures having at least one bond species selected from the group consisting of a urethane bond and a urea bond, a reaction is caused among the above-described tri- or higher functional isocyanate compound, water or a compound having two or more active hydrogen groups, and a compound having an acidic group and an active hydrogen group, an acid dissociation constant of 5 or less, and a molecular weight of 2000 or less.

The method for introducing a neutralized acidic group into the shells is, for example, as follows: during production of the above-described tri- or higher functional isocyanate compound, a reaction is caused between the above-described bi- or higher functional isocyanate compound and a compound having an acidic group and an active hydrogen group, an acid dissociation constant of 5 or less, and a molecular weight of 2000 or less, to produce a bi- or higher functional isocyanate compound having an introduced acidic group; and, subsequently, a reaction is caused between the bi- or higher functional isocyanate compound having an introduced acidic group and water or the above-described compound having two or more active hydrogen groups.

Hydrophilic Group that can be Included in Shells

The shells may further have a hydrophilic group other than the above-described acidic group.

The hydrophilic group is preferably a nonionic group. When the shells further have, as the hydrophilic group, a nonionic group, the combination of the dispersing effect due to the above-described acidic group and the dispersing effect due to the nonionic group as the hydrophilic group results in more enhanced dispersion stability of the microcapsules in the ink composition.

From the viewpoint of further enhancing the dispersion stability of the microcapsules of the ink composition, the nonionic group is preferably a group having a polyether structure, preferably a monovalent group including a polyalkyleneoxy chain, more preferably a group represented by the following Formula (WS).

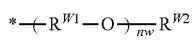
Formula (WS)

In Formula (WS), $R^{W1}$ represents an alkylene group that has 1 to 6 carbon atoms and may be branched; $R^{W2}$ represents an alkyl group that has 1 to 6 carbon atoms and may be branched; nw represents an integer of 2 to 200; and * represents a linkage point.

In Formula (WS), in $R^{W1}$, the number of carbon atoms of the alkylene group that has 1 to 6 carbon atoms and may be branched is preferably 2 to 4, more preferably 2 or 3, particularly preferably 2 (in other words, $R^{W1}$ is an ethylene group).

In Formula (WS), in $R^{W2}$, the number of carbon atoms of the alkyl group that has 1 to 6 carbon atoms and may be branched is preferably 1 to 4, particularly preferably 1 (in other words, $R^{W2}$ is a methyl group).

In Formula (WS), nw represents an integer of 2 to 200; however, nw is preferably an integer of 10 to 200, more preferably an integer of 10 to 150, still more preferably an integer of 20 to 150, particularly preferably an integer of 20 to 100.

The hydrophilic group can be introduced into the shells by a reaction among the above-described tri- or higher functional isocyanate compound, water or a compound having two or more active hydrogen groups, and a compound having a hydrophilic group.

Alternatively, the hydrophilic group can also be introduced into the shells in the following manner: a reaction is first caused between a bi- or higher functional isocyanate compound and a compound having a hydrophilic group, to produce an isocyanate compound having an introduced hydrophilic group; subsequently, a reaction is caused between this isocyanate compound having an introduced hydrophilic group and a compound having two or more active hydrogen groups, to produce a tri- or higher functional isocyanate compound having an introduced hydrophilic group; and, subsequently, a reaction is caused between this tri- or higher functional isocyanate compound having an introduced hydrophilic group, and water or a compound having two or more active hydrogen groups.

Compound Having Hydrophilic Group

Of the compounds having a hydrophilic group, the compound having a nonionic group is preferably a compound having a polyether structure, more preferably a compound having a polyoxyalkylene chain.

Examples of the compound having a polyoxyalkylene chain include polyethylene oxide, polypropyleneoxide, polytetramethylene oxide, polystyrene oxide, polycyclohexylene oxide, polyethylene oxide-polypropylene oxide-block copolymers, and polyethylene oxide-polypropylene oxide random copolymers.

Of these, the compound having a polyoxyalkylene chain is preferably at least one compound selected from the group consisting of polyethylene oxide, polypropylene oxide, and polyethylene oxide-polypropylene oxide block copolymers, more preferably polyethylene oxide.

The compound having a polyether structure is preferably at least one compound selected from the group consisting of monoethers of polyethylene oxide (such as monomethyl ether and monoethyl ether) and monoesters of polyethylene oxide (such as monoacetate and mono(meth)acrylate).

Isocyanate Compound Having Introduced Hydrophilic Group

As described above, a hydrophilic group can be introduced into the shells also by using an isocyanate compound having an introduced hydrophilic group.

The isocyanate compound having an introduced hydrophilic group is preferably a reaction product prepared from a compound having a hydrophilic group and isophorone diisocyanate (IPDI), hexamethylene diisocyanate (HDI), trimethylhexamethylene diisocyanate (TMHDI), 1,3-bis(isocyanatomethyl)cyclohexane (HXDI), m-xylylene diisocyanate (XDI), or dicyclohexylmethane-4,4'-diisocyanate (HMDI).

When a group having a polyether structure is introduced into the shells, the isocyanate compound having an introduced group having a polyether structure is preferably an addition product prepared from a compound having two or more active hydrogen groups, a bifunctional isocyanate compound, and a compound having a polyether structure.

Preferred examples of the compound having two or more active hydrogen groups and the bifunctional isocyanate compound are described above.

The compound having a polyether structure is preferably a compound represented by the following Formula (WM).

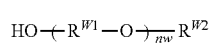
Formula (WM)

In Formula (WM), $R^{W1}$, $R^{W2}$, and nw have the same definitions and the same preferred examples as in the above-described $R^{W1}$, $R^{W2}$, and nw in Formula (W).

The addition product prepared from a compound having two or more active hydrogen groups, a bifunctional isocyanate compound, and a compound having a polyether structure is preferably an addition product prepared from trimethylolpropane (TMP), m-xylylene diisocyanate (XDI), and polyethylene glycol monomethyl ether (EO) (for example, TAKENATE (registered trademark) D-116N from Mitsui Chemicals, Inc.).

When a hydrophilic group is introduced into the shells by using a compound having a hydrophilic group, the amount of the compound having a hydrophilic group used relative to the total solid content of the microcapsules is preferably 0.1 mass % to 50 mass %, more preferably 0.1 mass % to 45 mass %, still more preferably 0.1 mass % to 40 mass %, still more preferably 1 mass % to 35 mass %, still more preferably 3 mass % to 30 mass %.

Polymerizable Group that can be Included in Shells

As described above, the microcapsules have a polymerizable group in at least one of the core or the shell.

When microcapsules have a polymerizable group, irradiation with an active energy ray causes adjacent microcapsules to be bonded together to form a cross-linked structure. This enables formation of a film having a high degree of crosslinking and high hardness.

The microcapsules may have such a polymerizable group in a form in which a polymerizable group is introduced into the three-dimensional cross-linked structures of the shells, or may have such a polymerizable group in a form in which the cores include a polymerizable compound (in other words, a compound having a polymerizable group). Alternatively, the microcapsules may have a polymerizable group in both of these forms.

Examples of a method for introducing a polymerizable group into the three-dimensional cross-linked structures of the shells include: during formation of three-dimensional cross-linked structures having at least one bond species selected from the group consisting of a urethane bond and a urea bond, a method of causing a reaction among the above-described tri- or higher functional isocyanate compound, water or the above-described compound having two or more active hydrogen groups, and a polymerizable compound serving as a compound for introducing a polymerizable group; during production of the above-described tri- or higher functional isocyanate compound, a method of causing a reaction between the above-described bi- or higher functional isocyanate compound and a polymerizable compound serving as a compound for introducing a polymerizable group, to produce an isocyanate compound having an introduced polymerizable group, and subsequently causing a reaction between the isocyanate compound having an introduced polymerizable group, and water or the above-described compound having two or more active hydrogen groups; and during production of the microcapsules, a method of dissolving, in an oil phase, the constituent components of the microcapsules, and a polymerizable compound serving as a compound for introducing a polymerizable group, adding an aqueous phase to the oil phase, performing mixing, and performing emulsification.

The polymerizable compound used for introducing a polymerizable group into the three-dimensional cross-linked structures of the shells may be a compound having at least one active hydrogen group and having, in at least one of the terminals, an ethylenically unsaturated bond.

The compound having at least one active hydrogen group and having, in at least one of the terminals, an ethylenically unsaturated bond can be represented by the following Formula (a)

$$L^1 Lc_m Z_m \quad (a)$$

In Formula (a), $L^1$ represents an m+n-valent linking group; m and n each independently represent an integer selected from the group consisting of 1 to 100; Lc represents a monovalent ethylenically unsaturated group; and Z represents an active hydrogen group.

$L^1$ preferably represents a di- or higher valent aliphatic group, a di- or higher valent aromatic group, a di- or higher valent heterocyclic group, —O—, —S—, —NH—, —N<, —CO—, —SO—, —SO$_2$—, or a combination of the foregoing.

Preferably, m and n each independently represent 1 to 50, more preferably 2 to 20, still more preferably 3 to 10, particularly preferably 3 to 5.

Examples of the monovalent ethylenically unsaturated group represented by Lc include an allyl group, a vinyl group, an acryloyl group, and a methacryloyl group.

Z is preferably OH, SH, NH, or NH$_2$, more preferably OH or NH$_2$, still more preferably OH.

The following are examples of the compound having at least one active hydrogen group and having, in at least one of the terminals, an ethylenically unsaturated bond; however, the compound is not limited to these structures. Incidentally, in Compounds (a-3) and (a-14), n represents an integer selected from the group consisting of 1 to 90, for example.

-continued
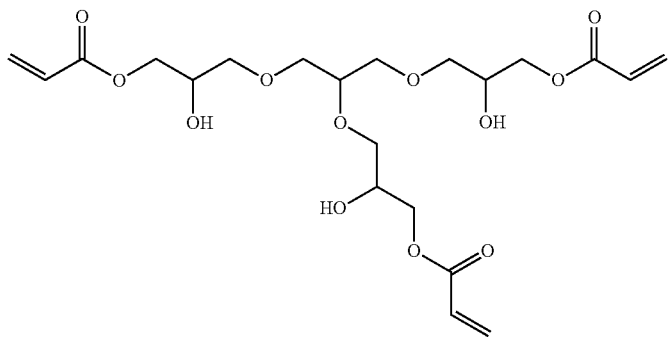
DA-314 (a-7)
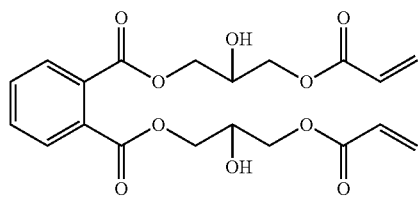
DA-721 (a-8)
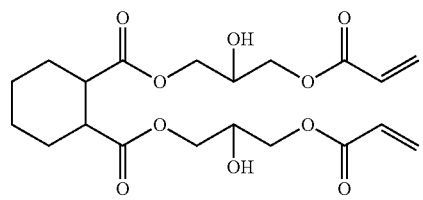
DA-722 (a-9)
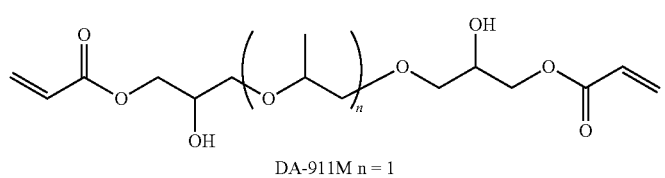
DA-911M n = 1 (a-10)
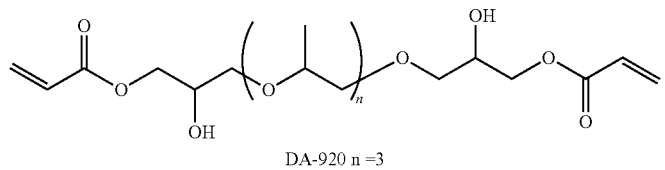
DA-920 n = 3 (a-11)
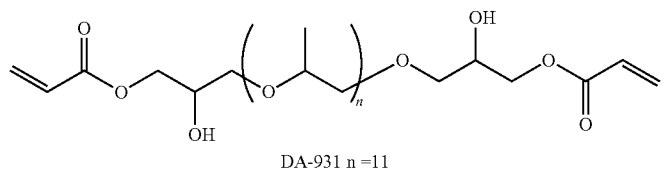
DA-931 n = 11 (a-12)
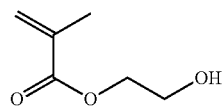
(a-13)
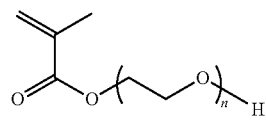
(a-14)
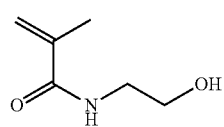
(a-15)
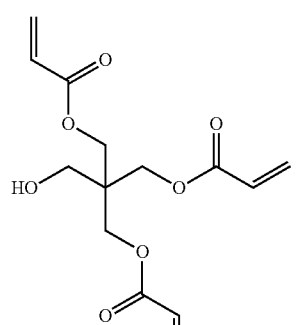
A-TMM-3L (a-16)

-continued

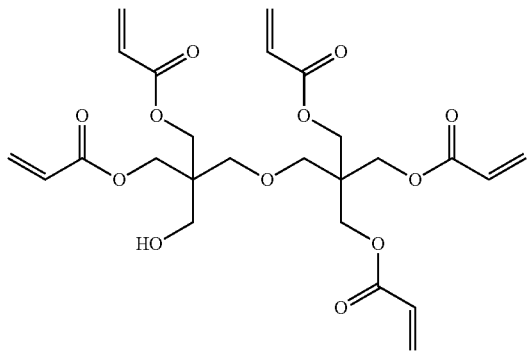

SR399E (a-17)

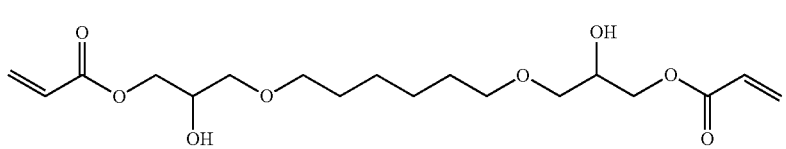

(a-18)

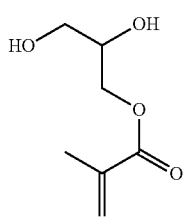

(a-19)

The compound having at least one active hydrogen group and having, in at least one of the terminals, an ethylenically unsaturated bond may be a commercially available product on the market.

Examples of the commercially available product include acrylates such as hydroxyethyl acrylate (OSAKA ORGANIC CHEMICAL INDUSTRY LTD.), 4-hydroxybutyl acrylate, 1,4-cyclohexanedimethanol monoacrylate (all from Nippon Kasei Chemical Company Limited), BLEMMER (registered trademark) AE-90U (n=2), AE-200 (n=4.5), AE-400 (n=10), AP-150 (n=3), AP-400 (n=6), AP-550 (n=9), AP-800 (n=13) (all from NOF CORPORATION), DENACOL (registered trademark) ACRYLATE DA-212, DA-250, DA-314, DA-721, DA-722, DA-911M, DA-920, DA-931 (all from Nagase ChemteX Corporation); methacrylates such as 2-hydroxyethyl methacrylate (Kyoeisha Chemical Co., Ltd.), BLEMMER (registered trademark) APE-90 (n=2), PE-200 (n=4.5), PE-350 (n=8), PP-1000 (N=4 to 6), PP-500 (n=9), PP-800 (n=13) (all from NOF CORPORATION); acrylamide (KJ Chemicals Corporation), A-TMM-3L (Shin Nakamura Chemical Co., Ltd.), and SR-399E (Sartomer).

Of these, more preferably, the compound having at least one active hydrogen group and having, in at least one of the terminals, an ethylenically unsaturated bond is at least one selected from the group consisting of hydroxyethyl acrylate (OSAKA ORGANIC CHEMICAL INDUSTRY LTD.), BLEMMER (registered trademark) AE-400 (n=10), AP-400 (n=6), and PP-500 (n=9) (all from NOF CORPORATION), DENACOL (registered trademark) ACRYLATE DA-212 (Nagase ChemteX Corporation), A-TMM-3L (Shin Nakamura Chemical Co., Ltd.), and SR-399E (Sartomer).

A polymerizable group can be introduced into the shells by, for example, as described above, causing a reaction between an isocyanate compound having an introduced polymerizable group and the above-described compound having two or more active hydrogen groups.

Such an isocyanate compound having an introduced polymerizable group can be produced by, for example, as described in the following Synthesis scheme 3, causing a reaction between an isocyanate group of a tri- or higher functional isocyanate compound (hereafter, also referred to as "polyisocyanate"), and an active hydrogen group of a compound having at least one active hydrogen group and having, in at least one of the terminals, an ethylenically unsaturated bond (hereafter, also referred to as "polymerizable-group-introduction monomer").

Synthesis scheme 3

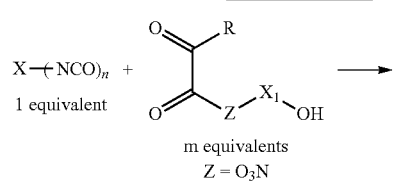

1 equivalent m equivalents
$Z = O_3N$

-continued

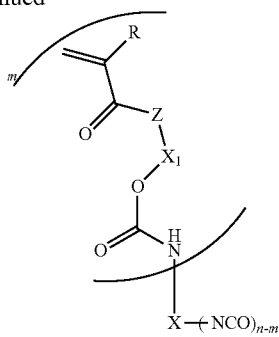

The isocyanate compound having an introduced polymerizable group is preferably a compound prepared by causing a reaction between, in accordance with a combination in the following Table 3, polyisocyanate (namely, a tri- or higher functional isocyanate compound) and a polymerizable-group-introduction monomer.

TABLE 3

| Compound No. | Polyisocyanate structure | | Composition Amount of active hydrogen group of polymerizable-group-introduction monomer relative to NCO groups of polyisocyanate (mol %) |
|---|---|---|---|
| | Polyisocyanate | Polymerizable-group-introduction monomer | |
| NCO 201 | NCO 104 | hydroxybutyl acrylate | 15 |
| NCO 202 | NCO 104 | BLEMMER AP-400 | 15 |
| NCO 203 | NCO 104 | BLEMMER AE-400 | 15 |
| NCO 204 | NCO 104 | BLEMMER PP-500 | 15 |
| NCO 205 | NCO 104 | DA212 | 15 |
| NCO 206 | NCO 104 | DA920 | 15 |
| NCO 207 | DURANATE 24A-100 | BLEMMER AP-400 | 15 |
| NCO 208 | D-127 | BLEMMER AP-400 | 15 |
| NCO 209 | SUMIDUR N3300 | BLEMMER AP-400 | 15 |
| NCO 210 | DURANATE TKA-100 | BLEMMER AP-400 | 15 |
| NCO 211 | DURANATE TSE-100 | BLEMMER AP-400 | 15 |

The polymerizable-group-introduction monomer may be a single compound alone, or may be a combination of two or more compounds.

During production of the isocyanate compound having an introduced polymerizable group, a reaction is preferably caused between polyisocyanate (in other words, a tri- or higher functional isocyanate compound) and a polymerizable-group-introduction monomer (in other words, a compound having at least one active hydrogen group and having, in at least one of the terminals, an ethylenically unsaturated bond) at a ratio in which the number of moles of the active hydrogen group of the polymerizable-group-introduction monomer is 0.01 times to 0.3 times (more preferably 0.02 times to 0.25 times, still more preferably 0.03 times to 0.2 times) the number of moles of the isocyanate groups of the polyisocyanate.

In the isocyanate compound having an introduced polymerizable group, the average functional-group number of isocyanate groups may be 3 or less. However, even in this case, as long as the raw materials for forming the shells include at least one tri- or higher functional isocyanate compound, the shells having a three-dimensional cross-linked structure can be formed.

Cores of Microcapsules

The components included in the cores of the microcapsules are not particularly limited. The cores may include, for example, a polymerizable compound and a photopolymerization initiator. The cores may include another component described later.

Polymerizable Compound

The cores of the microcapsules preferably include a polymerizable compound.

An embodiment in which the cores of the microcapsules include a polymerizable compound enables further enhancement of film curing sensitivity and film hardness.

When the cores of the microcapsules include a polymerizable compound, the cores may include a single polymerizable compound alone, or may include two or more polymerizable compounds. When the cores of the microcapsules include a polymerizable compound, the polymerizable group of the polymerizable compound functions as the polymerizable group of the cores.

The polymerizable compound that can be included in the cores of the microcapsules includes a photopolymerizable compound that is polymerized and cured by being irradiated with an active energy ray (also simply referred to as "light"), and a thermal polymerizable compound that is polymerized and cured by being heated or irradiated with infrared radiation. In particular, the photopolymerizable compound is preferably a radical polymerizable compound having an ethylenically unsaturated bond that enables radical polymerization.

The polymerizable compound that can be included in the cores of the microcapsules may be a polymerizable monomer, a polymerizable oligomer, or a polymerizable polymer; from the viewpoint of enhancing film curing sensitivity and film hardness, preferred is a polymerizable monomer. In particular, more preferred polymerizable compounds are a photocurable polymerizable monomer (photopolymerizable monomer) and a thermosetting polymerizable monomer (thermal polymerizable monomer).

From the viewpoint of enhancing film curing sensitivity and film hardness, the content of the polymerizable compound that can be included in the cores of the microcapsules (preferably a polymerizable monomer. Hereafter, this is the same.) (in the case of including two or more compounds, the content is the total content thereof) relative to the total solid content of the microcapsules is preferably 10 mass % to 80 mass %, more preferably 20 mass % to 70 mass %, still more preferably 35 mass % to 60 mass %.

When the cores of the microcapsules include a polymerizable compound, the cores may include a single polymerizable compound alone, or two or more polymerizable compounds.

The cores of the microcapsules preferably include a bi- or lower functional polymerizable compound (preferably a bi- or lower functional polymerizable monomer. Hereafter, this is the same.) and a tri- or higher functional polymerizable compound (preferably a tri- or higher functional polymerizable monomer. Hereafter, this is the same.). An embodiment in which the cores of the microcapsules include a bi- or lower functional polymerizable compound and a tri- or higher functional polymerizable compound enables formation of a film having high hardness and high adhesiveness to a substrate. In the embodiment, the bi- or lower functional polymerizable compound probably contributes to the adhesiveness of the film to the substrate, and the tri- or higher functional polymerizable compound probably contributes to enhancement of film hardness.

When the polymerizable compound includes a bi- or lower functional polymerizable compound and a tri- or higher functional polymerizable compound, the ratio of the tri- or higher functional polymerizable compound to the total mass of the bi- or lower functional polymerizable compound and the tri- or higher functional polymerizable compound is preferably 10 mass % to 90 mass %, more preferably 25 mass % to 70 mass %, still more preferably 35 mass % to 60 mass %.

The polymerizable compound preferably has a molecular weight that is a weight-average molecular weight of 100 to 100000, more preferably 100 to 30000, still more preferably 100 to 10000, still more preferably 100 to 4000, still more preferably 100 to 2000, still more preferably 100 to 1000, still more preferably 100 to 900, still more preferably 100 to 800, particularly preferably 150 to 750.

Incidentally, the weight-average molecular weight of the polymerizable compound is a value measured by gel permeation chromatography (GPC). The measurement method is described above.

Polymerizable Monomer

The polymerizable monomer that can be included in the cores of the microcapsules may be a photopolymerizable monomer that is polymerized and cured by being irradiated with light, or a thermal polymerizable monomer that is polymerized and cured by being heated or irradiated with infrared radiation. When the cores of the microcapsules include, as the polymerizable compound, a photopolymerizable monomer, the cores of the microcapsules preferably include a photopolymerization initiator described later. When the cores of the microcapsules include, as the polymerizable compound, a thermal polymerizable monomer, the cores of the microcapsules preferably include a photothermal conversion agent described later, a thermal curing accelerator described later, or the photothermal conversion agent and the thermal curing accelerator.

Photopolymerizable Monomer

The photopolymerizable monomer can be selected from the group consisting of a polymerizable monomer having an ethylenically unsaturated bond that enables radical polymerization (namely, a radical polymerizable monomer) and a polymerizable monomer having a cationic-polymerizable group that enables cationic polymerization (namely, a cationic-polymerizable monomer).

Examples of the radical polymerizable monomer include an acrylate compound, a methacrylate compound, a styrene compound, a vinylnaphthalene compound, an N-vinyl heterocyclic compound, unsaturated polyester, unsaturated polyether, unsaturated polyamide, and unsaturated urethane.

The radical polymerizable monomer is preferably a compound having an ethylenically unsaturated group.

When the cores of the microcapsules include the radical polymerizable monomer, the cores may include a single radical polymerizable monomer species alone, or two or more radical polymerizable monomer species.

Examples of the acrylate compound include monofunctional acrylate compounds such as 2-hydroxyethyl acrylate, butoxyethyl acrylate, carbitol acrylate, cyclohexyl acrylate, tetrahydrofurfuryl acrylate, benzyl acrylate, tridecyl acrylate, 2-phenoxyethyl acrylate (PEA), bis(4-acryloxypolyethoxyphenyl)propane, oligoester acrylate, epoxy acrylate, isobornyl acrylate (IBOA), dicyclopentenyl acrylate, dicyclopentenyloxyethyl acrylate, dicyclopentanyl acrylate, cyclic trimethylolpropane formal acrylate, 2-(2-ethoxyethoxy)ethyl acrylate, 2-(2-vinyloxyethoxy)ethyl acrylate, octyl acrylate, decyl acrylate, isodecyl acrylate, lauryl acrylate, 3,3,5-trimethylcyclohexyl acrylate, 4-t-butylcyclohexyl acrylate, isoamyl acrylate, stearyl acrylate, isoamyl acrylate, isostearyl acrylate, 2-ethylhexyldiglycol acrylate, 2-hydroxybutyl acrylate, 2-acryloyloxyethylhydrophthalic acid, ethoxy diethylene glycol acrylate, methoxy diethylene glycol acrylate, methoxypolyethylene glycol acrylate, methoxy propylene glycol acrylate, 2-hydroxy-3-phenoxypropyl acrylate, vinyl ether acrylate, 2-acryloyloxyethylsuccinic acid, 2-acryloyloxyphthalic acid, 2-acryloxyethyl-2-hydroxyethylphthalic acid, lactone-modified acrylate, acryloyl morpholine, acrylamide, and substituted acrylamide (such as N-methylolacrylamide, and diacetone acrylamide);

bifunctional acrylate compounds such as polyethylene glycol diacrylate, polypropylene glycol diacrylate, polytetramethylene glycol diacrylate, 1,3-butylene glycol diacrylate, 1,4-butanediol diacrylate, 1,6-hexanediol diacrylate (HDDA), 1,9-nonanediol diacrylate (NDDA), 1,10-decanediol diacrylate (DDDA), 3-methylpentadiol diacrylate (3MPDDA), neopentyl glycol diacrylate, tricyclodecane dimethanol diacrylate, bisphenol A ethylene oxide (EO) adduct diacrylate, bisphenol A propylene oxide (PO) adduct diacrylate, ethoxylated bisphenol A diacrylate, hydroxylated neopentyl glycol diacrylate, propoxylated neopentyl glycol diacrylate, alkoxylated dimethyloltricyclodecane diacrylate, polytetramethylene glycol diacrylate, alkoxylated cyclohexanonedimethanol diacrylate, alkoxylated hexanediol diacrylate, dioxane glycol diacrylate, cyclohexanonedimethanol diacrylate, diethylene glycol diacrylate, neopentyl glycol diacrylate, tetraethylene glycol diacrylate, dipropylene glycol diacrylate, tripropylene glycol diacrylate (TPGDA), and neopentyl glycol propylene oxide adduct diacrylate; and tri- or higher functional acrylate compounds such as trimethylolpropane triacrylate, pentaerythritol triacrylate, dipentaerythritol tetraacrylate, ethoxylated isocyanurate triacrylate, ε-caprolactone-modified tris-(2-acryloxyethyl) isocyanurate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, caprolactone-modified trimethylolpropane triacrylate, pentaerythritol tetraacrylate, pentaerythritolethoxy tetraacrylate, glycerolpropoxy triacrylate, ethoxylated dipentaerythritol hexaacrylate, caprolactam-modified dipentaerythritol hexaacrylate, propoxylated glycerol triacrylate, ethoxylated trimethylolpropane triacrylate, and propoxylated trimethylolpropane triacrylate.

Examples of the methacrylate compound include monofunctional methacrylate compounds such as methyl methacrylate, n-butyl methacrylate, allyl methacrylate, glycidyl methacrylate, benzyl methacrylate, dimethylaminomethyl methacrylate, methoxypolyethylene glycol methacrylate, methoxytriethylene glycol methacrylate, hydroxyethyl methacrylate, phenoxyethyl methacrylate, and cyclohexyl methacrylate; and bifunctional methacrylate compounds such as polyethylene glycol dimethacrylate, polypropylene glycol dimethacrylate, 2,2-bis(4-methacryloxypolyethoxyphenyl)propane, and tetraethylene glycol dimethacrylate.

Examples of the styrene compound include styrene, p-methylstyrene, p-methoxystyrene, β-methylstyrene, p-methyl-β-methylstyrene, α-methylstyrene, and p-methoxy-β-methyl styrene.

Examples of the vinylnaphthalene compound include 1-vinylnaphthalene, methyl-1-vinylnaphthalene, β-methyl-1-vinylnaphthalene, 4-methyl-1-vinylnaphthalene, and 4-methoxy-1-vinylnaphthalene.

Examples of the N-vinyl heterocyclic compound include N-vinylcarbazole, N-vinylpyrrolidone, N-vinylethylacetamide, N-vinylpyrrole, N-vinylphenothiazine, N-vinylacetanilide, N-vinylethylacetamide, N-vinylsuccinimide, N-vinylphthalimide, N-vinylcaprolactam, and N-vinylimidazole.

Other examples of the radical polymerizable monomer include allyl glycidyl ether, diallyl phthalate, triallyl trimellitate, and N-vinylamide such as N-vinylformamide.

Of these radical polymerizable monomers, the bi- or lower functional radical polymerizable monomer is preferably at least one selected from the group consisting of 1,6-hexanediol diacrylate (HDDA), 1,9-nonanediol diacrylate (NDDA), 1,10-decanediol diacrylate (DDDA), 3-methylpentadiol diacrylate (3MPDDA), neopentyl glycol diacrylate, tricyclodecane dimethanol diacrylate, diethylene glycol diacrylate, tetraethylene glycol diacrylate, dipropylene glycol diacrylate, tripropylene glycol diacrylate (TPGDA), cyclohexanonedimethanol diacrylate, alkoxylated hexanediol diacrylate, polyethylene glycol diacrylate, and polypropylene glycol diacrylate.

The tri- or higher functional radical polymerizable monomer is preferably at least one selected from the group consisting of trimethylolpropane triacrylate, pentaerythritol triacrylate, dipentaerythritol tetraacrylate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, caprolactone-modified trimethylolpropane triacrylate, pentaerythritol tetraacrylate, pentaerythritolethoxy tetraacrylate, glycerolpropoxy triacrylate, ethoxylated dipentaerythritol hexaacrylate, caprolactam-modified dipentaerythritol hexaacrylate, propoxylated glycerol triacrylate, ethoxylated trimethylolpropane triacrylate, and propoxylated trimethylolpropane triacrylate.

The combination of the bi- or lower functional radical polymerizable monomer and the tri- or higher functional radical polymerizable monomer is preferably the combination of a bi- or lower functional acrylate compound and a tri- or higher functional acrylate compound, more preferably the combination of a bifunctional acrylate compound and a tri- or higher functional acrylate compound, still more preferably the combination of a bifunctional acrylate compound and a tri- to octa-functional acrylate compound, still more preferably the combination of a bifunctional acrylate compound and a tri- to hexa-functional acrylate compound.

Most preferred is the combination of at least one bifunctional acrylate compound selected from the group consisting of 1,6-hexanediol diacrylate (HDDA), 1,9-nonanediol diacrylate (NDDA), 1,10-decanediol diacrylate (DDDA), 3-methylpentadiol diacrylate (3MPDDA), neopentyl glycol diacrylate, tricyclodecanedimethanol diacrylate, diethylene glycol diacrylate, tetraethylene glycol diacrylate, dipropylene glycol diacrylate, tripropylene glycol diacrylate (TPGDA), cyclohexanonedimethanol diacrylate, polyethylene glycol diacrylate, and polypropylene glycol diacrylate, and at least one tri- to hexa-functional acrylate compound selected from the group consisting of trimethylolpropane triacrylate, pentaerythritol triacrylate, dipentaerythritol tetraacrylate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, pentaerythritol tetraacrylate, pentaerythritolethoxy tetraacrylate, glycerolpropoxy triacrylate, ethoxylated dipentaerythritol hexaacrylate, caprolactam-modified dipentaerythritol hexaacrylate, propoxylated glycerol triacrylate, ethoxylated trimethylolpropane triacrylate, and propoxylated trimethylolpropane triacrylate.

Examples of the cationic-polymerizable monomer include an epoxy compound, a vinyl ether compound, and an oxetane compound.

The cationic-polymerizable monomer is preferably a compound having at least one olefin, thioether, acetal, thioxane, thietane, aziridine, N heterocycle, O heterocycle, S heterocycle, P heterocycle, aldehyde, lactam, or cyclic ester group.

Examples of the epoxy compound include bi- or lower functional epoxy compounds such as 1,4-butanediol diglycidyl ether, 3-(bis(glycidyloxymethyl)methoxy)-1,2-propanediol, limonene oxide, 2-biphenyl glycidyl ether, 3,4-epoxycyclohexylmethyl-3',4'-epoxycyclohexanecarboxylate, epichlorohydrin-bisphenol S-derived epoxide, epoxidated styrene, epichlorohydrin-bisphenol F-derived epoxide, epichlorohydrin-bisphenol A-derived epoxide, epoxidated novolac, and alicyclic diepoxide.

Examples of the alicyclic diepoxide include copolymers of epoxide and compounds including a hydroxy group such as glycol, polyol, and vinyl ether. Specific examples include 3,4-epoxycyclohexylmethyl-3',4'-epoxycycloethyl carbolate, bis(3,4-epoxyhexylmethyl)adipate, limonene diepoxide, and diglycidyl ester of hexahydrophthalic acid.

Examples of epoxy compounds other than those described above include tri- or higher functional epoxy compounds such as polyglycidyl ester of polybasic acid, polyglycidyl ether of polyol, polyglycidyl ether of polyoxyalkylene glycol, polyglycidyl ester of aromatic polyol, urethane polyepoxy compounds, and polyepoxy polybutadiene.

Examples of the vinyl ether compound include bi- or lower functional vinyl ether compounds such as ethyl vinyl ether, n-butyl vinyl ether, isobutyl vinyl ether, octadecyl vinyl ether, cyclohexyl vinyl ether, butanediol divinyl ether, hydroxybutyl vinyl ether, cyclohexanedimethanol monovinyl ether, phenyl vinyl ether, p-methylphenyl vinyl ether, p-methoxyphenyl vinyl ether, methyl vinyl ether, β-methyl vinyl ether, β-chloroiso vinyl ether, diethylene glycol divinyl ether, triethylene glycol divinyl ether, n-propyl vinyl ether, isopropyl vinyl ether, dodecyl vinyl ether, diethylene glycol monovinyl ether, cyclohexanedimethanol divinyl ether, 4-(vinyloxy)butyl benzoate, bis[4-(vinyloxy)butyl] adipate, bis[4-(vinyloxy)butyl] succinate, 4-(vinyloxymethyl)cyclohexylmethyl benzoate, bis[4-(vinyloxy)butyl] isophthalate, bis[4-(vinyloxymethyl)cyclohexylmethyl] glutarate, 4-(vinyloxy)butyl steatite, bis[4-(vinyloxy)butyl] hexadiyl dicarbamate, bis[4-(vinyloxy)methyl]cyclohexyl methyl] terephthalate, bis[4-(vinyloxy)methyl]cyclohexyl methyl] isophthalate, bis[4-(vinyloxy)butyl](4-methyl-1,3- phenylene)-biscarbamate, bis[4-vinyloxy)butyl] (methylenedi-4,1-phenylene) biscarbamate, and 3-amino-1-propanol vinyl ether; and tri- or higher functional vinyl ether compounds such as tris[4-(vinyloxy)butyl] trimellitate.

Examples of the oxetane compound include 3-ethyl-3-hydroxymethyl-1-oxetane, 1,4bis[3-ethyl-3-oxetanylmethoxy)methyl]benzene, 3-ethyl-3-phenoxymethyl-oxetane, bis([1-ethyl(3-oxetanyl)]methyl) ether, 3-ethyl-3-[(2-ethylhexyloxy)methyl]oxetane, 3-ethyl-[(triethoxysilylpropoxy)methyl]oxetane, and 3,3-dimethyl-2-(p-methoxyphenyl)-oxetane.

In addition to the above-described radical polymerizable monomers, there are other usable radical polymerizable monomers such as commercially available products described in, for example, "Crosslinking agent handbook", edited by Shinzo YAMASHITA (1981, TAISEISHA LTD.); "UV/EB curing handbook (raw material)", edited by Kiyomi KATO (1985, Kobunshi Kankokai); "Applications and markets of UV/EB curing techniques", edited by RadTech Japan, p. 79 (1989, CMC Publishing Co., Ltd.); and "Polyester resin handbook", written by Eiichiro TAKIYAMA (1988, THE NIKKAN KOGYO SHIMBUN, LTD.); and radical polymerizable and crosslinkable monomers publicly known in industry.

In addition to the above-described cationic-polymerizable monomers, there are other usable cationic-polymerizable monomers such as compounds described in J. V. Crivello et al. "Advances in Polymer Science", 62, pages 1 to 47 (1984); Lee et al. "Handbook of Epoxy Resins", McGraw Hill Book Company, New York (1967); and P. F. Bruins et al. "Epoxy Resin Technology" (1968).

There are also photopolymerizable monomers that are photocurable polymerizable monomers used for photopolymerizable compositions and described in patent publications such as JP1995-159983A (JP-H7-159983A), JP1995-31399B (JP-H7-31399B), JP1996-224982A (JP-H8-224982A), JP1998-863A (JP-H10-863A), JP1997-134011A (JP-H9-134011A), and JP2004-514014A. These monomers are also applicable as polymerizable monomers that can be included in the cores of the microcapsules.

The photopolymerizable monomer may be a commercially available product on the market.

Examples of the commercially available product of the photopolymerizable monomer include AH-600 (bifunctional), AT-600 (bifunctional), UA-306H (hexafunctional), UA-306T (hexafunctional), UA-306I (hexafunctional), UA-510H (decafunctional), UF-8001G (bifunctional), DAUA-167 (bifunctional), LIGHT ACRYLATE NPA (bifunctional), LIGHT ACRYLATE 3EG-A (bifunctional) (all from Kyoeisha Chemical Co., Ltd.), SR339A (PEA, monofunctional), SR506 (IBOA, monofunctional), CD262 (bifunctional), SR238 (HDDA, bifunctional), SR341 (3MPDDA, bifunctional), SR508 (bifunctional), SR306H (bifunctional), CD560 (bifunctional), SR833S (bifunctional), SR444 (trifunctional), SR454 (trifunctional), SR492 (trifunctional), SR499 (trifunctional), CD501 (trifunctional), SR502 (trifunctional), SR9020 (trifunctional), CD9021 (trifunctional), SR9035 (trifunctional), SR494 (tetrafunctional), SR399E (pentafunctional) (all from Sartomer), A-NOD-N (NDDA, bifunctional), A-DOD-N (DDDA, bifunctional), A-200 (bifunctional), APG-400 (bifunctional), A-BPE-10 (bifunctional), A-BPE-20 (bifunctional), A-9300 (trifunctional), A-9300-1CL (trifunctional), A-TMPT (trifunctional), A-TMM-3L (trifunctional), A-TMMT (tetrafunctional), AD-TMP (tetrafunctional) (all from Shin Nakamura Chemical Co., Ltd.), UV-7510B (trifunctional) (The Nippon Synthetic Chemical Industry Co., Ltd.), KAYARAD DCPA-30 (hexafunctional), and KAYARAD DPEA-12 (hexafunctional) (all from Nippon Kayaku Co., Ltd.).

In addition, preferred examples of the polymerizable monomer include commercially available products such as NPGPODA (neopentyl glycol propylene oxide adduct diacrylate), SR531, SR285, SR256 (all from Sartomer), A-DHP (dipentaerythritol hexaacrylate, Shin Nakamura Chemical Co., Ltd.), ARONIX (registered trademark) M-156 (TOAGOSEI CO., LTD.), V-CAP (BASF), and VISCOAT #192 (OSAKA ORGANIC CHEMICAL INDUSTRY LTD.).

Thermal Polymerizable Monomer

The thermal polymerizable monomer can be selected from the group consisting of polymerizable monomers that can be polymerized by being heated or irradiated with infrared radiation. Examples of the thermal polymerizable monomer include compounds such as epoxy, oxetane, aziridine, azetidine, ketone, aldehyde, and blocked isocyanate.

Of these, examples of the epoxy compound include bi- or lower functional epoxy compounds such as 1,4-butanediol diglycidyl ether, 3-(bis(glycidyloxymethyl)methoxy)-1,2-propanediol, limonene oxide, 2-biphenyl glycidyl ether, 3,4-epoxycyclohexylmethyl-3',4'-epoxycyclohexanecarboxylate, epichlorohydrin-bisphenol S-derived epoxide, epoxidated styrene, epichlorohydrin-bisphenol F-derived epoxide, epichlorohydrin-bisphenol A-derived epoxide, epoxidated novolac, and alicyclic diepoxide; and tri- or higher functional epoxy compounds such as polyglycidyl ester of polybasic acid, polyglycidyl ether of polyol, polyglycidyl ether of polyoxyalkylene glycol, polyglycidyl ester of aromatic polyol, urethane polyepoxy compounds, and polyepoxy polybutadiene.

Examples of the oxetane compound include 3-ethyl-3-hydroxymethyl-1-oxetane, 1,4bis[3-ethyl-3-oxetanylmethoxy)methyl]benzene, 3-ethyl-3-phenoxymethyl-oxetane, bis([1-ethyl(3-oxetanyl)]methyl) ether, 3-ethyl-3-[(2-ethylhexyloxy)methyl]oxetane, 3-ethyl-[(triethoxysilylpropoxy)methyl]oxetane, and 3,3-dimethyl-2-(p-methoxyphenyl)-oxetane.

Examples of the blocked isocyanate compound include compounds obtained by deactivating isocyanate compounds with a blocking agent (active-hydrogen-containing compound).

Preferred examples of such an isocyanate compound include commercially available isocyanates such as hexamethylene diisocyanate, isophorone diisocyanate, toluyl diisocyanate, xylylene diisocyanate, hexamethylene diisocyanate trimer, trimethylhexylylene diisocyanate, diphenylmethane diisocyanate, dicyclohexylmethane diisocyanate, hydrogenated xylylene diisocyanate, TAKENATE (registered trademark; Mitsui Chemicals, Inc.), DURANATE (registered trademark; Asahi Kasei Corporation), and BAYHYDUR (registered trademark; Bayer AG); and bi- or higher functional isocyanates that are combinations of the foregoing.

Examples of the blocking agent include lactam [such as ε-caprolactam, δ-valerolactam, and γ-butyrolactam], oxime [such as acetoxime, methyl ethyl ketoxime (MEK oxime), methyl isobutyl ketoxime (MIBK oxime), and cyclohexanone oxime], amine [such as aliphatic amine (dimethylamine, diisopropylamine, di-n-propylamine, and diisobutylamine), alicyclic amine (such as methylhexylamine, and dicyclohexylamine), and aromatic amine (such as aniline, and diphenylamine)], aliphatic alcohol [such as methanol, ethanol, 2-propanol, and n-butanol], phenol and alkylphenol [such as phenol, cresol, ethylphenol, n-propylphenol, isopropylphenol, n-butylphenol, octylphenol, nonylphenol, xylenol, diisopropylphenol, and di-t-butylphenol], imidazole [such as imidazole, and 2-methylimidazole], pyrazole [such as pyrazole, 3-methylpyrazole, and 3,5-dimethylpyrazole], imine [such as ethyleneimine, and polyethyleneimine], active methylene [such as dimethyl malonate, diethyl malonate, diisopropyl malonate, acetylacetone, methyl acetoacetate, and ethyl acetoacetate], blocking agents described in JP2002-309217A and JP2008-239890A, and mixtures of two or more of the foregoing. In particular, the blocking agent is preferably at least one selected from the group consisting of oxime, lactam, pyrazole, active methylene, and amine.

The blocked isocyanate compound may be a commercially available product on the market. Preferred examples include TRIXENE (registered trademark) BI7982, BI7641, BI7642, BI7950, BI7960, and BI7991 (Baxenden Chemicals LTD), and BAYHYDUR (registered trademark; Bayer AG). There are also other preferred examples that are a compound group described in Paragraph [0064] in WO2015/158654A.

The polymerizable monomer can be included in the cores of the microcapsules in the following manner: during production of the microcapsules, the constituent components of the microcapsules and the polymerizable monomer are dissolved to form an oil phase; to the oil phase, an aqueous phase is added; mixing is performed; and emulsification is performed.

The polymerizable monomer preferably has a molecular weight that is a weight-average molecular weight of 100 to 4000, more preferably 100 to 2000, still more preferably 100 to 1000, still more preferably 100 to 900, still more preferably 100 to 800, particularly preferably 150 to 750.

Incidentally, the weight-average molecular weight of the polymerizable monomer is a value measured by gel permeation chromatography (GPC). The measurement method is described above.

Polymerizable Oligomer and Polymerizable Polymer

An embodiment in which the polymerizable compound is a polymerizable oligomer or a polymerizable polymer is advantageous in that shrinkage of the film during curing is reduced, and degradation of adhesiveness between the film and the substrate is suppressed. When the cores of microcapsules include, as the polymerizable compound, a photocurable polymerizable oligomer or polymerizable polymer, the cores of microcapsules preferably include a photopolymerization initiator described later. Alternatively, when the cores of microcapsules include, as the polymerizable compound, a thermosetting polymerizable oligomer or polymerizable polymer, the cores of microcapsules preferably include a photothermal conversion agent, a thermal curing accelerator, or a photothermal conversion agent and a thermal curing accelerator described later.

Examples of the polymerizable oligomer or the polymerizable polymer include oligomers or polymers of, for example, acrylic resin, urethane resin, polyester, polyether, polycarbonate, epoxy resin, or polybutadiene.

Other examples of the polymerizable oligomer or the polymerizable polymer include resins such as epoxy acrylate, aliphatic urethane acrylate, aromatic urethane acrylate, and polyester acrylate.

Of these, from the viewpoint of reducing shrinkage during curing, the polymerizable oligomer or the polymerizable polymer is preferably a resin that has both of a hard segment and a soft segment, and that enables stress relaxation during curing; in particular, more preferably at least one oligomer or polymer selected from the group consisting of urethane resin, polyester resin, and epoxy resin.

The polymerizable group of the polymerizable oligomer or the polymerizable polymer is preferably, for example, an ethylenically unsaturated group such as a (meth)acryloyl group, a vinyl group, an allyl group, or a styryl group, or an epoxy group; from the viewpoint of polymerization reactivity, more preferably at least one group selected from the group consisting of a (meth)acryloyl group, a vinyl group, and a styryl group, particularly preferably a (meth)acryloyl group.

When the cores of microcapsules include, as the polymerizable compound, a polymerizable oligomer or a polymerizable polymer, the polymerizable oligomer or the polymerizable polymer may have a single polymerizable-group species alone, or two or more polymerizable-group species.

Such a polymerizable group can be introduced into a polymer or an oligomer by a polymer reaction or copolymerization.

For example, the polymerizable group can be introduced into a polymer or an oligomer by using a reaction between glycidyl methacrylate and a polymer or an oligomer having a carboxy group on a side chain, or a reaction between a polymer or an oligomer having an epoxy group and an ethylenically-unsaturated-group-containing carboxylic acid such as methacrylic acid.

The polymerizable oligomer and the polymerizable polymer may be commercially available products on the market.

Examples of commercially available products of the polymerizable oligomer and the polymerizable polymer include acrylic resins such as (ACA)Z200M, (ACA)Z230AA, (ACA)Z251, (ACA)Z254F (all from DAICEL-ALLNEX LTD.), and HITALOID 7975D (Hitachi Chemical Company, Ltd.);

urethane resins such as EBECRYL (registered trademark) 8402, EBECRYL (registered trademark) 8405, EBECRYL (registered trademark) 9270, EBECRYL (registered trademark) 8311, EBECRYL (registered trademark) 8701, KRM8667, KRM8528 (all from DAICEL-ALLNEX LTD.), CN964, CN9012, CN968, CN996, CN975, CN9782 (all from Sartomer), UV-6300B, UV-7600B, UV-7605B, UV-7620EA, UV-7630B (all from The Nippon Synthetic Chemical Industry Co., Ltd.), U-6HA, U-15HA, U-108A, U-200PA, UA-4200 (all from Shin Nakamura Chemical Co., Ltd.), TL 2300, HITALOID 4863, TL 2328, TL 2350, HITALOID 7902-1 (all from Hitachi Chemical Company, Ltd.), 8UA-017, 8UA-239, 8UA-239H, 8UA-140, 8UA-585H, 8UA-347H, and 8UX-015A (all from Taisei Fine Chemical Co., Ltd.);

polyester resins such as CN294, CN2254, CN2260, CN2271E, CN2300, CN2301, CN2302, CN2303, CN2304 (all from Sartomer), EBECRYL (registered trademark) 436, EBECRYL (registered trademark) 438, EBECRYL (registered trademark) 446, EBECRYL (registered trademark) 524, EBECRYL (registered trademark) 525, EBECRYL (registered trademark) 811, and EBECRYL (registered trademark) 812 (all from DAICEL-ALLNEX LTD.);

polyether resins such as BLEMMER (registered trademark) ADE-400A, and BLEMMER (registered trademark) ADP-400 (all from NOF CORPORATION);

polycarbonate resins such as polycarbonatediol diacrylate (Ube Industries, Ltd.);

epoxy resins such as EBECRYL (registered trademark) 3708 (DAICEL-ALLNEX LTD.), CN120, CN120B60, CN120B80, CN120E50 (all from Sartomer), HITALOID 7851 (Hitachi Chemical Company, Ltd.), and EPICLON (registered trademark) 840 (DIC Corporation); and polybutadiene resins such as CN301, CN303, and CN307 (all from Sartomer).

Photopolymerization Initiator

The cores of microcapsules may include at least one photopolymerization initiator.

When the cores of microcapsules include a photopolymerizable group (preferably a radical polymerizable group) (particularly in the case of including, as the polymerizable compound, a photopolymerizable compound (preferably a photopolymerizable monomer)), the cores preferably include at least one photopolymerization initiator. When the cores of microcapsules include a photopolymerization initiator, high sensitivity to an active energy ray is provided. This enables formation of films having high hardness.

When the cores of microcapsules include a photopolymerization initiator, photopolymerization initiators that have high sensitivity but have low dispersibility or low solubility in water and hence have been limited in their usage are usable. As a result, photopolymerization initiators used can be selected with a higher degree of freedom, which results in an increase in the degree of freedom of selecting light sources used. This enables enhancement of the curing sensitivity.

The photopolymerization initiator included in the cores of microcapsules may be appropriately selected from publicly known photopolymerization initiators.

The photopolymerization initiator is a compound that absorbs light (namely, an active energy ray) to generate a radical serving as a polymerization initiation species.

The photopolymerization initiator may be a publicly known compound.

Preferred examples of the photopolymerization initiator include (a) carbonyl compounds such as aromatic ketones, (b) acylphosphine oxide compounds, (c) aromatic onium salt compounds, (d) organic peroxides, (e) thio compounds, (f) hexaarylbiimidazole compounds, (g) ketoxime ester compounds, (h) borate compounds, (i) azinium compounds, (j) metallocene compounds, (k) active ester compounds, (l) compounds having a carbon-halogen bond, and (m) alkylamine compounds.

Preferred examples of (a) carbonyl compounds, (b) acylphosphine oxide compounds, and (e) thio compounds include compounds having a benzophenone skeleton or a thioxanthone skeleton and described in "RADIATION CURING IN POLYMER SCIENCE AND TECHNOLOGY", J. P. FOUASSIER, J. F. RABEK (1993), pp. 77 to 117.

More preferred examples include α-thiobenzophenone compounds described in JP1972-6416B (JP-S47-6416B), benzoin ether compounds described in JP1972-3981B (JP-547-3981B), α-substituted benzoin compounds described in JP1972-22326B (JP-S47-22326B), benzoin derivatives described in JP1972-23664B (JP-S47-23664B), aroyl phosphonate described in JP1982-30704A (JP-S57-30704A), dialkoxybenzophenone described in JP1985-26483B (JP-560-26483B), benzoin ethers described in JP1985-26403B (JP-560-26403B) and JP1987-81345A (JP-562-81345A), α-aminobenzophenones described in JP1989-34242B (JP-H1-34242B), U.S. Pat. No. 4,318,791A, and EP0284561A1, p-di(dimethylaminobenzoyl)benzene described in JP1990-211452A (JP-H2-211452A), thio-substituted aromatic ketone described in JP1986-194062A (JP-561-194062A), acylphosphine sulfide described in JP1990-9597B (JP-H2-9597B), acylphosphine described in JP1990-9596B (JP-H2-9596B), thioxanthones described in JP1988-61950B (JP-563-61950B), coumarins described in JP1984-42864B (JP-559-42864B), and compounds described in WO2015/158745A.

Also preferred are photopolymerization initiators described in JP2008-105379A and JP2009-114290A.

Examples of commercially available products of the photopolymerization initiator include IRGACURE (registered trademark) 184, 369, 500, 651, 819, 907, 1000, 1300, 1700, 1870, DAROCUR (registered trademark) 1173, 2959, 4265, ITX, LUCIRIN (registered trademark) TPO [all from BASF], ESACURE (registered trademark) KT037, KT046, KIP150, EDB [all from Lamberti S.p.A.], H-Nu (registered trademark) 470, 470X [all from Spectra Group Limited], OMNIPOL TX, 9210 [all from IGM Resins B.V], and GENOPOL AB-2 [from Rahn AG].

The photopolymerization initiator can be included in the cores of microcapsules in the following manner: during production of microcapsules, the constituent components of microcapsules and the photopolymerization initiator are dissolved to from an oil phase; to the oil phase, an aqueous phase is added; mixing is performed; and the resultant mixture is emulsified.

The photopolymerization initiator content relative to the total solid content of microcapsules is preferably 0.1 mass % to 25 mass %, more preferably 0.5 mass % to 20 mass %, still more preferably 1 mass % to 15 mass %.

Encapsulation Ratio of Photopolymerization Initiator

In the ink composition according to the present disclosure, from the viewpoint of film curing sensitivity, the encapsulation ratio (mass %) of the photopolymerization initiator is preferably 10 mass % or more, more preferably 50 mass % or more, still more preferably 70 mass % or more, still more preferably 80 mass % or more, still more preferably 90 mass % or more, still more preferably 95 mass % or more, still more preferably 97 mass % or more, particularly preferably 99 mass % or more.

When the ink composition includes two or more photopolymerization initiators, at least one photopolymerization initiator preferably has an encapsulation ratio satisfying such a preferred range.

This encapsulation ratio (mass %) of the photopolymerization initiator means, in the case of preparing the ink composition, the amount of photopolymerization initiator included in the cores of microcapsules relative to the total amount of photopolymerization initiator in the ink composition. This encapsulation ratio is a value determined in the following manner.

Method of Measuring Encapsulation Ratio (Mass %) of Photopolymerization Initiator The following procedures are performed under a condition of a liquid temperature of 25° C.

When the ink composition contains no pigments, the ink composition is directly subjected to the following procedures. When the ink composition contains a pigment, the ink composition is first centrifuged to remove the pigment, and the ink composition from which the pigment has been removed is subjected to the following procedures.

From the ink composition, two samples of the same mass (hereafter, referred to as "Sample 1" and "Sample 2") are first obtained.

To Sample 1, tetrahydrofuran (THF) in an amount of 100 mass times the total solid content of Sample 1 is added, and mixing is performed to prepare a diluted solution. The obtained diluted solution is centrifuged at 80,000 rpm (round per minute; hereafter, this is the same) for 40 minutes. A supernatant liquid generated by the centrifugation (hereafter, referred to as "Supernatant liquid 1") is collected. As a result of this procedure, the entirety of the photopolymerization initiator included in Sample 1 is probably extracted to Supernatant liquid 1. The mass of the photopolymerization initiator included in the collected Supernatant liquid 1 is measured by liquid chromatography (for example, with a liquid chromatography apparatus from Waters Corporation). The determined mass of the photopolymerization initiator is defined as the "total amount of photopolymerization initiator".

Sample 2 is centrifuged under the same conditions as in the centrifugation performed for the diluted solution. A supernatant liquid generated by the centrifugation (hereafter, referred to as "Supernatant liquid 2") is collected. As a result of this procedure, the photopolymerization initiator not encapsulated within microcapsules (in other words, in a free state) in Sample 2 is probably extracted to Supernatant liquid 2. The mass of the photopolymerization initiator included in the collected Supernatant liquid 2 is determined by liquid chromatography (for example, a liquid chromatography apparatus from Waters Corporation). The determined mass of the photopolymerization initiator is defined as the "amount of free photopolymerization initiator".

From the "total amount of photopolymerization initiator" and the "amount of free photopolymerization initiator", the encapsulation ratio (mass %) of the photopolymerization initiator is calculated with the following formula.

Encapsulation ratio (mass %) of photopolymerization initiator=((Total amount of photopolymerization initiator−Amount of free photopolymerization initiator)/Total amount of photopolymerization initiator)×100

When the ink composition includes two or more photopolymerization initiators, the encapsulation ratio of the entirety of the two or more photopolymerization initiators may be calculated from the total amount of the two or more photopolymerization initiators being determined as the "total amount of photopolymerization initiator", and the total amount of two or more free photopolymerization initiators being determined as the "amount of free photopolymerization initiator"; alternatively, the encapsulation ratio of any one of the photopolymerization initiators may be calculated from the amount of any one of the photopolymerization initiators being determined as the "total amount of photopolymerization initiator", and the amount of any one of free photopolymerization initiators being determined as the "amount of free photopolymerization initiator".

Incidentally, whether or not the cores of microcapsules include components other than photopolymerization initiators (for example, a polymerizable compound described later) can also be determined by the same method as the method of determining whether or not the cores of microcapsules include photopolymerization initiators.

However, regarding a compound having a molecular weight of 1,000 or more, the masses of the compound included in the above-described Supernatant liquid 1 and Supernatant liquid 2 are measured by gel permeation chromatography (GPC) as the "total amount of compound" and the "amount of free compound", and the encapsulation ratio (mass %) of the compound is determined.

In this Specification, measurement by gel permeation chromatography (GPC) can be performed with a measurement device of an HLC (registered trademark)-8020GPC (Tosoh Corporation), three columns of TSKgel (registered trademark) Super Multipore HZ-H (4.6 mm ID×15 cm, Tosoh Corporation), and an eluent that is THF (tetrahydrofuran). The measurement conditions are a sample concentration of 0.45 mass %, a flow rate of 0.35 ml/min, a sample injection amount of 10 μl, a measurement temperature of 40° C., and use of a differential refractive index (RI) detector.

The calibration curve is created with "Standard samples TSK standard, polystyrene" from Tosoh Corporation: 8 samples of "F-40", "F-20", "F-4", "F-1", "A-5000", "A-2500", "A-1000", and "n-propylbenzene".

Photothermal Conversion Agent

When the cores of microcapsules include, as the polymerizable compound, a thermal polymerizable compound (preferably, a thermal polymerizable monomer), the cores of microcapsules may include a photothermal conversion agent.

The photothermal conversion agent is a compound that absorbs light such as infrared radiation (namely, an active energy ray) to generate heat, to cure a thermosetting compound. The photothermal conversion agent may be a publicly known compound.

The photothermal conversion agent is preferably an infrared absorbent. Examples of the infrared absorbent include polymethylindolium, indocyanine green, polymethine pigment, croconium pigment, cyanine pigment, merocyanine pigment, squarylium pigment, chalcogenopyryloallylidene pigment, metal thiolate complex pigment, bis(chalcogenopyrylo)polymethine pigment, oxyindolizine pigment, bisaminoallylpolymethine pigment, indolizine pigment, pyrylium pigment, quinoid pigment, quinone pigment, phthalocyanine pigment, naphthalocyanine pigment, azo pigment, azomethine pigment, and carbon black.

The photothermal conversion agent can be included in the cores of microcapsules in the following manner: during production of microcapsules, the constituent components of microcapsules and the photothermal conversion agent are dissolved to form an oil phase; to the oil phase, an aqueous phase is added; mixing is performed; and the resultant mixture is emulsified.

Such photothermal conversion agents may be used alone or in combination of two or more thereof.

The photothermal conversion agent content relative to the total solid content of microcapsules is preferably 0.1 mass % to 25 mass %, more preferably 0.5 mass % to 20 mass %, still more preferably 1 mass % to 15 mass %.

The encapsulation ratio (mass %) of the photothermal conversion agent and the method of measuring the encapsulation ratio conform to the encapsulation ratio of the photopolymerization initiator and the method of measuring the encapsulation ratio.

Thermal Curing Accelerator

When the cores of microcapsules include, as the polymerizable compound, a thermal polymerizable compound (preferably a thermal polymerizable monomer), the cores of microcapsules preferably include a thermal curing accelerator.

The thermal curing accelerator is a compound that catalytically promotes the thermosetting reaction of the thermal polymerizable compound (preferably a thermal polymerizable monomer).

The thermal curing accelerator may be a publicly known compound. The thermal curing accelerator is preferably acid or base, or a compound that generates acid or base under heating. Examples include carboxylic acid, sulfonic acid, phosphoric acid, aliphatic alcohol, phenol, aliphatic amine, aromatic amine, imidazole, and pyrazole.

The thermal curing accelerator can be included in the cores of microcapsules in the following manner: during production of microcapsules, components for forming microcapsules and the thermal curing accelerator are mixed and dissolved to form an oil phase; to the oil phase, an aqueous phase is added; mixing is performed; and the resultant mixture is emulsified.

Such thermal curing accelerators may be used alone or in combination of two or more thereof.

The thermal curing accelerator content relative to the total solid content of microcapsules is preferably 0.1 mass % to 25 mass %, more preferably 0.5 mass % to 20 mass %, still more preferably 1 mass % to 15 mass %.

The encapsulation ratio (mass %) of the thermal curing accelerator and the method of measuring the encapsulation ratio conform to the encapsulation ratio of the photopolymerization initiator and the method of measuring the encapsulation ratio.

Water

The ink composition according to the present disclosure includes water as the dispersion medium for microcapsules.

The water content of the ink composition is not particularly limited; for example, the water content relative to the total amount of the ink composition is preferably 10 mass % to 98 mass %, more preferably 20 mass % to 95 mass %, still more preferably 30 mass % to 90 mass %, particularly preferably 50 mass % to 90 mass %.

Sensitizer

The ink composition according to the present disclosure may include a sensitizer.

When the ink composition according to the present disclosure includes a sensitizer, decomposition of the photopolymerization initiator caused by irradiation with an active energy ray can be further promoted.

When the ink composition according to the present disclosure includes a sensitizer, from the viewpoint of providing higher reactivity to the photopolymerization initiator, the sensitizer is preferably included in the cores of microcapsules.

The sensitizer is a substance that absorbs a specific active energy ray to shift to an electroexcitation state. The sensitizer in the electroexcitation state comes into contact with the photopolymerization initiator to cause an effect such as electron transfer, energy transfer, or generation of heat. This promotes a chemical change of the photopolymerization initiator, specifically, for example, decomposition, or generation of a radical, acid, or base.

Examples of the sensitizer include benzophenone, thioxanthone, isopropylthioxanthone, anthraquinone, 3-acylcoumarin derivative, terphenyl, styryl ketone, 3-(aroylmethylene)thiazoline, camphorquinone, eosine, rhodamine, and erythrosine.

Other preferred examples of the sensitizer include compounds represented by Formula (i) in JP2010-24276A, and compounds represented by Formula (I) in JP1994-107718A (JP-H6-107718A).

Other preferred examples include compounds described in WO2015/158745A, specifically, tertiary aliphatic amines (such as methyldiethanolamine, dimethylethanolamine, triethanolamine, triethylamine, and N-methylmorpholine); aromatic amines (such as amyl p-dimethylaminobenzoate, 2-butoxyethyl 4-(dimethylamino)benzoate, 2-(dimethylamino)ethyl benzoate, ethyl 4-(dimethylamino)benzoate, and 4-(dimethylamino)2-ethylhexyl); and (meth)acrylated amines [such as dialkylaminoalkyl (meth)acrylate (such as diethylaminoethyl acrylate), and N-alkylmorpholine (meth)acrylate (such as N-alkylmorpholine acrylate)].

Of these, from the viewpoint of compatibility with LED light and reactivity to a photopolymerization initiator, the sensitizer is preferably at least one selected from the group consisting of thioxanthone, isopropyl thioxanthone, and benzophenone, more preferably at least one selected from the group consisting of thioxanthone and isopropylthioxanthone, still more preferably isopropylthioxanthone.

When the cores of microcapsules include a sensitizer, the cores may include a single sensitizer alone or two or more sensitizers.

When the cores of microcapsules contain a sensitizer, the sensitizer content relative to the total solid content of microcapsules is preferably 0.1 mass % to 25 mass %, more preferably 0.5 mass % to 20 mass %, still more preferably 1 mass % to 15 mass %.

Colorant

The ink composition contains at least one colorant selected from the group consisting of a colorant having an ionic group and a colorant at least a part of a surface of which is covered with a dispersant having an ionic group. The colorant in the ink composition is included outside of microcapsules.

Colorant Having Ionic Group

The ink composition according to the present disclosure may contain a colorant having an ionic group.

The colorant having an ionic group is, for example, a pigment having an ionic group (what is called, a self-dispersible pigment, such as an organic pigment or an inorganic pigment), or resin particles that contain a dye and have an ionic group in the surfaces.

Examples of such ionic groups in the colorant include anionic groups (such as a carboxy group, a phosphate group, and a sulfonic group), cationic groups (such as quaternary ammonium), and salts of anionic groups or cationic groups; preferred are anionic groups.

The self-dispersible pigment is, for example, a pigment in which a large number of ionic groups are bonded, to the pigment surfaces, directly or indirectly via, for example, alkyl groups, alkyl ether groups, or aryl groups, the pigment exhibiting at least one of water dispersibility or water solubility in the absence of dispersants for dispersing pigments and the like, the pigment remaining in a dispersion state in the ink.

Such an ink that contains a self-dispersible pigment as the colorant does not require a dispersant, which is ordinarily contained for dispersing pigment. This facilitates preparation of an ink that is less likely to cause foaming due to degradation of defoamability resulting from dispersants, and that has high ejection stability.

Examples of the ionic group bonded to the self-dispersible pigment surfaces include a carboxy group, a phosphate group, a sulfonic group, quaternary ammonium, and salts of a carboxy group, a phosphate group, a sulfonic group, and quaternary ammonium. The ionic group can be bonded in the following manner: a pigment is subjected to a physical treatment or a chemical treatment, and the ionic group or an active species having the ionic group is bonded (for example, grafted) to the pigment surfaces. The physical treatment is, for example, vacuum plasma treatment. The chemical treatment is, for example, a wet oxidation method of oxidizing pigment surfaces with an oxidizing agent in water, or a method of bonding p-aminobenzoate to pigment surfaces to thereby bond carboxy groups via phenyl groups.

In the present disclosure, preferred examples include self-dispersible pigments provided by surface treatment that is oxidation treatment using hypohalous acid and/or hypohalite, or that is oxidation treatment using ozone. The self-dispersible pigments may be commercially available products and specific examples include MICROJET CW-1 (trade name; manufactured by ORIENT CHEMICAL INDUSTRIES Colo., LTD.), CAB-O-JET200, CAB-O-JET300, and CAB-O-JET450C (trade names; manufactured by CABOT Corporation).

Colorant at Least a Part of a Surface of which is Covered with Dispersant Having Ionic Group The ink composition according to the present disclosure may contain a colorant at least a part of a surface of which is covered with a dispersant having an ionic group.

The colorant at least a part of a surface of which is covered with a dispersant having an ionic group is preferably, for example, a capsuled pigment in which, among dispersants for dispersing colorants, for example, a water-insoluble resin is used, and a pigment at least a part of a surface of which is covered with the water-insoluble resin; or, for example, a polymer emulsion in which water-insoluble resin particles contain pigment. In particular, the colorant is preferably a water-dispersible pigment in which a water-insoluble resin at least partially covers the pigment and forms resin layers on the pigment surfaces so as to enable dispersion of the pigment in water. The capsuled pigment covered with a water-insoluble resin is preferred from the viewpoint of aggregation of the pigment, and is preferred because, in the case of performing high-speed recording, images of high resolution are formed.

Instead of the pigment, dye may be used. When dye is used, dye supported on water-insoluble carriers may be used. The carriers supporting dye are colored water-insoluble resin particles, and can be used as aqueous dispersoid with a dispersant. The dispersant is preferably a dispersant described later.

Pigment

Pigment serving as an example of the colorant will be described.

The pigment can be appropriately selected in accordance with the purpose, and may be an organic pigment or an inorganic pigment, for example. The pigment is preferably a pigment that is practically insoluble or slightly soluble in water from the viewpoint of ink colorability.

Examples of the organic pigment include azo pigment, polycyclic pigment, chelate dye, nitro pigment, nitroso pigment, and aniline black. Of these, more preferred are azo pigment and polycyclic pigment. Examples of the inorganic pigment include titanium oxide, iron oxide, calcium carbonate, barium sulfate, aluminum hydroxide, barium yellow, cadmium red, chrome yellow, and carbon black. Of these, carbon black is particularly preferred.

In the case of using an organic pigment, the organic pigment preferably has a smaller average particle size from the viewpoint of transparency and color reproducibility, but preferably has a larger average particle size from the viewpoint of light resistance. From the viewpoint of satisfying both of these properties, the average particle size is preferably 10 nm to 200 nm, more preferably 10 nm to 150 nm, still more preferably 10 nm to 120 nm. The organic pigment is not particularly limited in terms of particle size distribution, and may have a wide particle size distribution or may have a monodispersed particle size distribution. Two or more organic pigments having monodispersed particle size distributions may be mixed and used.

Dispersant

The dispersant covering the colorant is a dispersant having an ionic group. The dispersant for dispersing the colorant (such as pigment) may be a polymeric dispersant or a low-molecular-weight surfactant dispersant. The polymeric dispersant may be a water-soluble dispersant, or a water-insoluble dispersant.

The ionic group in the dispersant may be, for example, an anionic group (such as a carboxy group, a phosphate group, or a sulfonic group), a cationic group (such as quaternary ammonium), or a salt of an anionic group or a cationic group, preferably an anionic group.

The low-molecular-weight surfactant dispersant enables, while it allows the ink to remain at low viscosity, stable dispersion of pigment in an aqueous medium. The low-molecular-weight surfactant dispersant is a low-molecular-weight dispersant having a molecular weight of 2000 or less. The low-molecular-weight surfactant dispersant preferably has a molecular weight of 100 to 2000, more preferably 200 to 2000.

The low-molecular-weight surfactant dispersant has a structure including an ionic group and a hydrophobic group serving as a nonionic group. At least one ionic group and at least one hydrophobic group are each independently included in a single molecule. The molecule may have a plurality of ionic-group species and a plurality of hydrophobic-group species. The molecule may appropriately have a linking group for linking the ionic group and the hydrophobic group to each other.

The ionic group may be, for example, an anionic group, a cationic group, or betaine that is a combination of an anionic group and a cationic group.

The anionic group may be any group having a negative charge, but is preferably a phosphate group, a phosphonate group, a phosphinate group, a sulfonic group, a sulfinate group, or a carboxy group, more preferably a phosphate group or a carboxy group, still more preferably a carboxy group.

The cationic group may be any group having a positive charge, but is preferably an organic cationic substituent, more preferably a nitrogen or phosphorus cationic group, still more preferably a pyridinium cation or an ammonium cation.

The ionic group is preferably an anionic group. The anionic group is preferably a phosphate group, a phosphonate group, a phosphinate group, a sulfonic group, a sulfinate group, or a carboxy group, more preferably a phosphate group or a carboxy group, still more preferably a carboxy group.

When the low-molecular-weight surfactant dispersant has, as the ionic group, an anionic group, in the case of also using a treatment liquid, from the viewpoint of bringing the agent into contact with an acidic treatment liquid, for example, to promote an aggregation reaction, the low-molecular-weight surfactant dispersant preferably has a pKa of 3 or more.

The pKa of the low-molecular-weight surfactant dispersant is a value determined in the following manner: a liquid containing 1 mmol/L of the low-molecular-weight surfactant dispersant dissolved in a tetrahydrofuran-water (3:2=V/V) solution is titrated with an acid or alkali aqueous solution; and, from the titration curve, the pKa is empirically determined.

When the low-molecular-weight surfactant dispersant has a pKa of 3 or more, and it comes into contact with a liquid having a pH of about 3, 50% or more of the anionic groups theoretically shift to an undissociated state. Thus, considerable degradation of the water solubility of the low-molecular-weight surfactant dispersant occurs, which results in an aggregation reaction. In other words, enhanced aggregation reactivity is provided. From such a viewpoint, the low-molecular-weight surfactant dispersant preferably has, as the anionic group, a carboxy group.

The hydrophobic group has, for example, a hydrocarbon, fluorocarbon, or silicone structure, particularly preferably a hydrocarbon structure. The hydrophobic group may have a linear structure or a branched structure. The hydrophobic group may have a one-chain structure or a one or more chain structure. In the case of a two or more chain structure, the chains may have a plurality of hydrophobic-group species.

The hydrophobic group is preferably a hydrocarbon group having 2 to 24 carbon atoms, more preferably a hydrocarbon group having 4 to 24 carbon atoms, still more preferably a hydrocarbon group having 6 to 20 carbon atoms.

The polymeric dispersant has a structure including an ionic group, and may be a water-soluble polymeric dispersant that is a hydrophilic polymer having an ionic group. This ionic group has the same definition as the ionic group in the above-described low-molecular-weight surfactant dispersant. Examples of the polymeric dispersant include natural hydrophilic polymers: vegetable polymers such as gum arabic, gum traganth, guar gum, karaya gum, locust bean gum, arabinogalactan, pectin, and quince seed starch; seaweed polymers such as alginic acid, carrageenan, and agar; animal polymers such as gelatin, casein, albumin, and collagen; and microbial polymers such as xanthan gum, and dextran.

Examples of hydrophilic polymers obtained by modifying natural products serving as raw materials include cellulose polymers such as methylcellulose, ethylcellulose, hydroxyethylcellulose, hydroxypropylcellulose, and carboxymethylcellulose; starch polymers such as sodium starch glycolate, and sodium starch phosphate; and seaweed polymers such as sodium alginate, and propylene glycol alginate.

Examples of synthetic hydrophilic polymers include vinyl polymers such as polyvinyl alcohol, polyvinylpyrrolidone, and polyvinyl methyl ether; acrylic resins such as uncrosslinked polyacrylamide, polyacrylic acid or alkali metal salt thereof, and water-soluble styrene-acrylic resin; water-soluble styrene-maleic acid resin, water-soluble vinylnaphthalene-acrylic resin, water-soluble vinylnaphthalene-maleic acid resin, polyvinylpyrrolidone, polyvinyl alcohol, alkali metal salt of β-naphthalenesulfonic acid formalin condensate, polymers having, as side chains, salt of a cationic functional group such as quaternary ammonium or an amino group; and natural polymers such as shellac.

In particular, preferred hydrophilic polymers are water-soluble dispersants having an introduced carboxy group, for example, homopolymers of acrylic acid, methacrylic acid, or styrene-acrylic acid, or copolymers of the foregoing and another monomer having a hydrophilic group.

Among polymeric dispersants, a water-insoluble dispersant may be used that is a polymer having both of a hydrophobic segment and a hydrophilic segment. Examples of the polymer having both of a hydrophobic segment and a hydrophilic segment include styrene-(meth)acrylic acid copolymers, styrene-(meth)acrylic acid-(meth)acrylate copolymers, (meth)acrylate-(meth)acrylic acid copolymers, polyethylene glycol (meth)acrylate-(meth)acrylic acid copolymers, vinyl acetate-maleic acid copolymers, and styrene-maleic acid copolymers.

The polymeric dispersant preferably has a weight-average molecular weight of 3000 to 100000, more preferably 5000 to 50000, still more preferably 5000 to 40000, particularly preferably 10000 to 40000.

From the viewpoint of self-dispersibility and aggregation rate upon contact with a treatment liquid, the polymeric dispersant preferably includes a polymer having a carboxy group, preferably includes a polymer having a carboxy group and an acid value of 100 mgKOH/g or less, more preferably includes a polymer having a carboxy group and an acid value of 25 mgKOH/g to 100 mgKOH/g.

In particular, when the ink composition is used in the form of an ink set having the ink composition and a treatment liquid for causing aggregation of components of the ink composition, it is effective for the ink composition to contain a polymeric dispersant having a carboxy group and an acid value of 25 mgKOH/g to 100 mgKOH/g. The treatment liquid will be described later.

The mixing mass ratio (p:s) of the pigment (p) to the dispersant (s) is preferably in the range of 1:0.06 to 1:3, more preferably 1:0.125 to 1:2, still more preferably 1:0.125 to 1:1.5.

In the present disclosure, from the viewpoint of, for example, light resistance or quality of images, a pigment and a dispersant are preferably included; more preferably, an organic pigment and a polymeric dispersant are included in the form of a water-dispersible pigment at least a part of a surface of which is covered with the polymeric dispersant. Particularly preferably, the ink composition includes an organic pigment and a polymeric dispersant including a carboxy group, and includes a water-dispersible pigment in which at least a part of a surface of which is covered with the polymeric dispersant having a carboxy group; from the viewpoint of aggregation, the pigment is preferably covered with the polymeric dispersant including a carboxy group and is water-insoluble.

The pigment being dispersed preferably has an average particle size of 10 nm to 200 nm, more preferably 10 nm to 150 nm, still more preferably 10 nm to 100 nm. When the average particle size is 200 nm or less, high color reproducibility is provided, and, in the case of performing an ink jet method, good droplet ejection characteristics are provided during ejection of droplets. When the average particle size is 10 nm or more, high light resistance is provided. The coloring material is not particularly limited in terms of particle size distribution, and may have a wide particle size distribution or a monodispersed particle size distribution. Two or more coloring materials having monodispersed particle size distributions may be mixed and used. Herein, the average particle size of a pigment being dispersed is the average particle size of the pigment being contained in ink; however, it is the same as in, what is called, a concentrated ink dispersion that is a precursor of the ink.

Incidentally, the average particle size and particle size distribution of a pigment being dispersed can be determined by measuring the volume-average particle size with a Nanotrac particle size distribution analyzer UPA-EX150 (manufactured by NIKKISO CO., LTD.) by a dynamic light scattering method.

At least one colorant selected from the group consisting of a colorant having an ionic group and a colorant at least a part of a surface of which is covered with a dispersant having an ionic group may be a single species alone or a combination of two or more species.

In the ink composition, the content of at least one colorant selected from the group consisting of a colorant having an ionic group and a colorant at least a part of a surface of which is covered with a dispersant having an ionic group, relative to the total mass of the ink composition, is preferably 1 mass % to 20 mass %, more preferably 2 mass % to 10 mass %, from the viewpoint of image density.

Other Components

The ink composition according to the present disclosure may contain, as needed, other components different from the above-described components. Such other components may be included in the cells of microcapsules (in other words, inside of microcapsules), or may be included outside of microcapsules.

Organic Solvent

The ink composition may contain at least one organic solvent. When an organic solvent is contained, further enhanced adhesiveness between the film and the substrate can be provided.

When the ink composition contains an organic solvent, the organic solvent content relative to the total mass of the ink composition is preferably 0.05 mass % to 50 mass %, more preferably 0.1 mass % to 20 mass %.

Specific examples of the organic solvent are as follows:
alcohols (such as methanol, ethanol, propanol, isopropanol, butanol, isobutanol, secondary butanol, tertiary butanol, pentanol, hexanol, cyclohexanol, and benzyl alcohol), polyhydric alcohols (such as ethylene glycol, diethylene glycol, triethylene glycol, polyethylene glycol, propylene glycol, dipropylene glycol, polypropylene glycol, butylene glycol, hexanediol, pentanediol, glycerol, hexanetriol, thiodiglycol, and 2-methylpropanediol), polyhydric alcohol ethers (such as ethylene glycol monomethyl ether, ethylene glycol monoethyl ether, ethylene glycol monobutyl ether, diethylene glycol monoethyl ether, diethylene glycol monomethyl ether, diethylene glycol monobutyl ether, propylene glycol monomethyl ether, propylene glycol monobutyl ether, tripropylene glycol monomethyl ether, dipropylene glycol monomethyl ether, dipropylene glycol dimethyl ether, ethylene glycol monomethyl ether acetate, triethylene glycol monomethyl ether, triethylene glycol monoethyl ether, triethylene glycol monobutyl ether, ethylene glycol monophenyl ether, and propylene glycol monophenyl ether), amines (such as ethanolamine, diethanolamine, triethanolamine, N-methyl di ethanol amine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, and tetramethylpropylenediamine), amides (such as formamide, N,N-dimethylformamide, and N,N-dimethylacetamide), heterocycles (2-pyrrolidone, N-methyl-2-pyrrolidone, cyclohexylpyrrolidone, 2-oxazolidone, 1,3-dimethyl-2-imidazolidinone, and γ-butyrolactone), sulfoxides (such as dimethyl sulfoxide), sulfones (such as sulfolane), and others (such as urea, acetonitrile, and acetone).

Surfactant

The ink composition according to the present disclosure may contain at least one surfactant.

When the ink composition according to the present disclosure contains a surfactant, the dispersion or the composition including the dispersion exhibits enhanced wettability to substrates.

Examples of the surfactant include nonionic surfactants such as polyoxyethylene alkyl ethers, polyoxyethylene alkylaryl ethers, acetylene glycols, polyoxyethylene/polyoxypropylene block copolymers, and siloxanes.

Other examples of the surfactant include fluoroorganic compounds. The fluoroorganic compounds are preferably hydrophobic.

The fluoroorganic compounds include fluorosurfactants, oily fluorocompounds (such as fluorinated oil), and solid fluorocompound resins (such as tetrafluoroethylene resin); examples include fluoroorganic compounds described in JP1982-9053B (JP-S57-9053B) (8th column to 17th column) and JP1987-135826A (JP-S62-135826A).

The ink composition according to the present disclosure, in which the shells of microcapsules have a three-dimensional cross-linked structure including an acidic group, has high dispersion stability of microcapsules. Thus, the ink composition may contain substantially no anionic surfactants, which are added for enhancing dispersibility.

Herein, "contain substantially no" means that the content relative to the total amount of the aqueous dispersion is 1 mass % or less (preferably 0.1 mass % or less).

Such an embodiment in which the ink composition contains substantially no anionic surfactants is advantageous in that foaming of the ink composition is suppressed. In particular, when a pigment dispersion having an anionic dispersing group and a microcapsule dispersion liquid are combined, advantages of suppressing degradation of dispersibility of the pigment are provided, the degradation being caused in the following manner: an anionic surfactant causes an increase in the ion concentration of the system to cause a decrease in the degree of electrolytic dissociation of the anionic pigment dispersant included for dispersing the pigment.

In an embodiment of the ink composition according to the present disclosure, the anionic surfactant content relative to the total amount of the aqueous dispersion may be 1 mass % or less.

Polymerization Inhibitor

The ink composition may include a polymerization inhibitor. When the ink composition includes a polymerization inhibitor, the ink composition can have further enhanced preservation stability.

Examples of the polymerization inhibitor include p-methoxyphenol, quinones (such as hydroquinone, benzoquinone, and methoxybenzoquinone), phenothiazine, catechols, alkylphenols (such as dibutylhydroxytoluene (BHT)), alkylbisphenols, zinc dimethyldithiocarbamate, copper dimethyldithiocarbamate, copper dibutyldithiocarbamate, copper salicylate, thiodipropionates, mercaptobenzimidazole, phosphites, 2,2,6,6-tetramethylpiperidine-1-oxyl (TEMPO), 2,2,6,6-tetramethyl-4-hydroxypiperidine-1-oxyl (TEMPOL), cupferron Al, and tris(N-nitroso-N-phenylhydroxylamine) aluminum salt.

Of these, the polymerization inhibitor is preferably at least one selected from the group consisting of p-methoxyphenol, catechols, quinones, alkylphenols, TEMPO, TEMPOL, cupferron Al, and tris(N-nitroso-N-phenylhydroxylamine) aluminum salt, more preferably at least one selected from the group consisting of p-methoxyphenol, hydroquinone, benzoquinone, BHT, TEMPO, TEMPOL, cupferron Al, and tris(N-nitroso-N-phenylhydroxylamine) aluminum salt.

Ultraviolet Absorbent

The ink composition according to the present disclosure may include an ultraviolet absorbent.

When the ink composition according to the present disclosure contains an ultraviolet absorbent, the film can have further enhanced weather resistance, for example.

The ultraviolet absorbent is not particularly limited, and examples include publicly known ultraviolet absorbents such as benzotriazole-based compounds, benzophenone-based compounds, triazine-based compounds, and benzoxazole-based compounds.

Components that can be Included Outside of Microcapsules

From the viewpoint of film properties, adhesiveness, and control of ejectability, the ink composition according to the present disclosure may contain, as needed, outside of microcapsules, for example, a photopolymerization initiator, a polymerizable compound, a water-soluble resin, or a water-dispersible resin.

Herein, "the ink composition contains a photopolymerization initiator outside of microcapsules" means that the ink composition contains a photopolymerization initiator that is not included in the cores of microcapsules. The same applies to the cases where, for example, a polymerizable compound, a water-soluble resin, or a water-dispersible resin is contained outside of microcapsules.

Photopolymerization Initiator that can be Contained Outside of Microcapsules

The photopolymerization initiator that can be contained outside of microcapsules may be the same as the above-described photopolymerization initiator (the photopolymerization initiator encapsulated within microcapsules).

The photopolymerization initiator that can be contained outside of microcapsules is preferably a water-soluble or water-dispersible photopolymerization initiator. Preferred specific examples include DAROCUR (registered trademark) 1173, IRGACURE (registered trademark) 2959, IRGACURE (registered trademark) 754, DAROCUR (registered trademark) MBF, IRGACURE (registered trademark) 819DW, IRGACURE (registered trademark) 500 (all from BASF), and acylphosphine oxide compounds described in WO2014/095724A.

Incidentally, in the photopolymerization initiator that can be contained outside of microcapsules, "water-soluble" is a property in which the photopolymerization initiator having been dried at 105° C. for 2 hours has a solubility of more than 1 g in 100 g of distilled water at 25° C.

In the photopolymerization initiator that can be contained outside of microcapsules, "water-dispersible" is a property in which the photopolymerization initiator is water-insoluble and is dispersed in water. This term "water-insoluble" is a property in which the photopolymerization initiator having been dried at 105° C. for 2 hours has a solubility of 1 g or less in 100 g of distilled water at 25° C.

Polymerizable Compound that can be Contained Outside of Microcapsules

Examples of the polymerizable compound that can be contained outside of microcapsules include radical polymerizable compounds such as a compound having an ethylenically unsaturated group, acrylonitrile, styrene, unsaturated polyester, unsaturated polyether, unsaturated polyamide, and unsaturated urethane.

Of these, the polymerizable compound that can be contained outside of microcapsules is preferably a compound having an ethylenically unsaturated group, particularly preferably a compound having a (meth)acryloyl group. Still more preferably, the polymerizable compound that can be contained outside of microcapsules is a water-soluble or water-dispersible polymerizable compound.

The "water-soluble" in the water-soluble polymerizable compound has the same definition as the above-described "water-soluble" in the "water-soluble photopolymerization initiator". The "water-dispersible" in the water-dispersible polymerizable compound has the same definition as the above-described "water-dispersible" in the "water-dispersible photopolymerization initiator".

From the viewpoint of being water-soluble or water-dispersible, the polymerizable compound that can be contained outside of microcapsules is preferably a compound having at least one selected from the group consisting of an amide structure, a polyethylene glycol structure, a polypropylene glycol structure, a carboxyl group, and a salt of a carboxy group.

From the viewpoint of being water-soluble or water-dispersible, the polymerizable compound that can be contained outside of microcapsules is preferably at least one selected from the group consisting of (meth)acrylic acid, sodium (meth)acrylate, potassium (meth)acrylate, N,N-dimethylacrylamide, N,N-diethylacrylamide, morpholineacrylamide, N-2-hydroxyethyl(meth)acrylamide, N-vinylpyrrolidone, N-vinylcaprolactam, 2-hydroxyethyl (meth)acrylate, 3-hydroxypropyl (meth)acrylate, 2-hydroxypropyl (meth)acrylate, glycerol monomethacrylate, N-[tris(3-acryloylaminopropyloxymethylene)methyl]acrylamide, diethylene glycol bis(3-acryloylaminopropyl) ether, polyethylene glycol di(meth)acrylate, polypropylene glycol di(meth)acrylate, compounds represented by Formula (a) to Formula (d) below, and ethoxylated trimethylolpropane triacrylate (such as SR9035 manufactured by Sartomer); more preferably, at least one selected from the group consisting of (meth)acrylic acid, N,N-dimethylacrylamide, N-2-hydroxyethyl(meth)acrylamide, 2-hydroxyethyl (meth)acrylate, glycerol monomethacrylate, N-[tris(3-acryloylaminopropyloxymethylene)methyl]acrylamide, diethylene glycol bis(3-acryloylaminopropyl) ether, polyethylene glycol di(meth)acrylate, polypropylene glycol di(meth)acrylate, compounds represented by Formula (a) to Formula (d) below, and ethoxylated trimethylolpropane triacrylate (such as SR9035 manufactured by Sartomer).

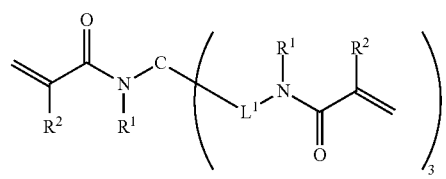

Formula (a)

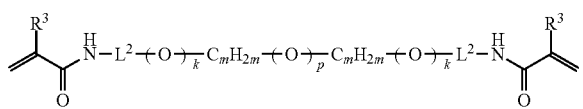

Formula (b)

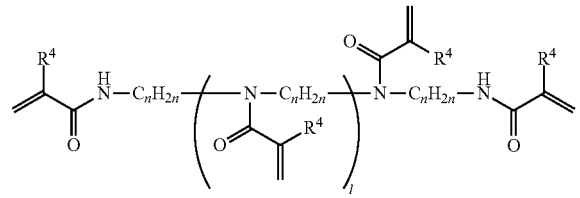

Formula (c)

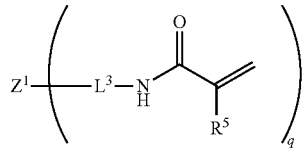

Formula (d)

In Formula (a), the plurality of $R^1$'s each independently represent a hydrogen atom, an alkyl group, an aryl group, or a heterocyclic group; the plurality of $R^2$'s each independently represent a hydrogen atom or a methyl group; and the plurality of $L^1$'s each independently represent a single bond or a divalent linking group.

In Formula (b), the plurality of $R^3$'s each independently represent a hydrogen atom or a methyl group; the plurality of $L^2$'s each independently represent an alkylene group having 1 to 8 carbon atoms; the plurality of k's and p each independently represent 0 or 1; the plurality of m's each independently represent an integer of 0 to 8; however, at least one of k's or p is 1.

In Formula (c), the plurality of $R^4$'s each independently represent a hydrogen atom or a methyl group; the plurality of n's each independently represent an integer of 1 to 8; and l represents an integer of 0 or 1.

In Formula (d), $Z^1$ represents a residue of polyol in which q hydrogen atoms have been removed from the hydroxyl groups; q represents an integer of 3 to 6; the plurality of $R^5$'s each independently represent a hydrogen atom or a methyl group; and the plurality of $L^3$'s each independently represent an alkylene group having 1 to 8 carbon atoms.

Specific examples of compounds represented by Formula (a) to Formula (d) include compounds represented by the following AM-1 to AM-4.

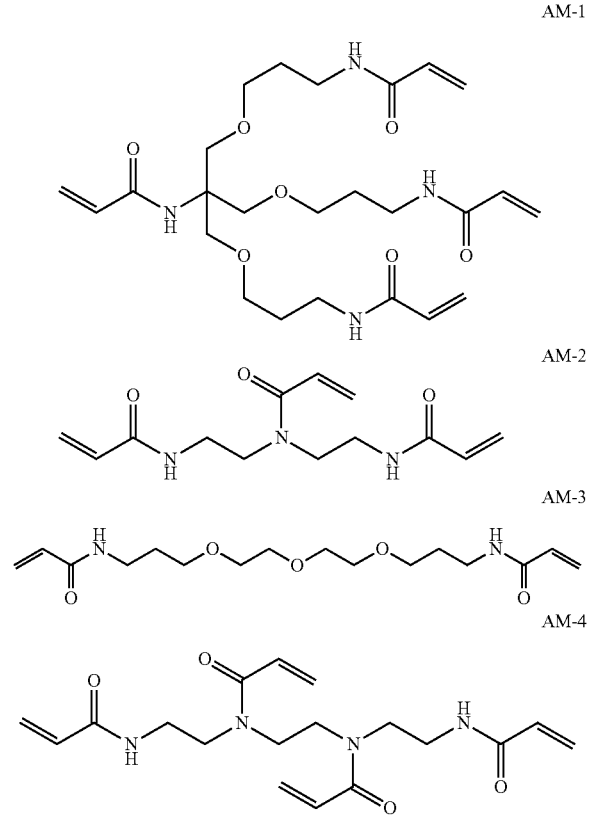

AM-1 to AM-4 above can be synthesized by the method described in JP5591858B.
Water-soluble resin or water-dispersible resin that can be contained outside of microcapsules The water-soluble resin or water-dispersible resin that can be contained outside of microcapsules is not particularly limited in terms of structure, and may have a desired structure. Examples of the structure of the water-soluble resin or water-dispersible resin that can be contained outside of microcapsules include a chain structure, a branched structure, a star structure, a cross-linked structure, and a network structure.

In the water-soluble resin that can be contained outside of microcapsules, "water-soluble" has the same meaning as the above-described "water-soluble" of "photopolymerization initiator that can be contained outside of microcapsules". In the water-dispersible resin that can be contained outside of microcapsules, "water-dispersible" has the same meaning as the above-described "water-dispersible" of "photopolymerization initiator that can be contained outside of microcapsules".

The water-soluble resin or water-dispersible resin is preferably a resin that has a functional group selected from the group consisting of a carboxy group, salt of a carboxy group, a sulfo group, salt of a sulfo group, a sulfate group, salt of a sulfate group, a phosphonate group, salt of a phosphonate group, a phosphate group, salt of a phosphate group, an ammonium base, a hydroxy group, a carboxylic amide group, and an alkyleneoxy group.

The counter cations of the above-described salts are preferably cations of alkali metals such as sodium and potassium, cations of alkaline-earth metals such as calcium and magnesium, ammonium cations, and phosphonium cations, particularly preferably alkali metal cations.

An alkyl group included in the ammonium group of the ammonium base is preferably a methyl group or an ethyl group.

The counter anion of the ammonium base is preferably an anion of a halogen such as chlorine or bromine, a sulfate anion, a nitrate anion, a phosphate anion, a sulfonate anion, a carboxylic anion, or a carbonate anion, particularly preferably a halogen anion, a sulfonate anion, or a carboxylic anion.

A substituent on the nitrogen atom of the carboxylic amide group is preferably an alkyl group having 8 or less carbon atoms, particularly preferably an alkyl group having 6 or less carbon atoms.

The resin having an alkyleneoxy group preferably has an alkyleneoxy chain constituted by repeated alkyleneoxy groups. The number of alkyleneoxy groups included in the alkyleneoxy chain is preferably 2 or more, particularly preferably 4 or more.

Preferred Properties of Ink Composition

When the ink composition is set at 25° C. to 50° C., the ink composition preferably has a viscosity of 3 mPa·s to 15 mPa·s, more preferably 3 mPa·s to 13 mPa·s. In particular, when the ink composition is set at 25° C., the ink composition preferably has a viscosity of 50 mPa·s or less. When the ink composition has a viscosity satisfying such a range, the ink composition applied as ink to ink jet recording provides high ejection stability.

In the application to ink jet recording, variations in the viscosity of the ink composition considerably affect variations in the droplet size and variations in the droplet ejection rate, which results in degradation of image quality. For this reason, the ink composition during ejection should be kept at a temperature as constant as possible. Thus, the temperature of the ink composition is preferably controlled to be within ±5° C. from the setting temperature, more preferably within ±2° C. from the setting temperature, still more preferably within ±1° C. from the setting temperature.

Incidentally, the viscosity of the ink composition is a value measured with a viscometer (VISCOMETER TV-22, Toki Sangyo Co., Ltd.).
Method for Producing Ink Composition The method for producing the ink composition according to the present disclosure is not particularly limited as long as the method enables production of the above-described ink composition, and a desired method can be appropriately selected. The method for producing the ink composition may include a step of preparing a microcapsule dispersion, and a step of mixing the microcapsule dispersion and a colorant. The ink composition is preferably produced by a production method according to the following first aspect, second aspect, third aspect, or fourth aspect.

(1) First Aspect

The method for producing the ink composition according to the first aspect has a step of mixing together an aqueous phase including water and an oil phase including a "compound having an acidic group and an active hydrogen group, a pKa of 5 or less, and a molecular weight of 2000 or less" (in this Specification, also referred to as "compound having an acidic group and an active hydrogen group"), a tri- or higher functional isocyanate compound, and an organic solvent, and performing emulsification dispersing, to prepare a microcapsule dispersion (hereafter, also referred to as "first microcapsule preparation step"); and a step of mixing together the prepared microcapsule dispersion and a colorant selected from the group consisting of a colorant having an ionic group and a colorant at least a part of a surface of which is covered with a dispersant having an ionic group (hereafter, also referred to as "first mixing step").

(2) Second Aspect

The method for producing the ink composition according to the second aspect has a step of mixing together an oil phase including a tri- or higher functional isocyanate compound and an organic solvent, and an aqueous phase including a compound having an acidic group and an active hydrogen group, a pKa of 5 or less, and a molecular weight of 2000 or less (compound having an acidic group and an active hydrogen group), a basic compound, and water, and performing emulsification dispersing, to prepare a microcapsule dispersion (hereafter, also referred to as "second microcapsule preparation step"); and a step of mixing together the prepared microcapsule dispersion and a colorant selected from the group consisting of a colorant having an ionic group and a colorant at least a part of a surface of which is covered with a dispersant having an ionic group (hereafter, also referred to as "second mixing step").

In the second aspect, the second microcapsule preparation step is more preferably performed such that emulsification dispersing is performed under heating at a predetermined temperature.

(3) Third Aspect

The method for producing the ink composition according to the third aspect has a step of mixing together an oil phase including a tri- or higher functional isocyanate compound and an organic solvent, and an aqueous phase including a compound having an acidic group and an active hydrogen group, a pKa of 5 or less, and a molecular weight of 2000 or less (compound having an acidic group and an active hydrogen group) and water, and performing emulsification dispersing under heating at a predetermined temperature, to prepare a microcapsule dispersion (hereafter, also referred to as "third microcapsule preparation step"); and a step of mixing together the prepared microcapsule dispersion and a colorant selected from the group consisting of a colorant having an ionic group and a colorant at least a part of a surface of which is covered with a dispersant having an ionic group (hereafter, also referred to as "third mixing step").

(4) Fourth Aspect

The method for producing the ink composition according to the fourth aspect has a step of mixing an oil phase including a tri- or higher functional isocyanate compound and an organic solvent and being heated at a predetermined temperature (preferably 35° C. to 70° C.), and an aqueous phase including a compound having an acidic group and an active hydrogen group, a pKa of 5 or less, and a molecular weight of 2000 or less (compound having an acidic group and an active hydrogen group) and water, and performing emulsification dispersing, to prepare a microcapsule dispersion (hereafter, also referred to as "fourth microcapsule preparation step"); and a step of mixing together the prepared microcapsule dispersion and a colorant selected from the group consisting of a colorant having an ionic group and a colorant at least a part of a surface of which is covered with a dispersant having an ionic group (hereafter, also referred to as "fourth mixing step").

In this Specification, the first microcapsule preparation step, the second microcapsule preparation step, the third microcapsule preparation step, and the fourth microcapsule preparation step may be collectively referred to as "microcapsule preparation step".

In addition, the first mixing step, the second mixing step, the third mixing step, and the fourth mixing step may be collectively referred to as "mixing step".

Microcapsule Preparation Step

In the microcapsule preparation step, an oil phase and an aqueous phase are mixed together, and the resultant mixture is emulsified to prepare an ink composition including microcapsules in which a shell having a three-dimensional cross-linked structure is formed so as to surround a core (preferably a core including at least one of a polymerizable compound or a photopolymerization initiator). The microcapsules are provided as dispersoid dispersed in the ink composition. The water in the aqueous phase serves as the dispersion medium in the ink composition.

The first microcapsule preparation step in the first aspect is a step of mixing together an aqueous phase including water and an oil phase including a compound having an acidic group and an active hydrogen group, a tri- or higher functional isocyanate compound, and an organic solvent, and performing emulsification dispersing, to prepare a microcapsule dispersion.

In this aspect, the oil phase contains a compound having an acidic group and an active hydrogen group and an isocyanate compound. The compound having an acidic group and an active hydrogen group and the isocyanate compound are included not in the aqueous phase but in the oil phase and subjected to emulsification dispersing, to thereby achieve a reduction in the content ratio of the acidic group-containing compound that is in a free state in the emulsion liquid.

Specifically, the oil phase includes a compound having an acidic group and an active hydrogen group, a tri- or higher functional isocyanate compound, and an organic solvent (and may further include, for example, a polymerizable compound, and a photopolymerization initiator). The aqueous phase includes water.

The second microcapsule preparation step in the second aspect is a step of mixing together an oil phase including a tri- or higher functional isocyanate compound and an organic solvent, and an aqueous phase including a compound having an acidic group and an active hydrogen group, a basic compound, and water, and performing emulsification dispersing to prepare a microcapsule dispersion.

In this aspect, the aqueous phase includes a compound having an acidic group and an active hydrogen group. When the aqueous phase includes a compound having an acidic group and an active hydrogen group, a basic compound serving as a neutralizer is used to perform neutralization, so that the reaction of forming microcapsules by emulsification proceeds more efficiently. This enables a reduction in the content ratio of the acidic group-containing compound in the ink composition. When the emulsification is performed under heating, at least a portion of the organic solvent included as the oil phase is easily removed from the mixture.

Specifically, the oil phase includes a tri- or higher functional isocyanate compound, and an organic solvent (and may further include, for example, a polymerizable compound and a photopolymerization initiator). The aqueous phase includes a compound having an acidic group and an active hydrogen group, a basic compound, and water.

The basic compound included in the aqueous phase is not particularly limited. The basic compound included in the aqueous phase functions as a neutralizer for the acidic group.

Examples of the basic compound include inorganic bases such as sodium hydroxide and potassium hydroxide, and organic bases such as triethylamine. In particular, from the viewpoint of the dispersion stability of microcapsules, preferred basic compounds are inorganic bases such as sodium hydroxide and potassium hydroxide.

Use of an inorganic base as the basic compound provides a higher surface potential of microcapsules. Thus, the effect of charge repulsion between microcapsules is expected to provide an advantage of a reduction in the probability of aggregation of microcapsules. This provides enhanced temporal dispersion stability (namely, preservation stability).

The neutralization ratio of an acidic group included in the compound having an acidic group and an active hydrogen group is preferably 50% to 100%, more preferably 80% to 95%. During formation of the shells of microcapsules, when the neutralization ratio of the acidic group is set to satisfy such a range, the reaction of forming microcapsules proceeds more efficiently, which results in a decrease in the amount of the free acidic group-containing compound. In addition, when the neutralization ratio satisfies such a range, the microcapsules have high dispersion stability.

The "neutralization ratio" is, in an acidic group of the compound having an acidic group and an active hydrogen group in the aqueous phase, the ratio of the number of moles of a "neutralized acidic group" to the total of the number of moles of the neutralized acidic group and the number of moles of an unneutralized acidic group [number of moles of neutralized acidic group/(number of moles of neutralized acidic group+number of moles of unneutralized acidic group)].

Method of Measuring Neutralization Ratio

The neutralization ratio (%) of an acidic group included in the compound having an acidic group and an active hydrogen group is measured by the following potential difference measurement method on the basis of the neutralization ratio (%) of the acidic group included in the three-dimensional cross-linked structures of shells. The measurement device is not particularly limited, and is preferably, for example, an automatic potentiometric titrator (model: AT-510) from Kyoto Electronics Manufacturing Co., Ltd.

Hereinafter, an example case in which the acidic group is a carboxy group (—COOH) will be described. Incidentally, when the acidic group is a group other than the carboxy group (such as a sulfo group or a phosphate group), the neutralization ratio can be measured in accordance with the following description except that the carboxy group is replaced by the group other than the carboxy group.

The neutralization ratio of an acidic group included in the three-dimensional cross-linked structures of shells is measured by the following method.

An ink composition (50 g) prepared is centrifuged under conditions at 80,000 rpm for 40 minutes. The supernatant liquid generated by the centrifugation is removed, and the precipitate (microcapsules) is collected.

The collected microcapsules are weighed (about 0.5 g) and transferred into Vessel 1, and Weighed value W1 (g) is recorded. Subsequently, a mixture of 54 mL of tetrahydrofuran (THF) and 6 mL of distilled water is added, to dilute the weighed microcapsules to thereby obtain Neutralization-ratio-measurement sample 1.

The obtained Neutralization-ratio-measurement sample 1 is titrated with a titrant that is a 0.1 N (=0.1 mol/L) sodium hydroxide aqueous solution, and the amount of titrant required to reach the equivalence point is recorded as F1 (mL). When titration provides a plurality of equivalence points, the value at an equivalence point of the maximum titer is employed. This "maximum titer F1 (mL)" corresponds to the amount of unneutralized acid group (namely, —COOH) in the acid group introduced into the shells of microcapsules.

The collected microcapsules are weighed (about 0.5 g) and transferred into Vessel 2, and Weighed value W2 (g) is recorded. Subsequently, 60 mL of acetic acid is added, to dilute the weighed microcapsules to thereby obtain Neutralization-ratio-measurement sample 2.

The obtained Neutralization-ratio-measurement sample 2 is titrated with a titrant that is a 0.1 N (=0.1 mol/L) perchloric acid-acetic acid solution, and the amount of titrant to reach the equivalence point is recorded as F2 (mL). When titration provides a plurality of equivalence points, the value at an equivalence point of the maximum titer is employed. This "maximum titer F2 (mL)" corresponds to the amount of neutralized acid group (namely, —COONa) in the acid group introduced into the shells of microcapsules.

The neutralization ratio (%) of a carboxy group serving as the acidic group is determined from the measurement values "F1 (mL)" and "F2 (mL)" by the following formulas.

$F1$ (mL)×Normality of sodium hydroxide aqueous solution (0.1 mol/L)/$W1$ (g)+$F2$ (mL)×Normality of perchloric acid-acetic acid solution (0.1 mol/L)/$W2$ (g)=Amount of carboxy group introduced into shells per gram of microcapsules (mmol/g)　　　(1)

$F2$ (mL)×Normality of perchloric acid-acetic acid solution (0.1 mol/L)/$W2$ (g)=Amount of neutralized carboxy group in carboxy group introduced into shells per gram of microcapsules (mmol/g)　　　(2)

Neutralization ratio (%)=(2)/(1)×100

In the second aspect, in the second microcapsule preparation step, emulsification dispersing after the neutralization may be performed under heating.

When the emulsification is performed under heating, the heating temperature (namely, reaction temperature) is preferably 35° C. to 70° C., more preferably 40° C. to 60° C. When the emulsification is performed under heating, the heating time (namely, reaction time) is preferably 6 hours to 50 hours, more preferably 12 hours to 40 hours, still more preferably 15 hours to 35 hours.

In the third aspect, the third microcapsule preparation step is a step of mixing together an oil phase including a tri- or higher functional isocyanate compound and an organic solvent, and an aqueous phase including a compound having an acidic group and an active hydrogen group and water, and performing emulsification dispersing under heating at a predetermined temperature, to prepare a microcapsule dispersion.

In this aspect, the aqueous phase includes a compound having an acidic group and an active hydrogen group. When the aqueous phase includes a compound having an acidic group and an active hydrogen group, as in the second aspect, emulsification dispersing is performed under heating, so that the reaction of forming microcapsules by emulsification proceeds more efficiently. This enables a reduction in the content ratio of the acidic group-containing compound in the ink composition. In addition, when the emulsification is performed under heating, at least a portion of the organic solvent included as the oil phase is easily removed from the mixture.

The oil phase includes a tri- or higher functional isocyanate compound, and an organic solvent (may further include, for example, a polymerizable compound, and a photopolymerization initiator). The aqueous phase includes a compound having an acidic group and an active hydrogen group, and water.

When the emulsification is performed under heating, the heating temperature (namely, reaction temperature) is preferably 35° C. to 70° C., more preferably 40° C. to 60° C.

When the emulsification is performed under heating, the heating time (namely, reaction time) is preferably 6 hours to 50 hours, more preferably 12 hours to 40 hours, still more preferably 15 hours to 35 hours.

In the fourth aspect, the fourth microcapsule preparation step is a step of mixing together an oil phase including a tri- or higher functional isocyanate compound and an organic solvent, and being heated at a predetermined temperature (preferably 35° C. to 70° C.), and an aqueous phase including a compound having an acidic group and an active hydrogen group and water, and performing emulsification dispersing, to prepare a microcapsule dispersion.

In this aspect, the aqueous phase includes a compound having an acidic group and an active hydrogen group. When the aqueous phase includes a compound having an acidic group and an active hydrogen group, heating the oil phase also enables a reduction in the content ratio of the acidic group-containing compound in the prepared ink composition.

The oil phase includes a tri- or higher functional isocyanate compound, and an organic solvent (may further include, for example, a polymerizable compound, and a photopolymerization initiator).

The aqueous phase includes a compound having an acidic group and an active hydrogen group, and water.

In each microcapsule preparation step, specifically, as a result of the reaction between the tri- or higher functional isocyanate compound and water, shells having three-dimensional cross-linked structures including urea bonds are formed.

When the tri- or higher functional isocyanate compound has a urethane bond, the three-dimensional cross-linked structures of shells include urethane bonds.

When at least one of an oil phase or an aqueous phase includes the above-described compound having two or more active hydrogen groups, as a result of the reaction between a tri- or higher functional isocyanate compound and the compound having two or more active hydrogen groups, shells having three-dimensional cross-linked structures including urethane bonds are formed.

In the method for producing an ink composition according to the second aspect, in the second microcapsule preparation step, as a result of the reaction between the compound having an acidic group and an active hydrogen group and a basic compound serving as a neutralizer, the acidic group is neutralized. The compound having an acidic group and an active hydrogen group also contributes to the reaction of forming shells. When the active hydrogen group included in the compound having an acidic group and an active hydrogen group is, for example, an amino group, as a result of the reaction between the tri- or higher functional isocyanate compound and the compound having an acidic group and an active hydrogen group, the acidic group is introduced into the shells via urea bonds.

On the other hand, when the active hydrogen group included in the compound having an acidic group and an active hydrogen group is, for example, a hydroxy group, as a result of the reaction between the tri- or higher functional isocyanate compound and the compound having an acidic group and an active hydrogen group, the acidic group is introduced into shells via urethane bonds.

In the aspect in which an acidic group is introduced into the three-dimensional cross-linked structures of shells via urea bonds, urea bonds are less hydrolyzable than urethane bonds, and the acidic group is more strongly bonded to the three-dimensional cross-linked structures of shells. As a result, the ink composition has higher preservation stability.

The acidic group introduced into shells may have the form of salt. Such salt of the acidic group functions as a hydrophilic group, and effectively disperses microcapsules in water. In this case, the neutralization ratio of the acidic group can be adjusted with, for example, the amount of basic compound.

When the oil phase includes at least one of a polymerizable compound or a photopolymerization initiator, the resultant cores include at least one of the polymerizable compound or the photopolymerization initiator.

Examples of the organic solvent included in the oil phase include ethyl acetate and methyl ethyl ketone.

At least a portion of the organic solvent is preferably removed during the formation process of microcapsules, or after formation of microcapsules.

The details of the tri- or higher functional isocyanate compound included in the oil phase are the same as those described above.

The details of the photopolymerization initiator included in the oil phase are the same as in the photopolymerization initiator included in cores (namely, encapsulated photopolymerization initiator).

The details of the isocyanate compound having an introduced polymerizable group and the polymerizable compound included in the oil phase are the same as those described above.

The oil phase may include, in addition to the above-described components, other components as needed.

Examples of the other components include the above-described compounds having a nonionic group (preferably, the above-described isocyanate compounds having an added nonionic group).

When the oil phase includes a compound having a nonionic group, the nonionic group is introduced into shells, to form shells having the nonionic group.

The "compound having an acidic group and an active hydrogen group" included in the oil phase or the aqueous phase is not particularly limited. Examples of the acidic group include a carboxy group, a sulfo group, a phosphate group, and a phosphonate group. From the viewpoint of the dispersion stability of the microcapsules, preferred is at least one selected from the group consisting of a carboxy group, a sulfo group, and a phosphate group, more preferably a carboxy group.

Examples of the active hydrogen group include, as described above, a hydroxy group, amino groups (a primary amino group and a secondary amino group), and a mercapto group.

The compound having an acidic group and an active hydrogen group may have a single species of an acid group and a single species of an active hydrogen group; or may have a single species of one of an acid group and an active hydrogen group, and two or more species of the other one;

or may have two or more species of an acid group and two or more species of an active hydrogen group.

Examples of the compound having an acidic group and an active hydrogen group include amino acids such as α-amino acids (lysine, alanine, arginine, asparagine, aspartic acid, cysteine, glutamine, glutamic acid, glycine, histidine, isoleucine, leucine, methionine, phenylalanine, proline, serine, threonine, tryptophan, tyrosine, and valine), malic acid, taurine, ethanolamine phosphate (EAP), and the following specific examples.

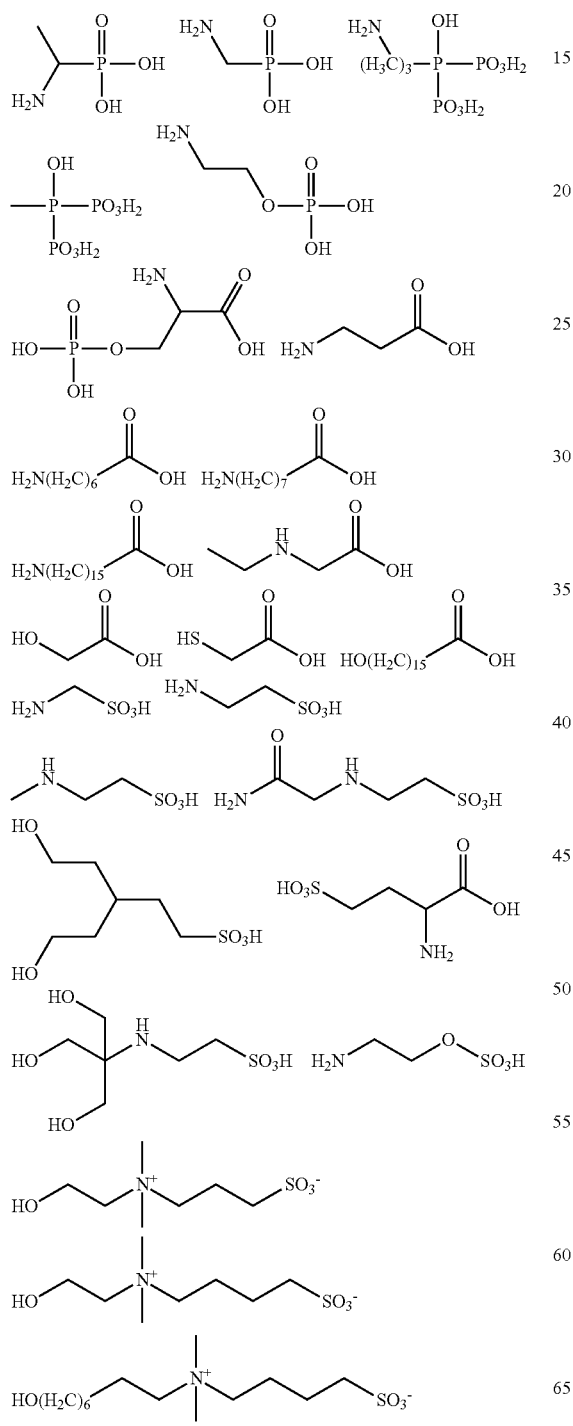

The aqueous phase may include, in addition to the above-described components, other components as needed.

Examples of the other components include the above-described surfactants.

In the production method according to this embodiment, the total amount of the oil phase and the aqueous phase except for the organic solvent and water (hereafter, also referred to as "the total solid content") corresponds to the total solid content of microcapsules to be produced.

The amount of tri- or higher functional isocyanate compound in the oil phase is not particularly limited, and the amount relative to the total solid content is preferably 10 mass % to 70 mass %, for example.

The amount of photopolymerization initiator in the oil phase is not particularly limited, and the amount relative to the total solid content is preferably 0.1 mass % to 25 mass %, for example.

When the oil phase includes a polymerizable compound, the amount of polymerizable compound in the oil phase is not particularly limited, and the amount relative to the total solid content is preferably 0.1 mass % to 75 mass %, for example.

The amount of organic solvent is not particularly limited, and is appropriately set in accordance with, for example, the types and amounts of components included in the oil phase.

In the preparation step of microcapsules, the amount of "compound having an acidic group and an active hydrogen group" in the aqueous phase is not particularly limited, and the amount relative to the total solid content is preferably, for example, 50 mass % to 100 mass %.

In the preparation step of microcapsules, the amount of "basic compound" in the aqueous phase is not particularly limited as long as a desired neutralization ratio of the acidic group is achieved; the amount is appropriately set in accordance with, for example, the type (specifically, the type of the acid group) and the amount (specifically, the amount of the acid group) of the compound having an acidic group and an active hydrogen group included in the aqueous phase.

The amount of water is not particularly limited, and may be appropriately selected in accordance with, for example, the types and amounts of components included in the oil phase.

The oil phase may include a compound having a nonionic group. When such a compound having a nonionic group is included in the oil phase, the amount of compound having a nonionic group in the oil phase is not particularly limited; the amount relative to the total solid content is preferably, for example, 0.1 mass % to 40 mass %.

The components included in the oil phase may be simply mixed together: all the components may be mixed together all at once, or the components may be divided into several groups and mixed.

As in the oil phase, the components included in the aqueous phase may be simply mixed together: all the components may be mixed together all at once, or the components may be divided into several groups and mixed.

The method of mixing the oil phase and the aqueous phase is not particularly limited, and the mixing may be performed by, for example, stirring.

The method of emulsifying the mixture obtained by mixing is not particularly limited, and is, for example, emulsification using an emulsification device such as a homogenizer (such as a dispersing device).

In the emulsification, the number of rounds of such a dispersing device is, for example, 5000 rpm to 20000 rpm, preferably 10000 rpm to 15000 rpm.

In the emulsification, the time of rounds is, for example, 1 minute to 120 minutes, preferably 3 minutes to 60 minutes, more preferably 3 minutes to 30 minutes, still more preferably 5 minutes to 15 minutes.

The microcapsule preparation step may include an emulsification stage of emulsifying the mixture (including the case of performing emulsification dispersing under heating at 35° C. to 70° C.), and a heating stage of heating (for example, at a temperature of 35° C. or more) the emulsion obtained in the emulsification stage.

In the embodiment in which the microcapsule preparation step includes the emulsification stage and the subsequent heating stage, shells having stronger three-dimensional cross-linked structures are formed. This enables production of an ink composition that enables formation of films having higher hardness.

In the embodiment in which the microcapsule preparation step includes the emulsification stage and the heating stage, the preferred ranges of the heating temperature and heating time in the heating stage are the same as the preferred ranges of the heating temperature and heating time in the case of performing emulsification under heating.

The heating stage may include a first heating stage of removing the organic solvent from the emulsion, and a second heating stage of heating the emulsion at a temperature higher than that in the first heating stage.

Such an embodiment in which the heating stage includes the first heating stage and the second heating stage enables formation of shells having even stronger three-dimensional cross-linked structures, which is more preferred.

From the viewpoint of efficiently causing the neutralization reaction of the acidic group of the compound having an acidic group and an active hydrogen group, the method for producing an ink composition is preferably an embodiment in which the compound having an acidic group and an active hydrogen group and a basic compound serving as a neutralizer are included in the same phase, in other words, the method for producing an ink composition according to the second aspect.

From the viewpoint of further reducing, in the ink composition to be prepared, the content ratio of the acidic group-containing compound (acidic group-containing compound having at least an acidic group, an acid dissociation constant of 5 or less, and a molecular weight of 2000 or less), preferred are methods for producing an ink composition according to the first aspect, the second aspect, and the third aspect, more preferred are the second aspect and the third aspect.

In the method for producing an ink composition according to the first aspect, the amount of "compound having an acidic group and an active hydrogen group" in the oil phase is not particularly limited; the amount relative to the total solid content may be set to, for example, 0.1 mass % to 40 mass %.

In the methods for producing an ink composition according to the second aspect to the fourth aspect, the amount of "compound having an acidic group and an active hydrogen group" in the aqueous phase is not particularly limited; the amount relative to the total solid content may be set to, for example, 50 mass % to 100 mass %.

In the method for producing an ink composition according to the second aspect, the amount of "basic compound" in the aqueous phase is not particularly limited as long as a desired neutralization ratio of the acidic group is achieved; the amount is appropriately set in accordance with, for example, the type (specifically, the type of the acid group) and the amount (specifically, the amount of the acid group) of the compound having an acidic group and an active hydrogen group.

Another Step

The production method according to this embodiment may have, in addition to the microcapsule preparation step, another step as needed.

Such another step may be a step of adding another component.

Such another component added is the same as the components described above as other components that can be contained in the ink composition.

Ink Set

An ink set according to the present disclosure has the above-described ink composition, and a treatment liquid that includes a compound selected from the group consisting of a polyvalent metal salt, an acidic compound, and a cationic polymer (hereafter, also referred to as "aggregation component"), and that causes aggregation of components in the ink composition.

Details of the ink composition are the same as those described above.

Treatment Liquid

The treatment liquid contains at least one compound (aggregation component) selected from the group consisting of a polyvalent metal salt, an acidic compound, and a cationic polymer. The aggregation component causes, upon contact of the treatment liquid with the ink composition, aggregation of components in the ink to generate aggregate. The treatment liquid preferably includes, in addition to the aggregation component, water, and may further contain, as needed, for example, other additives such as a water-soluble organic solvent and a surfactant.

When the treatment liquid includes an acidic compound, the acidic compound enables aggregation of the components in the ink composition.

The acidic compound included in the treatment liquid is not particularly limited. Examples of the acidic group include a phosphate group, a phosphonate group, a phosphinate group, a sulfonic group, a sulfinate group, and a carboxy group. In the present disclosure, from the viewpoint of the aggregation rate of the ink composition, the acidic group is preferably a phosphate group or a carboxy group, more preferably a carboxy group.

Preferred examples of organic compounds having a carboxy group (organic carboxylic acids) include polyacrylic acid, acetic acid, glycolic acid, malonic acid, malic acid (preferably, DL-malic acid), maleic acid, ascorbic acid, succinic acid, glutaric acid, fumaric acid, citric acid, tartaric acid, phthalic acid, 4-methylphthalic acid, lactic acid, sulfonic acid, orthophosphoric acid, pyrrolidonecarboxylic acid, pyronecarboxylic acid, pyrrolecarboxylic acid, furancarboxylic acid, pyridinecarboxylic acid, coumarinic acid, thiophenecarboxylic acid, nicotinic acid, derivatives of the foregoing compounds, and salts of the foregoing (for example, polyvalent metal salts). Such organic carboxylic acids may be included alone or in combination of two or more thereof.

From the viewpoint of the aggregation rate of the ink composition, the organic carboxylic acid is preferably a di- or higher valent carboxylic acid (hereafter, also referred to as "polycarboxylic acid"), more preferably at least one selected from the group consisting of malonic acid, malic acid, maleic acid, succinic acid, glutaric acid, fumaric acid, tartaric acid, 4-methylphthalic acid, and citric acid, particularly preferably at least one selected from the group consisting of malonic acid, malic acid, tartaric acid, and citric acid.

Among acidic compounds, in the case of requiring better mechanical characteristics, citric acid is preferred because it has a high water-holding capacity, and tends to provide a higher physical strength of an ink composition having aggregated components.

Alternatively, in the case of speeding up drying of the treatment liquid, malonic acid is preferred because of a low water-holding capacity.

The aggregation component may be appropriately selected in accordance with a subsidiary factor other than the aggregation capability for the ink composition.

The acidic compound included in the treatment liquid preferably has a low pKa. The particles, such as pigment and polymer particles, being stably dispersed with a weakly acidic functional group such as a carboxy group, in the ink composition are brought into contact with an acidic compound having a lower pKa to thereby decrease the surface charge of the particles. This enables a reduction in the dispersion stability.

The acidic compound included in the treatment liquid preferably has a low pKa, a high solubility in water, and di- or higher valence, more preferably is a divalent or trivalent acidic substance that has a high buffering capability for a region of pH lower than pKa of the functional group (such as a carboxy group) that stably disperses particles in the ink composition.

When the treatment liquid includes the acidic compound, the treatment liquid preferably has a pH (25° C.) of 0.1 to 6.0, more preferably 0.5 to 5.0, still more preferably 0.8 to 4.0.

Examples of the polyvalent metal salt include salts of Group 2 alkaline-earth metals (such as magnesium and calcium) in the periodic table, Group 3 transition metals (such as lanthanum) in the periodic table, cations of Group 13 (such as aluminum) in the periodic table, lanthanides (such as neodymium), zinc, copper, cobalt, nickel, and iron. Preferred metal salts include carboxylates (such as salts of formic acid, acetic acid, and benzoic acid), nitrates, chlorides, and thiocyanates. In particular, preferred are calcium salts or magnesium salts of carboxylic acids (such as formic acid, acetic acid, and benzoic acid), the calcium salt or magnesium salt of nitric acid, calcium chloride, magnesium chloride, and the calcium salt or magnesium salt of thiocyanic acid.

Incidentally, use of such a polyvalent metal salt provides enhanced water resistance of images.

Examples of the cationic polymer include compounds selected from the group consisting of poly(vinylpyridine) salt, polyalkylaminoethyl acrylate, polyalkylaminoethyl methacrylate, poly(vinylimidazole), polyethyleneimine, polybiguanide, polyguanide, and combinations of the foregoing. In particular, preferred are polyguanide and polyethyleneimine from the viewpoint of a strong effect of aggregation of ink, and resolution of images.

Incidentally, use of such a cationic polymer provides high adhesiveness between the image and the recording medium.

Such aggregation components can be used alone or in combination of two or more thereof.

Regarding the content of the aggregation component in the treatment liquid, the aggregation component being used for aggregation of the ink composition, the content of the acidic compound or the polyvalent metal salt relative to the total mass of the treatment liquid is preferably 1 mass % to 50 mass %, more preferably 5 mass % to 40 mass %, still more preferably 10 mass % to 30 mass %. The content of the cationic polymer relative to the total mass of the treatment liquid is preferably 0.1 mass % to 25 mass %, more preferably 0.5 mass % to 20 mass %, still more preferably 1.0 mass % to 15 mass %.

Water

The treatment liquid preferably contains water.

The water content relative to the total mass of the treatment liquid is preferably 50 mass % to 90 mass %, more preferably 60 mass % to 80 mass %.

Water-Soluble Organic Solvent

The treatment liquid preferably includes at least one water-soluble organic solvent.

The water-soluble organic solvent is not particularly limited as long as 5 g or more of the organic solvent dissolves in 100 g of water at 20° C. Specifically, water-soluble organic solvents that are described later and can be included in the ink composition can also be similarly used for the treatment liquid. In particular, from the viewpoint of suppression of curling, preferred are polyalkylene glycol and derivatives thereof, more preferred is at least one selected from the group consisting of diethylene glycol monoalkyl ether, triethylene glycol monoalkyl ether, dipropylene glycol, tripropylene glycol monoalkyl ether, polyoxypropylene glyceryl ether, and polyoxyethylene polyoxypropylene glycol.

From the viewpoint of, for example, coatability, the water-soluble organic solvent content of the treatment liquid relative to the total mass of the treatment liquid is preferably 3 mass % to 20 mass %, more preferably 5 mass % to 15 mass %.

Surfactant

The treatment liquid may include at least one surfactant. The surfactant may be used as a surface-tension adjusting agent. Examples of the surface-tension adjusting agent include nonionic surfactants, cationic surfactants, anionic surfactants, and betaine surfactants. In particular, from the viewpoint of the aggregation rate of the ink composition, preferred are nonionic surfactants and anionic surfactants.

Other examples of the surfactant include compounds described as surfactants in pages 37 and 38 of JP1984-157636A (JP-S59-157636A), and Research Disclosure No.

308119 (1989). Still other examples include fluoro-(fluoroalkyl) surfactants and silicone surfactants described in JP2003-322926A, JP2004-325707A, and JP2004-309806A.

The surfactant content of the treatment liquid is not particularly limited; the content is preferably set such that the treatment liquid has a surface tension of 50 mN/m or less, more preferably 20 mN/m to 50 mN/m, still more preferably 30 mN/m to 45 mN/m.

Other Additives

The treatment liquid may be provided so as to include, in addition to the acidic compound and the water-soluble organic solvent, other additives. Such other additives in the treatment liquid are the same as the above-described other additives for the ink composition.

Properties of Treatment Liquid

The treatment liquid preferably has a surface tension (25° C.) of 20 mN/m or more and 60 mN/m or less, more preferably 25 mN or more and 50 mN/m or less, still more preferably 25 mN/m or more and 45 mN/m or less.

The surface tension is a value obtained by measuring the treatment liquid under a condition of 25° C. with an Automatic Surface Tensiometer CBVP-Z (manufactured by Kyowa Interface Science Co., Ltd.).

From the viewpoint of application stability, the treatment liquid preferably has a viscosity (20° C.) of 1.2 mPa·s or more and 15.0 mPa·s or less, more preferably 2 mPa·s or more and less than 12 mPa·s, still more preferably 2 mPa·s or more and less than 8 mPa·s. When the viscosity is within such a range, the treatment liquid being applied, by a coating method, to a recording medium can be applied uniformly and stably.

The viscosity is a value measured under a condition of 25° C. with a VISCOMETER TV-22 (manufactured by TOKI SANGYO CO. LTD).

Incidentally, the viscosity of the treatment liquid can be appropriately changed in a standard manner (for example, by changing the type or content of the water-soluble organic solvent, or by adding a viscosity adjusting agent).

Image Recording Method

An image recording method according to the present disclosure has a step of applying the above-described ink composition to a recording medium (hereafter, also referred to as "ink application step"). Since the ink composition having high dispersion stability is used, desired images can be obtained with stability.

Ink Application Step

The ink application step is performed to apply the ink composition to a recording medium. This step is preferably performed by, for example, applying the ink composition to a recording medium by an ink jet method. This application of the ink composition to a recording medium by an ink jet method can be performed with a publicly known ink jet recording apparatus.

The ink jet recording apparatus is not particularly limited, and a publicly known ink jet recording apparatus that provides a target resolution can be freely selected and used. Specifically, any such publicly known ink jet recording apparatuses including commercially available products can be used to apply the ink composition to a recording medium by the image-forming method according to this embodiment.

Such an ink jet recording apparatus is, for example, an apparatus including an ink supply device, a temperature sensor, heating means, and the like.

The ink supply device includes, for example, a storage tank including ink that is the ink composition, supply pipes, an ink supply tank disposed immediately upstream of an ink jet head, a filter, and a piezo ink jet head. The piezo ink jet head may be operated so as to eject multisize dots of preferably 1 picoliter (pl) to 100 pl, more preferably 8 pl to 30 pl, at a resolution of preferably 320 dpi (dot per inch)× 320 dpi to 4000 dpi×4000 dpi, more preferably 400 dpi×400 dpi to 1600 dpi×1600 dpi, still more preferably 720 dpi×720 dpi. Herein, dpi means the number of dots for 2.54 cm (1 inch).

The recording medium is not particularly limited, and a publicly known recording medium can be used.

Examples of the recording medium include paper, paper laminated with plastic (such as polyethylene, polypropylene, or polystyrene), metal plates (plates of metals such as aluminum, zinc, or copper), plastic films [films of, for example, polyvinyl chloride (PVC: Polyvinyl Chloride) resin, cellulose diacetate, cellulose triacetate, cellulose propionate, cellulose butyrate, cellulose acetate butyrate, cellulose nitrate, polyethyleneterephthalate (PET: Polyethylene Terephthalate), polyethylene (PE: Polyethylene), polystyrene (PS: Polystyrene), polypropylene (PP: Polypropylene), polycarbonate (PC: Polycarbonate), polyvinyl acetal, or acrylic resin], paper laminated with or vapor-deposition-coated with the foregoing metals, and plastic films laminated with or vapor-deposition-coated with the foregoing metals.

Other examples of the recording medium include textile substrates.

Examples of the raw materials of the textile substrates include natural fibers such as cotton, silk, hemp, and wool; chemical fibers such as viscose rayon and lyocell; synthetic fibers such as polyester, polyamide, and acrylic; and mixtures of at least two species selected from the group consisting of natural fibers, chemical fibers, and synthetic fibers.

The textile substrates may be textile substrates described in Paragraphs [0039] to [0042] of WO2015/158592A.

The ink composition according to the present disclosure enables formation of films having high adhesiveness to recording media, and hence is particularly suitable for applications of forming films on unabsorptive recording media.

Preferred examples of the unabsorptive recording media include plastic recording media such as polyvinyl chloride (PVC) recording media, polystyrene (PS) recording media, polycarbonate (PC) recording media, polyethyleneterephthalate (PET) recording media, polyethylene (PE) recording media, polypropylene (PP) recording media, and acrylic resin recording media.

Curing Step

A curing step may be performed to cure the ink composition applied to a recording medium. The ink composition applied to a recording medium is exposed to light or heat, to cause a crosslinking reaction of microcapsules in the ink composition. This enables fixing of the image and enhancement of, for example, the film hardness of the image.

When the ink composition includes a photopolymerizable compound as the curable component, the curing step is preferably a step of performing irradiation with an active energy ray (light) to cure the ink composition (hereafter, Curing step A). When the ink composition includes a thermal polymerizable compound as the curable component, the curing step is preferably a step of performing heating or irradiation with infrared radiation to cure the ink composition (hereafter, Curing step B).

Curing Step A

The Curing step A may be performed in which the ink composition applied to a recording medium is irradiated with an active energy ray to cure the ink composition. The ink composition applied to a recording medium is irradiated with an active energy ray, to cause a crosslinking reaction of microcapsules in the ink composition, to thereby fix the image and achieve enhancement of, for example, the film hardness of the image.

Examples of the active energy ray usable in Curing step A include ultraviolet radiation (UV light), visible radiation, and an electron beam. Of these, UV light is preferred.

The peak wavelength of the active energy ray (light) may vary depending on the absorption characteristics of a sensitizer used as needed; however, the peak wavelength is preferably, for example, 200 nm to 405 nm, more preferably 220 nm to 390 nm, still more preferably 220 nm to 385 nm.

Incidentally, in the case of not employing the combination of a photopolymerization initiator and a sensitizer, preferred is, for example, 200 nm to 310 nm, more preferred is 200 nm to 280 nm.

The illuminance at the exposed surface irradiated with an active energy ray (light) is, for example, 10 mW/cm$^2$ to 2000 mW/cm$^2$, preferably 20 mW/cm$^2$ to 1000 mW/cm$^2$.

Widely known examples of the light source that generates an active energy ray (light) include mercury lamps, metal halide lamps, UV fluorescent lamps, gas lasers, and solid-state lasers.

These light sources listed as examples can be replaced by semiconductor UV-emitting devices, which is very effective industrially and environmentally.

Among semiconductor UV-emitting devices, LEDs (Light Emitting Diodes) and LDs (Laser Diodes), which are small-sized, long-lifetime, high-efficiency, and low-cost devices, are considered as promising light sources.

Preferred light sources include metal halide lamps, ultrahigh pressure mercury lamps, high pressure mercury lamps, medium pressure mercury lamps, low pressure mercury lamps, LEDs, and violet lasers.

In particular, in the case of employing the combination of a photopolymerization initiator and a sensitizer, more preferred are an ultrahigh pressure mercury lamp configured to radiate light at a wavelength of 365 nm, 405 nm, or 436 nm, a high pressure mercury lamp configured to radiate light at a wavelength of 365 nm, 405 nm, or 436 nm, and an LED configured to radiate light at a wavelength of 355 nm, 365 nm, 385 nm, 395 nm, or 405 nm, most preferred is an LED configured to radiate light at a wavelength of 355 nm, 365 nm, 385 nm, 395 nm, or 405 nm.

In the case of not employing the combination of a photopolymerization initiator and a sensitizer, preferred is a metal halide lamp, a medium pressure mercury lamp, or a low pressure mercury lamp.

The time for irradiating, with an active energy ray, the ink composition applied to a recording medium is, for example, 0.01 seconds to 120 seconds, preferably 0.1 seconds to 90 seconds.

The irradiation conditions and the basic irradiation method of an active energy ray may be determined by appropriately referring to the irradiation conditions and the irradiation method described in JP1985-132767A (JP-S60-132767A).

A preferred mode of irradiation with an active energy ray is specifically a mode in which both sides of a head unit including an ink ejection device are equipped with light sources, and the head unit and the light sources are used to perform scanning by, what is called, the shuttle mode; or a mode of irradiation with an active energy ray using another light source without being driven.

The irradiation with an active energy ray is preferably performed after the lapse of a certain time (for example, 0.01 seconds to 120 seconds, preferably 0.01 seconds to 60 seconds) from landing and heat-drying of the ink composition.

Curing Step B

The Curing step B may be performed in which the ink composition applied to a recording medium is heated or irradiated with infrared radiation to cure the ink composition. The ink composition applied to a recording medium is heated or irradiated with infrared radiation to cause heat-curing. This causes the crosslinking reaction of thermosetting groups in microcapsules in the ink composition, to thereby fix the image, and achieve enhancement of, for example, the film hardness of the image.

The heating means for the heating is not particularly limited, and examples include a heating drum, hot air, an infrared lamp, an infrared LED, an infrared heater, a heating oven, a heating plate, an infrared laser, and an infrared dryer. Of these, from the viewpoint that the ink composition can be efficiently heat-cured, preferred are a light-emitting diode (LED) having a maximum absorption wavelength in the wavelengths of 0.8 μm to 1.5 μm or 2.0 μm to 3.5 μm and having emission wavelengths from near-infrared radiation to far-infrared radiation; a heater that radiates near-infrared radiation to far-infrared radiation; a laser having lasing wavelengths from near-infrared radiation to far-infrared radiation; and a dryer that radiates near-infrared radiation to far-infrared radiation.

The heating temperature during the heating is preferably 40° C. or more, more preferably 40° C. to 200° C., still more preferably 100° C. to 180° C. The heating temperature is the temperature of the ink composition on a recording medium, and can be measured with a thermograph using an infrared thermography apparatus H2640 (manufactured by Nippon Avionics Co., Ltd.).

The heating time can be appropriately set in accordance with, for example, the heating temperature, the formulation of the ink composition, and printing speed.

The Curing step B of causing heat-curing of the ink composition applied to a recording medium may also serve as the following heat-drying step.

Heat-Drying Step

In addition to the above-described application step and curing step, a heat-drying step of heat-drying the ink composition on a recording medium may be further performed, as needed, after the application step and before the curing step.

In the heat-drying step, water and an organic solvent used as needed in combination of water are evaporated from the ink composition applied to a recording medium, to thereby fix the image.

The heating means for performing the heat-drying is not particularly limited. Examples of the heating means include a heating drum, hot air, an infrared lamp, a heating oven, and a heating plate.

The heating temperature is preferably 40° C. or more, more preferably 40° C. to 150° C., still more preferably 40° C. to 80° C.

Incidentally, the heating time can be appropriately set in accordance with, for example, the formulation of the ink composition and printing speed.

The ink composition having been fixed by heating is, as needed, irradiated with an active energy ray in the curing step, so that the ink composition is further photo-fixed.

The image recording method is preferably an image recording method using, in addition to the above-described ink composition, a treatment liquid for causing aggregation of components in the ink composition. Such a combination of the above-described ink composition and the treatment liquid provides a marked effect of preventing bleeding of recording images and provides markedly enhanced resolution of recording images, compared with a case of using a combination of the treatment liquid and an ink other than the above-described ink composition.

Thus, preferred is an image-forming method that uses the above-described ink set.

Specifically, the image recording method preferably includes a treatment-liquid application step of applying the treatment liquid of the above-described ink set to a recording medium, and an ink application step of applying the ink composition of the ink set onto the recording medium, to form an image. In this case, the ink application step is preferably performed by applying the ink composition of the ink set by an ink jet method.

Treatment-Liquid Application Step

In the treatment-liquid application step, the treatment liquid of the above-described ink set is applied to a recording medium.

The application of the treatment liquid to a recording medium can be performed by a method selected from the group consisting of publicly known liquid application methods, and examples of the methods include coating such as spray coating and a coating roller, application in an ink jet mode, and immersion. Specific examples of the methods include size press methods represented by a horizontal size press method, a roll coater method, and a calender size press method; knife coater methods represented by an air knife coater method; roll coater methods represented by transfer roll coater methods such as a gate roll coater method, a direct roll coater method, a reverse roll coater method, and a squeeze roll coater method; a bill blade coater method, a short duel coater method; blade coater methods represented by a two stream coater method; bar coater methods represented by a rod bar coater method; a cast coater method; a gravure coater method; a curtain coater method; a die coater method; a brush coater method; and a transfer method. Alternatively, another coating method may be employed in which, as in the coating device described in JP1998-230201A (JP-H10-230201A), a coating device including a liquid amount control member is used to control the coating amount.

The treatment liquid may be applied to the entirety of a recording medium, or may be partially applied to a region to which the ink is applied in the ink application step.

In the present disclosure, preferred is entire-surface application of application to the entirety of coated paper by coating using, for example, a coating roller, from the viewpoint of uniformly adjusting the amount of treatment liquid applied, and uniformly recording, for example, fine lines and fine image portions to suppress density unevenness such as image unevenness.

The application method of adjusting the application amount of aggregation component to be in the above-described range is, for example, a method using an anilox roller. The anilox roller is a roller provided in the following manner: a roller surface formed by thermal spraying of ceramic is subjected to laser processing so as to have a pattern of, for example, pyramids, oblique lines, or hexagons. The treatment liquid enters the recessed portions formed in the roller surface, and transferred upon contact with a paper surface. Thus, the treatment liquid is applied in an amount controlled with the recesses of the anilox roller.

Ink Application Step

In the ink application step, the ink composition of the ink set is applied to a recording medium to form an image. The ink application step in an image-forming method using the ink set is also the same as above and preferred embodiments are also the same as above. In this step, the ink composition is applied preferably by an ink jet method.

The ink application step may be a step performed, after the above-described treatment-liquid application step, so as to apply ink to the region of the applied treatment liquid. Alternatively, the ink application step may be a step performed before the treatment-liquid application step, so that the ink is applied and then the treatment liquid is applied. In the present disclosure, preferably, after the treatment-liquid application step, the ink application step is performed such that the ink composition is selectively applied to the region of the applied treatment liquid, to thereby record an image.

EXAMPLES

Hereinafter, the present invention will be described more specifically with reference to Examples. However, the present invention is not limited to the following Examples unless departing from the spirit and scope thereof.

Example 1

Preparation of Microcapsules
Preparation of Microcapsule Aqueous Dispersion Liquid 1 (MC1)
Preparation of Oil Phase The components described in the following formulation were mixed with 55 g of ethyl acetate serving as an organic solvent, and stirred at room temperature (25° C.) for 60 minutes, to obtain an oil phase.

Formulation of Oil Phase

Lysine (Lysine): 3.3 g
(pKa=4.1, molecular weight=146, acidic group-containing compound having carboxy group (acid group) and amino group (active hydrogen group) [shell component of microcapsules])

TAKENATE (registered trademark) D-110N: 11 g
(Mitsui Chemicals, Inc., ethyl acetate solution containing 50 mass % addition product of trimethylolpropane (TMP) and xylylene diisocyanate (XDI); trifunctional isocyanate compound [shell component of microcapsules])

SR-833S: 35 g
(Sartomer, tricyclodecane dimethanol diacrylate; bifunctional polymerizable compound [core component of microcapsules])

OMNIPOL TX: 1.8 g
(IGM Resins B.V., oligomerized thioxanthone; photopolymerization initiator [core component of microcapsules])

GENOPOL AB-2: 1.8 g
(Rahn AG, polymerized 4-dimethylaminobenzoate; photopolymerization initiator [core component of microcapsules])

OMNIPOL 9210: 3.5 g
(IGM Resins B.V., mixture of polyethylene glycol di(β-4-[4-(2-dimethylamino-2-benzyl)butyroylphenyl]piperazine) propionate and ethoxylated pentaerythritol tetraacrylate; photopolymerization initiator [core component of microcapsules])

Emulsification Step

To the obtained oil phase, 75 g of distilled water was added and mixed. The resultant mixture was subjected to emulsification dispersing with a homogenizer rotated at 12000 rpm for 12 minutes to obtain an emulsion.

Post-Treatment Step

The resultant emulsion was added to 50 g of distilled water. The resultant solution was stirred at room temperature (25° C.) for 30 minutes. Subsequently, the stirred solution was further heated at 45° C., and stirred for 4 hours while the liquid temperature was kept at 45° C., to drive off ethyl acetate in the solution. In this way, a microcapsule aqueous dispersion liquid 1 (MC1; solid content concentration: 30 mass %) was prepared (microcapsule preparation step).

Preparation of Microcapsule Aqueous Dispersion Liquid 2 (MC2)

Preparation of Oil Phase

The components described in the following formulation and 55 g of ethyl acetate serving as an organic solvent were mixed. The resultant mixture was stirred at room temperature (25° C.) for 15 minutes to obtain an oil phase.

Formulation of Oil Phase

TAKENATE (registered trademark) D-110N: 11 g
(Mitsui Chemicals, Inc., ethyl acetate solution containing 50 mass % addition product of trimethylolpropane (TMP) and xylylene diisocyanate (XDI); trifunctional isocyanate compound [shell component of microcapsules])

SR-833S: 35 g
(Sartomer, tricyclodecane dimethanol diacrylate; bifunctional polymerizable compound [core component of microcapsules])

OMNIPOL TX: 1.8 g
(IGM Resins B.V., oligomerized thioxanthone; photopolymerization initiator [core component of microcapsules])

GENOPOL AB-2: 1.8 g
(Rahn AG, polymerized 4-dimethylaminobenzoate; photopolymerization initiator [core component of microcapsules])

OMNIPOL 9210: 3.5 g
(IGM Resins B.V., mixture of polyethylene glycol di(β-4-[4-(2-dimethylamino-2-benzyl)butyroylphenyl]piperazine) propionate and ethoxylated pentaerythritol tetraacrylate; photopolymerization initiator [core component of microcapsules])

Preparation of Aqueous Phase

Lysine (Lysine; pKa=4.1, acidic group-containing compound having carboxy group (acid group) and amino group (active hydrogen group) [shell component of microcapsules]) (3.3 g) was dissolved in 50 g of distilled water. Subsequently, the resultant lysine aqueous solution was mixed with, as a neutralizer for neutralizing the acid group of lysine, a 1 N (=1 mol/L) sodium hydroxide (NaOH) aqueous solution (basic compound), to obtain an aqueous phase. At this time, the amount of NaOH aqueous solution added was adjusted such that the neutralization ratio of the acid group of lysine reached a value in Table 4 below at the time of completion of preparation of the microcapsule aqueous dispersion liquid.

Emulsification Step

The oil phase and the aqueous phase prepared above were mixed together. The resultant mixture was subjected to emulsification dispersing with a homogenizer rotated at 12000 rpm for 12 minutes to obtain an emulsion.

Post-Treatment Step

The resultant emulsion was added to 25 g of distilled water. The resultant solution was stirred at room temperature (25° C.) for 30 minutes. Subsequently, the stirred solution was further heated at 45° C., and stirred for 4 hours while the liquid temperature was kept at 45° C., to drive off ethyl acetate in the solution. In this way, a microcapsule aqueous dispersion liquid 2 (MC2; solid content concentration: 30 mass %) was prepared (microcapsule preparation step).

Preparation of Microcapsule Aqueous Dispersion Liquid 3 (MC3)

Preparation of Oil Phase

As in the preparation of the oil phase in the microcapsule aqueous dispersion liquid 2 (MC2), an oil phase used for preparing a microcapsule aqueous dispersion liquid 3 (MC3) was prepared.

Preparation of Aqueous Phase

Lysine (Lysine; pKa=4.1, acidic group-containing compound having carboxy group (acid group) and amino group (active hydrogen group) [shell component of microcapsules]) (3.3 g) was dissolved in 50 g of distilled water, to obtain an aqueous phase.

Emulsification Step

The oil phase and the aqueous phase prepared above were mixed together. The resultant mixture was heated at 50° C., and subsequently subjected to emulsification dispersing with a homogenizer rotated at 12000 rpm for 12 minutes while the liquid temperature was kept at 50° C., to obtain an emulsion.

Post-Treatment Step

The resultant emulsion was added to 25 g of distilled water. The resultant solution was stirred at room temperature (25° C.) for 30 minutes. Subsequently, the stirred solution was further heated at 45° C., and stirred for 4 hours while the liquid temperature was kept at 45° C., to drive off ethyl acetate in the solution. In this way, a microcapsule aqueous dispersion liquid 3 (MC3; solid content concentration: 30 mass %) was prepared (microcapsule preparation step).

Preparation of Microcapsule Aqueous Dispersion Liquid 4 (MC4)

Preparation of Oil Phase

The components described in the following formulation and 55 g of ethyl acetate serving as an organic solvent were mixed together, and stirred at room temperature (25° C.) for 15 minutes, to obtain an oil phase.

Formulation of Oil Phase

TAKENATE (registered trademark) D-110N: 7.5 g
(Mitsui Chemicals, Inc., ethyl acetate solution containing 50 mass % addition product of trimethylolpropane (TMP) and xylylene diisocyanate (XDI); trifunctional isocyanate compound [shell component of microcapsules])

TAKENATE (registered trademark) D-116N: 16.5 g
(Mitsui Chemicals, Inc., ethyl acetate solution containing 50 mass % of addition product of trimethylolpropane (TMP), xylylene diisocyanate (XDI), and polyethylene glycol monomethyl ether (nonionic group being isocyanate compound having polyethyleneoxy group (EO group)) [core component of microcapsules])

SR-833S: 35 g
(Sartomer, tricyclodecane dimethanol diacrylate; bifunctional polymerizable compound [core component of microcapsules])

OMNIPOL TX: 1.8 g
(IGM Resins B.V., oligomerized thioxanthone; photopolymerization initiator [core component of microcapsules])

GENOPOL AB-2: 1.8 g
(Rahn AG, polymerized 4-dimethylaminobenzoate; photopolymerization initiator [core component of microcapsules])

OMNIPOL 9210: 3.5 g
(IGM Resins B.V., mixture of polyethylene glycol di(β-4-[4-(2-dimethylamino-2-benzyl)butyroylphenyl]piperazine) propionate, and ethoxylated pentaerythritol tetraacrylate; photopolymerization initiator [core component of microcapsules])

Preparation of Aqueous Phase

As in the preparation of the aqueous phase in the microcapsule aqueous dispersion liquid 3 (MC3), an aqueous phase used for the preparation of a microcapsule aqueous dispersion liquid 4 (MC4) was prepared.

Emulsification Step

The oil phase and the aqueous phase prepared above were mixed together. The resultant mixture was heated at 50° C., and subsequently subjected to emulsification dispersing with a homogenizer rotated at 12000 rpm for 12 minutes while the liquid temperature was kept at 50° C., to obtain an emulsion.

Post-Treatment Step

The resultant emulsion was added to 25 g of distilled water. The resultant solution was stirred at room temperature (25° C.) for 30 minutes. Subsequently, the stirred solution was further heated at 45° C., and stirred for 4 hours while the liquid temperature was kept at 45° C., to drive off ethyl acetate in the solution. In this way, a microcapsule aqueous dispersion liquid 4 (MC4; solid content concentration: 32 mass %) was prepared (microcapsule preparation step).

Preparation of Microcapsule Aqueous Dispersion Liquids 5 to 8 (MC 5 to 8)

MC 5 to 8 (solid content concentration: 30 mass %) were prepared (microcapsule preparation step) as in the preparation of the microcapsule aqueous dispersion liquid 3 (MC3) except that the lysine forming the aqueous phase was changed to, as described in Table 4 below, other acidic group-containing compounds added in amounts.

Incidentally, the details of the acidic group-containing compounds used for MC 5 to 8 are as follows.

β-Alanine (β-alanine)
(pKA=4.5, molecular weight=89; acidic group-containing compound represented by structure described later and having carboxy group (acid group) and amino group (active hydrogen group))

Malic acid (malic acid)
(pKA=3.6, molecular weight=116; acidic group-containing compound represented by structure described later and having carboxy group (acid group) and hydroxy group (active hydrogen group))

Taurine (taurine)
(pKA=1.7, molecular weight=125; acidic group-containing compound represented by structure described later and having sulfo group (acid group) and amino group (active hydrogen group))

EAP (ethanolamine phosphate)
(pKA=2.2, molecular weight=141; acidic group-containing compound represented by structure described later and having phosphate group (acid group) and amino group (active hydrogen group))

Preparation of Microcapsule Aqueous Dispersion Liquid 9 (MC9)

A microcapsule aqueous dispersion liquid 9 (MC9; solid content concentration: 30 mass %) was prepared as in the preparation of the microcapsule aqueous dispersion liquid 2 (MC2) except that the NaOH aqueous solution used as the neutralizer during preparation of the aqueous phase was replaced by triethylamine (TEA; basic compound).

Incidentally, the amount of triethylamine added was adjusted such that the neutralization ratio of the acid group of lysine reached a value described in Table 4 below at the time of completion of preparation of the microcapsule aqueous dispersion liquid.

Preparation of Microcapsule Aqueous Dispersion Liquid 10 (MC10)

Preparation of Oil Phase

The oil phase used for preparation of a microcapsule aqueous dispersion liquid 10 (MC10; solid content concentration: 30 mass %) was prepared as in the preparation of the oil phase in the microcapsule aqueous dispersion liquid 2 (MC2) except that the stirring conditions of the mixture during preparation of the oil phase were changed from "at room temperature (25° C.) for 15 minutes" to "at 50° C. for 60 minutes.

Preparation of Aqueous Phase

Lysine (Lysine; pKa=4.1, acidic group-containing compound having carboxy group (acid group) and amino group (active hydrogen group) [shell component of microcapsules]) (3.3 g) was dissolved in 50 g of distilled water, to obtain an aqueous phase.

Emulsification Step

The oil phase and the aqueous phase prepared above were mixed together. The resultant mixture was subjected to emulsification dispersing with a homogenizer rotated at 12000 rpm for 12 minutes to obtain an emulsion.

Post-Treatment Step

The resultant emulsion was added to 25 g of distilled water. The resultant solution was stirred at room temperature (25° C.) for 30 minutes. Subsequently, the stirred solution was further heated at 45° C., and stirred for 4 hours while the liquid temperature was kept at 45° C., to drive off ethyl acetate in the solution. In this way, a microcapsule aqueous dispersion liquid 10 (MC10; solid content concentration: 30 mass %) was prepared (microcapsule preparation step).

Preparation of Microcapsule Aqueous Dispersion Liquid 11 (MC11)

A microcapsule aqueous dispersion liquid 11 (MC11; solid content concentration: 30 mass %) for comparison was prepared as in the preparation of the microcapsule aqueous dispersion liquid 2 (MC2) except that the "Preparation of aqueous phase" was changed to that without neutralization.

Preparation of Aqueous Phase

Lysine (Lysine; pKa=4.1, acidic group-containing compound having carboxy group (acid group) and amino group (active hydrogen group) [shell component of microcapsules]) (3.3 g) was dissolved in 50 g of distilled water to provide an aqueous phase.

Preparation of Microcapsule Aqueous Dispersion Liquid 12 (MC12)

MC12 was prepared (microcapsule preparation step) as in the preparation of the microcapsule aqueous dispersion liquid 1 (MC1) except that 35 g of SR-833S (bifunctional monomer (photopolymerizable monomer)) was replaced by 35 g of TRIXENE™ BI 7982 (thermal polymerizable monomer (blocked isocyanate), Baxenden Chemicals Ltd.) from which propylene glycol monomethyl ether had been distilled off under reduced pressure at 60° C. and at 2.67 kPa (20 torr), and that the polymerization initiator was not contained.

The solid content concentration of MC12 was set to 30 mass % by adjusting the amount of water added in the post-treatment step.

Preparation of Microcapsule Aqueous Dispersion Liquid 13 (MC13)

MC13 was prepared (microcapsule preparation step) as in the preparation of the microcapsule aqueous dispersion liquid 2 (MC2) except that 35 g of SR-833S (bifunctional monomer (photopolymerizable monomer)) was replaced by 35 g of TRIXENE™ BI 7982 (thermal polymerizable monomer (blocked isocyanate), Baxenden Chemicals Ltd.) from which propylene glycol monomethyl ether had been distilled off under reduced pressure at 60° C. and at 2.67 kPa (20 torr), and that the polymerization initiator was not contained.

The solid content concentration of MC13 was set to 30 mass % by adjusting the amount of water added in the post-treatment step.

Preparation of Microcapsule Aqueous Dispersion Liquid 14 (MC14)

MC14 was prepared (microcapsule preparation step) as in the preparation of the microcapsule aqueous dispersion liquid 3 (MC3) except that 35 g of SR-833S (bifunctional monomer (photopolymerizable monomer)) was replaced by 35 g of TRIXENE™ BI 7982 (thermal polymerizable monomer (blocked isocyanate), Baxenden Chemicals Ltd.) from which propylene glycol monomethyl ether had been distilled off under reduced pressure at 60° C. and at 2.67 kPa (20 torr), and that the polymerization initiator was not contained.

The solid content concentration of MC14 was set to 30 mass % by adjusting the amount of water added in the post-treatment step.

Preparation of Microcapsule Aqueous Dispersion Liquid 15 (MC15)

MC15 (solid content concentration: 30 mass %) was prepared (microcapsule preparation step) as in the preparation of the microcapsule aqueous dispersion liquid 1 (MC1) except that 35 g of SR-833S (bifunctional monomer (photopolymerizable monomer)) was replaced by 35 g of EPICLON™840 (thermal polymerizable oligomer (epoxy resin), DIC Corporation), and that the polymerization initiator (OMNIPOL TX, GENOPOL AB-2, and OMNIPOL 9210: total amount of 7.1 g) was replaced by 7.1 g of 2-methylimidazole (thermal curing accelerator).

Preparation of Microcapsule Aqueous Dispersion Liquid 16 (MC16)

A microcapsule aqueous dispersion liquid 16 (MC16) for comparison was prepared as in the preparation of the microcapsule aqueous dispersion liquid 11 (MC11) except that 35 g of SR-833S (bifunctional monomer (photopolymerizable monomer)) was replaced by 35 g of TRIXENE™ BI 7982 (thermal polymerizable monomer (blocked isocyanate), Baxenden Chemicals Ltd.) from which propylene glycol monomethyl ether had been distilled off under reduced pressure at 60° C. and at 2.67 kPa (20 torr), and that the polymerization initiator was not contained.

The solid content concentration of MC16 was set to 30 mass % by adjusting the amount of water added in the post-treatment step.

Volume-Average Particle Size of Microcapsules

The volume-average particle size of microcapsules was measured by a light scattering method. Incidentally, the volume-average particle size of microcapsules was measured by a light scattering method using a wet particle size distribution analyzer LA-960 (HORIBA, Ltd.).

As a result, the volume-average particle sizes of microcapsules included in MC1 to MC16 were found to be in the range of 0.10 μm to 0.20 μm.

Preparation of Ink Compositions

Any one of the microcapsule aqueous dispersion liquids (MC1 to MC11 (including a photocurable polymerizable compound) and MC 12 to 16 (including a thermosetting polymerizable compound)) prepared above, a colorant dispersion liquid (anionic self-dispersible pigment; CAB-O-JET (registered trademark) 450C (containing cyan pigment, pigment concentration: 15 mass %), CABOT Corporation), CAPSTONE (registered trademark) FS-3100 (E. I. du Pont de Nemours and Company, solid content concentration: 25 mass %; fluorosurfactant), TEGO (registered trademark) Twin4000 (Evonik Japan Co., Ltd., solid content concentration: 100 mass %; siloxane-based surfactant), and glycerol (Glycerol) were mixed in amounts described in Table 6 or Table 7 below. Thus, 16 ink compositions (Inks 1 to 16) were prepared.

Incidentally, "CAB-O-JET 450C" used as the colorant dispersion liquid is a dispersion liquid of a pigment having a carboxy group as an ionic group (self-dispersible pigment).

Evaluation 1

The 16 ink compositions prepared above were subjected to the following measurements and evaluations. The results of the measurements and evaluations are described in Table 6 and Table 7 below.

1. Content Ratio of Acidic Group-Containing Compound Having Molecular Weight of 2000 or Less Each ink composition (50 g) was centrifuged under conditions at 80,000 rpm for 40 minutes. The supernatant liquid generated by the centrifugation was obtained, and the mass of the acidic group-containing compound (such as lysine) included in the obtained supernatant liquid was measured with a liquid chromatography apparatus Waters 2695 from Waters Corporation.

From the measured value (mass of the acidic group-containing compound), the content ratio of the acidic group-containing compound in the ink composition was determined.

2. Pencil Hardness 2.1 Pencil Hardness of Cured Films Provided by Photocuring

Each of the ink compositions 1 to 11 was applied to a polyvinyl chloride (PVC) sheet (AVERY 400 GLOSS WHITE PERMANENT, AVERY DENNISON CORPORATION) prepared as a substrate, with a No. 2 bar of K Hand Coater manufactured by RK PRINT COAT INSTRUMENTS LTD., at a thickness of 10 μm, to form a coating film. The coating film formed was heated at 60° C. for 3 minutes to dry. Subsequently, the dried coating film was irradiated with ultraviolet radiation (UV light) to cure the coating film, to obtain a cured film.

Incidentally, the irradiation with ultraviolet radiation (UV light) was performed with a laboratory UV mini conveyor apparatus CSOT (manufactured by GS Yuasa Power Supply Ltd.) including, as an exposure light source, an ozoneless metal halide lamp MAN250L, and set at a conveyor speed of 35 m/min and an exposure intensity of 2.0 W/cm².

The obtained cured film was subjected to a pencil hardness test with pencils of UNI (registered trademark) manufactured by Mitsubishi Pencil Co., Ltd., in accordance with JIS K5600-5-4 (1999).

Incidentally, the pencil hardness that is acceptable is HB or higher, preferably H or higher. Cured films having a pencil hardness of B or lower are not preferred because they may become scratched during handling.

2.2 Pencil Hardness of Cured Films Provided by Thermosetting

Each of the ink compositions 12 to 16 was applied to a polyvinyl chloride (PVC) sheet (AVERY 400 GLOSS WHITE PERMANENT, AVERY DENNISON CORPORATION) prepared as a substrate, with a No. 2 bar of K Hand Coater manufactured by RK PRINT COAT INSTRUMENTS LTD., at a thickness of 10 μm, to form a coating film. The coating film formed was heated at 60° C. for 3 minutes to dry. Subsequently, the dried coating film was placed into an oven, and heated at 160° C. for 5 minutes to cure the coating film, to obtain a cured film.

The obtained cured film was subjected to a pencil hardness test with pencils of UNI (registered trademark) manufactured by Mitsubishi Pencil Co., Ltd., in accordance with JIS K5600-5-4 (1999).

Incidentally, the pencil hardness that is acceptable is HB or higher, preferably H or higher. Cured films having a pencil hardness of B or lower are not preferred because they may become scratched during handling.

3. Pigment Dispersion Stability

Each of the ink compositions obtained above was diluted 1000-fold, and subjected to measurement in terms of absorbance (A0) with a UV-1800 (SHIMADZU CORPORATION). Subsequently, each ink composition was sealed in a container, and left at 60° C. for 2 weeks. After the lapse of 2 weeks, the container was opened; the liquid was sampled from near the liquid surface while care was taken to avoid convection, and was measured in terms of absorbance (A1) by the same measurement method as with that performed before the ink composition was left. From the measured absorbance values (A0 and A1), an absorbance change ratio was calculated by the following formula, and evaluated, in terms of pigment dispersion stability, in accordance with the following evaluation system.

Absorbance change ratio (%)=(A0−A1)/A0×100

Evaluation System
A: absorbance change ratio is 1% or less.
B: absorbance change ratio is more than 1% and 5% or less.
C: absorbance change ratio is more than 5%.

4. Ejectability

Each of the ink compositions obtained above (within 1 day at room temperature (25° C.) from preparation) was ejected through the head of an ink jet printer (manufactured by Roland DG Corporation, SP-300V) for 30 minutes and the ejection was terminated. After the lapse of 5 minutes from the termination, the ink composition was ejected again through the head to a recording medium (manufactured by AVERY DENNISON CORPORATION, AVERY 400 GLOSS WHITE PERMANENT) to record a 5 cm×5 cm square solid image. The obtained solid image was visually inspected for missing dots due to, for example, nozzles turned into a non-ejection state, and evaluated in accordance with the following evaluation system. Evaluation grades [A] and [B] for ejectability are practically acceptable.

Evaluation System
A: No missing dots were found in the solid image, and the image obtained had high image quality.
B: Missing dots were barely found in the solid image, but they did not affect the image quality in practical use.
C: Missing dots were found in the solid image, and they affected the image quality in practical use.

5. Preservation Stability

Each of the ink compositions obtained above was sealed in a container, and left at 60° C. for 2 weeks. The ink composition after the lapse of 2 weeks was evaluated as in the above-described evaluation of ejectability, and the ink composition was evaluated in terms of preservation stability in accordance with the same evaluation system as in the above-described evaluation of ejectability. Evaluation grades [A] and [B] for preservation stability are practically acceptable.

TABLE 4

| Type of microcapsules | Shell component ||||||||
|---|---|---|---|---|---|---|---|---|
| | Acidic group-containing compound (anion) |||||| Polyfunctional isocyanate ||
| | Type | pKa | Acidic group | Active hydrogen group | Molecular weight | Amount of addition (g) | TAKENATE D-116N *[2] (g) | TAKENATE D-110N *[1] (g) |
| MC1 | Lysine | 4.1 | Carboxy group | Amino group | 146 | 3.3 | — | 11 |
| MC2 | Lysine | 4.1 | Carboxy group | Amino group | 146 | 3.3 | — | 11 |
| MC3 | Lysine | 4.1 | Carboxy group | Amino group | 146 | 3.3 | — | 11 |
| MC4 | Lysine | 4.1 | Carboxy group | Amino group | 146 | 3.3 | 16.5 | 7.5 |
| MC5 | β-Alanine | 4.5 | Carboxy group | Amino group | 89 | 3.3 | — | 11 |
| MC6 | malic acid | 3.6 | Carboxy group | Hydroxy group | 116 | 4.1 | — | 11 |
| MC7 | taurine | 1.7 | Sulfo group | Amino group | 125 | 2.1 | — | 11 |
| MC8 | EAP | 2.2 | Phosphate group | Amino group | 141 | 2.8 | — | 11 |
| MC9 | Lysine | 4.1 | Carboxy group | Amino group | 146 | 3.3 | — | 11 |
| MC10 | Lysine | 4.1 | Carboxy group | Amino group | 146 | 3.3 | — | 11 |
| MC11 | Lysine | 4.1 | Carboxy group | Amino group | 146 | 3.3 | — | 11 |

| Type of microcapsules | Core component |||| Basic compound (neutralization) |||
|---|---|---|---|---|---|---|---|
| | Bifunctional monomer SR-833 (g) | Polymerization initiator |||| | |
| | | OMNIPOL TX (g) | GENOPOL AB-2 (g) | OMNIPOL 9210 (g) | Type | Neutralization ratio | Remarks |
| MC1 | 35 | 1.8 | 1.8 | 3.5 | — | 0 | All added to oil phase |
| MC2 | 35 | 1.8 | 1.8 | 3.5 | Sodium hydroxide | 90 | Neutralization with inorganic salt. |

TABLE 4-continued

| | | | | | | | |
|---|---|---|---|---|---|---|---|
| MC3 | 35 | 1.8 | 1.8 | 3.5 | — | 0 | Aqueous phase was neutralized and emulsification was performed. Heated at 50° C. and emulsified |
| MC4 | 35 | 1.8 | 1.8 | 3.5 | — | 0 | EO chain was contained. Heated at 50° C. and emulsified |
| MC5 | 35 | 1.8 | 1.8 | 3.5 | — | 0 | Heated at 50° C. and emulsified |
| MC6 | 35 | 1.8 | 1.8 | 3.5 | — | 0 | Heated at 50° C. and emulsified |
| MC7 | 35 | 1.8 | 1.8 | 3.5 | — | 0 | Heated at 50° C. and emulsified |
| MC8 | 35 | 1.8 | 1.8 | 3.5 | — | 0 | Heated at 50° C. and emulsified |
| MC9 | 35 | 1.8 | 1.8 | 3.5 | Triethylamine | 90 | Neutralization with amine. Aqueous phase was neutralized and then emulsification was performed. |
| MC10 | 35 | 1.8 | 1.8 | 3.5 | — | 0 | Oil phase was heated at 50° C. and emulsification was performed. |
| MC11 | 35 | 1.8 | 1.8 | 3.5 | — | 0 | Emulsified at room temperature |

[1] xylylene diisocyanate/trimethylolpropane adduct (Mitsui Chemicals, Inc.)
[2] xylylene diisocyanate/trimethylolpropane polyethylene oxide (EO) adduct (Mitsui Chemicals, Inc.)

TABLE 5

| | Shell component | | | | | | |
|---|---|---|---|---|---|---|---|
| | Acidic group-containing compound (anion) | | | | | Polyfunctional isocyanate | |
| Type of microcapsules | Type | pKa | Acidic group | Active hydrogen group | Molecular weight | Amount of addition (g) | TAKENATE D-116N [2] (g) | TAKENATE D-110N [1] (g) |
| MC12 | Lysine | 4.1 | Carboxy group | Amino group | 146 | 3.3 | — | 11 |
| MC13 | Lysine | 4.1 | Carboxy group | Amino group | 146 | 3.3 | — | 11 |
| MC14 | Lysine | 4.1 | Carboxy group | Amino group | 146 | 3.3 | — | 11 |
| MC15 | Lysine | 4.1 | Carboxy group | Amino group | 146 | 3.3 | — | 11 |
| MC16 | Lysine | 4.1 | Carboxy group | Amino group | 146 | 3.3 | — | 11 |

| | Core component | | | | | |
|---|---|---|---|---|---|---|
| | Thermosetting compound | | Thermal curing accelerator 2-methyl imidazole (g) | Basic compound (neutralization) | | |
| Type of microcapsules | TRIXENE™ BI 7982 [isocyanate-based] (g) | EPICLON™ 840 [epoxy-based] (g) | | Type | Neutralization ratio | Remarks |
| MC12 | 35 | — | — | — | 0 | All added to oil phase |
| MC13 | 35 | — | — | Sodium hydroxide | 90 | Neutralization with inorganic salt. Aqueous phase was neutralized and emulsification was performed. |

TABLE 5-continued

| | | | | | | |
|---|---|---|---|---|---|---|
| MC14 | 35 | — | — | — | 0 | Heated at 50° C. and emulsified |
| MC15 | — | 35 | 7.1 | — | 0 | All added to oil phase |
| MC16 | 35 | — | — | — | 0 | Emulsified at room temperature |

*[1] xylylene diisocyanate/trimethylolpropane adduct (Mitsui Chemicals, Inc.)
*[2] xylylene diisocyanate/trimethylolpropane polyethylene oxide (EO) adduct (Mitsui Chemicals, Inc.)

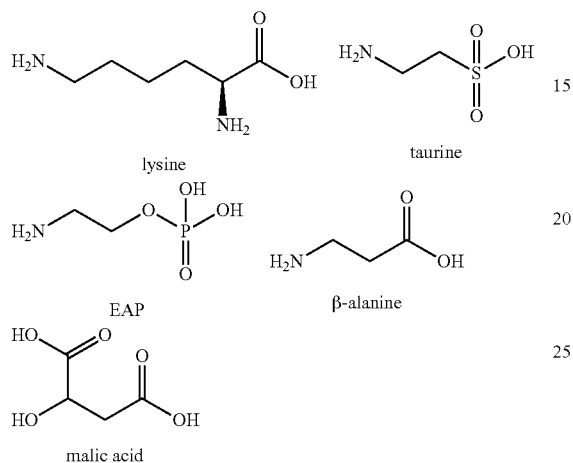

lysine taurine

EAP

β-alanine malic acid

TABLE 6

| | Ink composition | | | | | | | | | |
|---|---|---|---|---|---|---|---|---|---|---|
| | Microcapsule aqueous dispersion liquid | | Colorant (Colorant dispersion) | | Surfactant | | | | Solvent | |
| | Type | Amount of addition (g) | Type | Amount of addition (g) | Type | Amount of addition (g) | Type | Amount of addition (g) | Type | Amount of addition (g) |
| Ink 1 | MC1 | 34.3 | CAB-O-JET 450 (cyan pigment) | 10 | CAPSTONE FS-3100 | 0.45 | TEGO Twin 4000 | 0.15 | Glycerol | 40 |
| Ink 2 | MC2 | 34.3 | | 10 | CAPSTONE FS-3100 | 0.45 | TEGO Twin 4000 | 0.15 | Glycerol | 40 |
| Ink 3 | MC3 | 34.3 | | 10 | CAPSTONE FS-3100 | 0.45 | TEGO Twin 4000 | 0.15 | Glycerol | 40 |
| Ink 4 | MC4 | 34.3 | | 10 | CAPSTONE FS-3100 | 0.45 | TEGO Twin 4000 | 0.15 | Glycerol | 40 |
| Ink 5 | MC5 | 34.3 | | 10 | CAPSTONE FS-3100 | 0.45 | TEGO Twin 4000 | 0.15 | Glycerol | 40 |
| Ink 6 | MC6 | 34.3 | | 10 | CAPSTONE FS-3100 | 0.45 | TEGO Twin 4000 | 0.15 | Glycerol | 40 |
| Ink 7 | MC7 | 34.3 | | 10 | CAPSTONE FS-3100 | 0.45 | TEGO Twin 4000 | 0.15 | Glycerol | 40 |
| Ink 8 | MC8 | 34.3 | | 10 | CAPSTONE FS-3100 | 0.45 | TEGO Twin 4000 | 0.15 | Glycerol | 40 |
| Ink 9 | MC9 | 34.3 | | 10 | CAPSTONE FS-3100 | 0.45 | TEGO Twin 4000 | 0.15 | Glycerol | 40 |

TABLE 6-continued

| | | | | | | | | | | | |
|---|---|---|---|---|---|---|---|---|---|---|---|
| Ink 10 | MC10 | 34.3 | | 10 | CAPSTONE FS-3100 | 0.45 | TEGO Twin 4000 | 0.15 | Glycerol | 40 |
| Ink 11 | MC11 | 34.3 | CAB-O-JET 450 (cyan pigment) | 10 | CAPSTONE FS-3100 | 0.45 | TEGO Twin 4000 | 0.15 | Glycerol | 40 |

| | | Ink composition | | | Evaluation | | | | |
|---|---|---|---|---|---|---|---|---|---|
| | | Water (g) | Content ratio of acidic group-containing compound (mass %) | Treatment liquid | Pencil hardness | Pigment dispersion stability | Eject-ability | Preservation stability | Remarks |
| | Ink 1 | 15.1 | 0.21 | None | 2H | A | A | A | The invention |
| | Ink 2 | 15.1 | 0.32 | None | H | A | A | A | The invention |
| | Ink 3 | 15.1 | 0.41 | None | H | A | A | A | The invention |
| | Ink 4 | 15.1 | 0.33 | None | H | A | A | A | The invention |
| | Ink 5 | 15.1 | 0.42 | None | HB | A | A | A | The invention |
| | Ink 6 | 15.1 | 0.48 | None | HB | A | A | B | The invention |
| | Ink 7 | 15.1 | 0.35 | None | H | B | B | B | The invention |
| | Ink 8 | 15.1 | 0.42 | None | H | B | B | B | The invention |
| | Ink 9 | 15.1 | 0.40 | None | H | B | B | B | The invention |
| | Ink 10 | 15.1 | 0.05 | None | 2H | A | B | B | The invention |
| | Ink 11 | 15.1 | 0.69 | None | B | C | C | C | Comparison |

TABLE 7

| | Ink composition | | | | | | | | | |
|---|---|---|---|---|---|---|---|---|---|---|
| | Microcapsule aqueous dispersion liquid | | Colorant (Colorant dispersion) | | Surfactant | | | | Solvent | |
| | Type | Amount of addition (g) | Type | Amount of addition (g) | Type | Amount of addition (g) | Type | Amount of addition (g) | Type | Amount of addition (g) |
| Ink 12 | MC12 | 34.3 | CAB-O-JET 450 (cyan pigment) | 10 | CAPSTONE FS-3100 | 0.45 | TEGO Twin 4000 | 0.15 | Glycerol | 40 |
| Ink 13 | MC13 | 34.3 | | 10 | CAPSTONE FS-3100 | 0.45 | TEGO Twin 4000 | 0.15 | Glycerol | 40 |
| Ink 14 | MC14 | 34.3 | | 10 | CAPSTONE FS-3100 | 0.45 | TEGO Twin 4000 | 0.15 | Glycerol | 40 |
| Ink 15 | MC15 | 34.3 | | 10 | CAPSTONE FS-3100 | 0.45 | TEGO Twin 4000 | 0.15 | Glycerol | 40 |
| Ink 16 | MC16 | 34.3 | CAB-O-JET 450 (cyan pigment) | 10 | CAPSTONE FS-3100 | 0.45 | TEGO Twin 4000 | 0.15 | Glycerol | 40 |

TABLE 7-continued

| | Ink composition | | | Evaluation | | | | |
|---|---|---|---|---|---|---|---|---|
| | Water (g) | Content ratio of acidic group-containing compound (mass %) | Treatment liquid | Pencil hardness | Pigment dispersion stability | Eject- ability | Preservation stability | Remarks |
| Ink 12 | 15.1 | 0.21 | None | 2H | A | A | A | The invention |
| Ink 13 | 15.1 | 0.32 | None | H | A | A | A | The invention |
| Ink 14 | 15.1 | 0.41 | None | H | A | A | A | The invention |
| Ink 15 | 15.1 | 0.21 | None | 2H | A | A | A | The invention |
| Ink 16 | 15.1 | 0.69 | None | B | C | C | C | Comparison |

As described in Table 6 and Table 7, the inks employing the microcapsule aqueous dispersion liquids MC1 to MC10 and MC12 to MC15 and having an acidic group-containing compound content ratio of 0.5 mass % or less exhibit high pigment dispersion stability. This also provides good results in terms of ejectability during ink jet recording and ink preservation stability.

In particular, for example, the inks employing the microcapsule aqueous dispersion liquid MC1 or MC3 and having an acidic group-containing compound content ratio of 0.1 mass % or more have high temporal ink stability and provide markedly the effect of enhancing the ejectability during ink jet recording, compared with the ink employing the microcapsule aqueous dispersion liquid MC10 and having an acidic group-containing compound content ratio of less than 0.1 mass %. The same applies to the cases employing MC12 or MC14 in which the polymerizable compound is replaced by the thermal polymerizable monomer.

Five inks employing the microcapsule aqueous dispersion liquids MC3 and MC5 to MC8 were compared with each other. As a result, the cases employing a microcapsule aqueous dispersion liquid containing an acidic group-containing compound having, as an acidic group, a carboxy group exhibited higher pigment dispersion stability, and noticeably exhibited the effect of enhancing ejectability.

By contrast, the ink employing the microcapsule aqueous dispersion liquid MC11 and having an acidic group-containing compound content ratio of more than 0.5 mass % exhibited poor pigment dispersion stability, exhibited degraded ink ejectability during ink jet recording, and provided a recorded image having poor hardness. The same applies to the case of employing MC16 in which the polymerizable compound is replaced by the thermal polymerizable monomer.

Example 2

Preparation of Ink Sets
Preparation of Ink Compositions

Three ink compositions (Inks 21 to 23) employing the above-described microcapsule aqueous dispersion liquids MC1 to MC3 were prepared as in the above-described preparation of Inks 1 to 3 in Example 1 except that the amounts of solvent and water were changed as described in Table 9 below.

Preparation of Treatment Liquids

The components of formulations in the following Table 8 were mixed to prepare Treatment liquids A to G

TABLE 8

| | Treatment liquid A | Treatment liquid B | Treatment liquid C | Treatment liquid D | Treatment liquid E | Treatment liquid F | Treatment liquid G |
|---|---|---|---|---|---|---|---|
| Malonic acid | 25% | — | — | — | — | — | — |
| Citric acid | — | 25% | — | — | — | — | — |
| Calcium nitrate tetrahydrate | — | — | 35% | — | — | — | — |
| Magnesium nitrate hexahydrate | — | — | — | 35% | — | — | — |
| Aluminum nitrate nonahydrate | — | — | — | — | 35% | — | — |
| Polyguanide | — | — | — | — | — | 10% | — |
| Polyethyleneimine | — | — | — | — | — | — | 10% |
| OLFINE E-1010 | — | — | 1% | 1% | 1% | 1% | 1% |
| Diethylene glycol monoethyl ether | 10% | 10% | — | — | — | — | — |
| Ion-exchanged water | 65% | 65% | 64% | 64% | 64% | 89% | 89% |
| Total | 100% | 100% | 100% | 100% | 100% | 100% | 100% |

Preparation of Ink Sets

The Inks 21 to 23 (ink compositions) and the Treatment liquids A to G prepared above were used to prepare Ink sets A to H that are combinations of the ink compositions and the treatment liquids as described in Table 9 below.

Evaluation 2: Image Resolution

The ink sets obtained above were used to record images by a method described below, and the resultant images were evaluated in terms of resolution.

Incidentally, the evaluation of resolution was also performed for images recorded with the ink compositions (Inks 21 to 23) alone. The evaluation results are described in Table 9 below such that the cases of using the ink compositions alone can be compared with the cases of using the ink sets.
Formation of Images A recording medium (coated paper), OK Topkote Plus (Oji Paper Co., Ltd., basis weight: 104.7 g/m²), was prepared. An ink jet recording apparatus, a recording apparatus having the structure in FIG. 1, was prepared.

The recording apparatus was started; the recording medium fixed on a hard rubber belt of the recording apparatus was transported at a transport speed of 400 mm/s; treatments in regions <I> to <V> in FIG. 1 were performed to form images. <I> to <V> in FIG. 1 respectively correspond to the following Step I to Step V.

(I) Treatment-Liquid Application Step

A roll coater including an anilox roller 11 (100 to 300 lines/inch) so as to have a controlled coating amount was first used to apply the treatment liquid to the whole surface of the recording medium with a treatment liquid application amount of 1.2 g/m².

(II) Treatment Step

Subsequently, to the recording medium coated with the treatment liquid, air was blown with a drying fan 21 under the following conditions while a contact flat heater 22 was used to heat the recording medium from its back surface side (opposite side of the recording surface). Thus, a drying treatment and a permeation treatment were performed.
Conditions
Air velocity: 10 m/s
Temperature: 60° C. (surface temperature of recording surface of recording medium)

(III) Image-Forming Step

As illustrated in FIG. 1, three GELJET GX5000 printer heads (full line heads manufactured by Ricoh Company, Ltd.) were fixed such that, relative to a direction orthogonal to the running direction (sub-scanning direction) of the endless hard rubber belt, the direction (main scanning direction) of line heads in which nozzles were arranged was inclined by 75.7°. A first ink jet head 31, a second ink jet head 32, and a third ink jet head 33 were charged with the inks (Inks 21 to 23) prepared above; and the positions of the first ink jet head 31, the second ink jet head 32, and the third ink jet head 33 were adjusted such that ink droplets ejected from the nozzle heads would overlap. Subsequently, the inks were ejected in an ink jet mode to a treatment-liquid-applied coating surface of a recording medium under the following conditions. Thus, images were recorded.
Conditions
Amount of droplets ejected: 2.4 picoliters (pL)
Resolution: 1200 dpi (dot per inch)×1200 dpi (IV) Drying Step Subsequently, the recording medium was transported to a drying region; to the ink-landed recording medium, air was blown from drying fans 41 while contact flat heaters 42 were used to heat the recording medium from its back surface side (opposite side of the recording surface) via the hard rubber belt. The inks were dried under the following conditions.
Conditions
Drying method: drying by blowing air
Air velocity: 15 m/s
Temperature: 60° C. (surface temperature of recording surface of recording medium)

(V) Fixing Step

Subsequently, the dried recording medium was passed, under the following conditions, through the nip of a roller pair of a silicone rubber roller 51 and a large-diameter drum 52 pressing against each other, to perform heating-fixing treatment on the images; and such images were collected, without further treatment, into a collection tray (not shown) so as to overlap. Incidentally, the surface of the silicone rubber roller 51 is coated with a thin layer of silicone oil in order to prevent adhesion.
Conditions
Hardness of silicone rubber roller 51: 50°
Nip width of silicone rubber roller 51: 5 mm
Surface temperature of silicone rubber roller 51: 80° C.
Surface temperature of large-diameter drum 52: 60° C.
Pressure of roller pair: 0.2 MPa A character image recorded with an ink ejected through the first ink jet head 31 (characters of 5 (points) pt to 10 pt in FIG. 2), and a solid white character image recorded simultaneously at the formation of a solid image with the ink ejected through the first ink jet head 31 (solid white characters of 5 pt to 10 pt in FIG. 3) were prepared. The character images were visually observed and evaluated in terms of image resolution in accordance with the following evaluation system.
Evaluation System
A: even the 5 pt characters are recognized and high resolution for practical use is obtained.
B: the 5 pt characters are partially difficult to recognize, and a decrease in resolution is observed; however, this does not affect practical use.
C: some characters of more than 5 pt are difficult to recognize, and a decrease in resolution is observed; the resolution causes problems in practical use.
D: the characters blur and are difficult to recognize, and a considerable decrease in resolution is observed; the resolution causes serious problems in practical use.

TABLE 9

| | Ink composition | | | | | | | |
|---|---|---|---|---|---|---|---|---|
| | Microcapsule aqueous dispersion liquid | | Colorant (Colorant dispersion) | | Surfactant | | | |
| | Type | Amount of addition (g) | Type | Amount of addition (g) | Type | Amount of addition (g) | Type | Amount of addition (g) |
| Ink 21 | MC1 | 34.3 | CAB-O-JET 450 (cyan pigment) | 10 | CAPSTONE FS-3100 | 0.45 | TEGO Twin 4000 | 0.15 |
| Ink 22 | MC2 | 34.3 | | 10 | CAPSTONE FS-3100 | 0.45 | TEGO Twin 4000 | 0.15 |
| Ink 23 | MC3 | 34.3 | | 10 | CAPSTONE FS-3100 | 0.45 | TEGO Twin 4000 | 0.15 |

TABLE 9-continued

| | | | | | | | | | |
|---|---|---|---|---|---|---|---|---|---|
| Ink set A | MC1 | 34.3 | CAB-O-JET 450 (cyan pigment) | 10 | CAPSTONE FS-3100 | 0.45 | TEGO Twin 4000 | 0.15 |
| Ink set B | MC2 | 34.3 | | 10 | CAPSTONE FS-3100 | 0.45 | TEGO Twin 4000 | 0.15 |
| Ink set C | MC3 | 34.3 | | 10 | CAPSTONE FS-3100 | 0.45 | TEGO Twin 4000 | 0.15 |
| Ink set D | MC1 | 34.3 | | 10 | CAPSTONE FS-3100 | 0.45 | TEGO Twin 4000 | 0.15 |
| Ink set E | MC2 | 34.3 | | 10 | CAPSTONE FS-3100 | 0.45 | TEGO Twin 4000 | 0.15 |
| Ink set F | MC3 | 34.3 | | 10 | CAPSTONE FS-3100 | 0.45 | TEGO Twin 4000 | 0.15 |
| Ink set G | MC1 | 34.3 | | 10 | CAPSTONE FS-3100 | 0.45 | TEGO Twin 4000 | 0.15 |
| Ink set H | MC11 | 34.3 | CAB-O-JET 450 (cyan pigment) | 10 | CAPSTONE FS-3100 | 0.45 | TEGO Twin 4000 | 0.15 |

| | Ink composition | | | | | |
|---|---|---|---|---|---|---|
| | Solvent | | | Content ratio of acidic group-containing compound (mass %) | | |
| | Type | Amount of addition (g) | Water (g) | | Treatment liquid | Evaluation Image resolution | Remarks |
| Ink 21 | Glycerol | 10 | 45.1 | 0.21 | None | B | The invention |
| Ink 22 | Glycerol | 10 | 45.1 | 0.32 | None | B | The invention |
| Ink 23 | Glycerol | 10 | 45.1 | 0.41 | None | B | The invention |
| Ink set A | Glycerol | 10 | 45.1 | 0.21 | Treatment liquid A | A | The invention |
| Ink set B | Glycerol | 10 | 45.1 | 0.32 | Treatment liquid B | A | The invention |
| Ink set C | Glycerol | 10 | 45.1 | 0.41 | Treatment liquid C | A | The invention |
| Ink set D | Glycerol | 10 | 45.1 | 0.21 | Treatment liquid D | A | The invention |
| Ink set E | Glycerol | 10 | 45.1 | 0.32 | Treatment liquid E | A | The invention |
| Ink set F | Glycerol | 10 | 45.1 | 0.41 | Treatment liquid F | A | The invention |
| Ink set G | Glycerol | 10 | 45.1 | 0.21 | Treatment liquid G | A | The invention |
| Ink set H | Glycerol | 10 | 45.1 | 0.69 | Treatment liquid A | D | Comparison |

As described in Table 9, images recorded with the Ink sets A to G including ink compositions according to the present disclosure (Inks 21 to 23) each have high resolution, and, compared with images recorded with the ink compositions alone, have high image resolution. The ink compositions according to the present disclosure are more suitable for being used as ink sets that are combinations of such an ink composition and a treatment liquid to record images.

By contrast, images recorded with the Ink set H including a comparative ink composition (Ink 11) had very poor image resolution.

The entire contents disclosed by JP2016-021364 filed in the Japan Patent Office on Feb. 5, 2016 and the entire contents disclosed by JP2016-144556 filed in the Japan Patent Office on Jul. 22, 2016 are incorporated herein by reference.

All documents, patent applications, and technical standards mentioned in this Specification are incorporated herein by reference to the same extent as in the case where the individual documents, patent applications, and technical standards are specifically and individually described as being incorporated herein by reference.

What is claimed is:
1. An ink composition comprising:
a microcapsule comprising: a shell having a three-dimensional cross-linked structure comprising at least one of a urethane bond or a urea bond; and a core encapsulated by the shell;
a colorant selected from the group consisting of a colorant having an ionic group and a colorant at least a part of a surface of which being covered with a dispersant having an ionic group; and
water,
a content ratio of an acidic group-containing compound having at least an acidic group, an acid dissociation constant of 5 or less, and a molecular weight of 2000 or less, relative to a total mass of the ink composition, is from 0.1 mass % to 0.5 mass %,
wherein the acidic group-containing compound is represented by Formula 1 below:

Formula 1

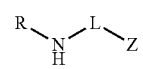

wherein, in Formula 1, R represents a hydrogen atom, an alkyl group, or an aryl group; Z represents an acidic group selected from the group consisting of a carboxy group, a sulfonic group, and a phosphate group; and L represents an alkylene group having 1 to 3 carbon atoms, an arylene group having 6 to 10 carbon atoms, or a divalent group that is a combination of an alkylene group having 1 to 3 carbon atoms and an arylene group having 6 to 10 carbon atoms.

2. The ink composition according to claim 1, wherein the ionic group of the colorant is an anionic group.

3. The ink composition according to claim 1, wherein the acidic group of the acidic group-containing compound is a carboxy group.

4. The ink composition according to claim 1, wherein the acidic group-containing compound is an amino acid in which Z represents a carboxy group and L represents an alkylene group having 1 to 3 carbon atoms and being unsubstituted or having an alkylamino group as a substituent.

5. The ink composition according to claim 1, wherein the acidic group-containing compound has a molecular weight of 1000 or less.

6. The ink composition according to claim 1, wherein the core of the microcapsule comprises a polymerizable compound.

7. The ink composition according to claim 6, wherein the polymerizable compound is a radical polymerizable compound.

8. The ink composition according to claim 1, wherein the core of the microcapsule comprises a photopolymerization initiator.

9. The ink composition according to claim 6, wherein the polymerizable compound is a thermal polymerizable compound.

10. An ink set comprising:
    the ink composition according to claim 1; and
    a treatment liquid comprising a compound selected from the group consisting of a polyvalent metal salt, an acidic compound, and a cationic polymer, and being capable of aggregating a component in the ink composition.

11. An image recording method comprising a step of applying the ink composition according to claim 1 to a recording medium.

12. An image recording method comprising:
    a treatment-liquid application step of applying the treatment liquid of the ink set according to claim 10 to a recording medium; and
    an ink application step of applying the ink composition of the ink set to a recording medium to form an image.

13. The ink composition according to claim 1, wherein the microcapsule and the colorant are separate components.

* * * * *